United States Patent [19]

Traister et al.

[11] 4,162,844

[45] Jul. 31, 1979

[54] REPRODUCTION MACHINE WITH DUPLEX IMAGE SHIFT

[75] Inventors: Robert L. Traister, Penfield; Stephen P. Wilczek, Fairport, both of N.Y.

[73] Assignee: Xerox Corporation, Stamford, Conn.

[21] Appl. No.: 829,034

[22] Filed: Aug. 30, 1977

[51] Int. Cl.[2] ........................ G03G 15/00; C03B 27/76

[52] U.S. Cl. ........................................ 355/14; 355/24; 355/69; 355/77

[58] Field of Search ..................... 355/3 R, 14, 24, 46, 355/133, 69, 77

[56] References Cited

U.S. PATENT DOCUMENTS

| | | | |
|---|---|---|---|
| 3,860,338 | 1/1975 | Reehil | 355/14 |
| 3,940,210 | 2/1976 | Donohue | 355/14 |
| 4,046,467 | 9/1977 | Laskowski et al. | 355/3 R |
| 4,050,805 | 9/1977 | Hage | 355/24 X |

*Primary Examiner*—Fred L. Braun

[57] ABSTRACT

An electrostatographic type copying or reproduction machine for making duplex as well as simplex copies. To enable offset margins on the original documents being copied to be matched on both sides of a duplex copy, a control is provided which when actuated moves the second side image into alignment with the first side image.

6 Claims, 54 Drawing Figures

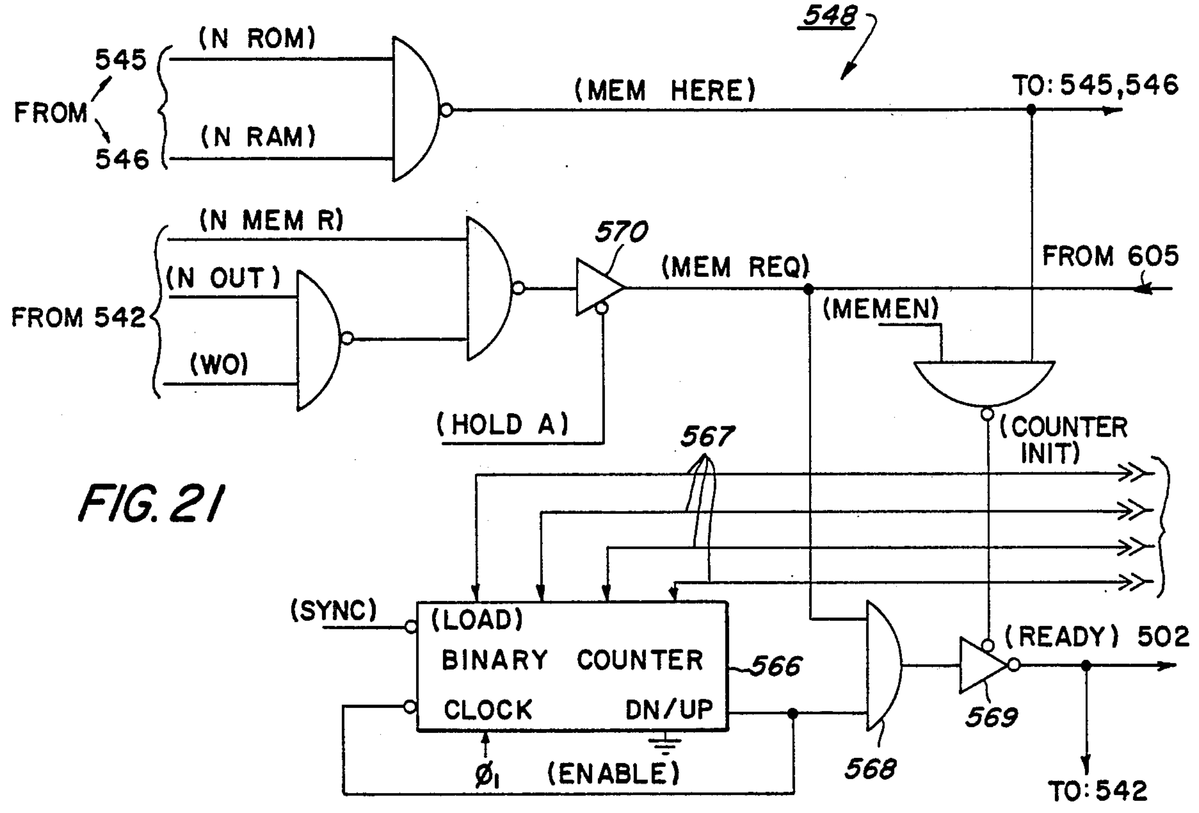
FIG. 21
MEMORY READY
FIG. 24
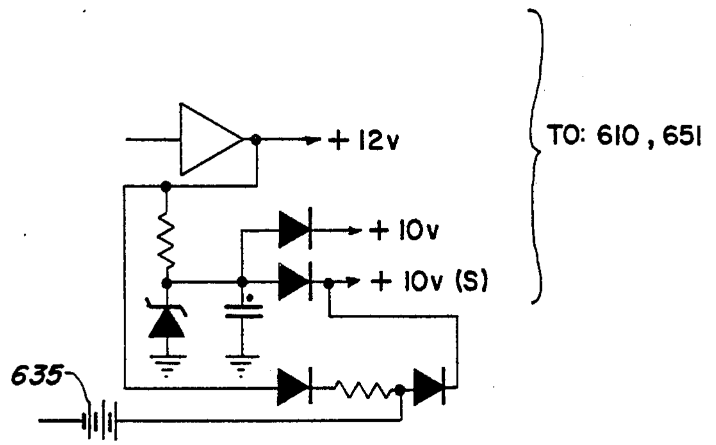

MACHINE INTERRUPT ROUTINE

LEGEND:
PNTR-POINTER
INCRM-INCREMENT
REL-RELATIVE
ADDR-ADDRESS
SR-SHIFT REGISTER
REG-REGISTER
SUBR-SUBROUTINE

REAL TIME INTERRUPT

LEGEND:

PNTR - POINTER
RTC - REAL TIME COUNTER
CNTR - COUNTER
REG - REGISTER

LEGEND:

F.O. - FADE OUT (LAMP 44)
FLASH - FLASH (LAMPS 37)
ADD. TRIM. - SUBROUTINE TO ADD TRIM DATA TO F.O. LAMP ON AND OFF TIMING DATA

REPRODUCTION MACHINE WITH DUPLEX IMAGE SHIFT

BACKGROUND OF THE INVENTION

This invention relates to electrostatographic xerographic type reproduction machines, and more particularly, to improved duplex reproduction machines.

Typically, reproduction or copy machines which produce duplex or two sided copies process the image on one side of the copy sheet, following which the sheet is inverted to permit processing of an image on the second or unused side of the sheet. Where the margins of the original documents corresponding to the leading and trailing edges of the copy sheet are uniform, the corresponding positions of the copy images on either side of the copy sheet match. Where however, the margins of the original document are unequal, as for example, where it is desired to have a relatively wide margin along one edge for binding purposes, the corresponding margins of the second image on the copy sheet opposite side are reversed. As a result, the copy images on opposite sides of the copy sheet are displaced or offset from one another.

OBJECTS AND SUMMARY OF THE INVENTION

It is, therefore, an object of the present invention to provide a new and improved electrostatographic reproduction machine.

It is a further object of the present invention to provide a reproduction machine capable of accommodating originals having unequal margins when making duplex copies.

It is an object of the present invention to provide method and apparatus for matching the disposition of copy images on both sides of a duplex copy.

It is an object of the present invention to provide in a copier capable of making duplex or two-sided copies, means to match the location of the duplex images even though margins of the originals being copied are not uniform.

It is an object of the present invention to provide a duplex copying apparatus incorporating means to shift one image relative to the other image to align the images.

It is an object of the present invention to provide an improved method for shifting copy images.

This invention relates to a process for making two sided copies, the steps which consist of feeding a copy sheet from a supply of copy sheets to bring one side of the copy sheet into transfer relationship with a first developed image on a photoreceptor; registering the copy sheet by one edge to correlate the position of the copy sheet with the first developed image; transferring the first developed image from the photoreceptor to the copy sheet one side; inverting the copy sheet; refeeding the inverted copy sheet to bring the second side of the copy sheet into transfer relationship with a second developed image on the photoreceptor; reregistering the inverted copy sheet by the one edge to correlate the position of the inverted copy sheet with the second developed image; transferring the second developed image from the photoreceptor to the copy sheet second side; and changing the timing of the image producing means to change the location of the second developed image on the photoreceptor relative to the copy sheet second side whereby to match the location of the second image on the copy sheet second side with the location of the image on the copy sheet first side.

The invention further relates to an electrostatic apparatus for producing copies of an original, the combination including a moving photoreceptor; means for charging the photoreceptor in preparation for imaging; exposure means for generating latent electrostatic images of the original on the photoreceptor, the exposure means including illumination means; means for developing the latent electrostatic images; feeding means for bringing copy sheets into predetermined registered relationship with images on said photoreceptor; transfer means for transferring images developed on the photoreceptor to the copy sheets; and control means for selectively changing the operational timing of the illumination means to match the location of the developed image on one side of the copy sheet with the developed image on the other side of the copy sheet.

BRIEF DESCRIPTION OF THE DRAWINGS

Other objects and advantages will be apparent from the ensuring description and drawings in which:

FIG. 21 is a logic schematic of the CPU memory ready;

FIG. 24 is a logic schematic of the nonvolatile memory power supply;

DETAILED DESCRIPTION OF THE PREFERRED EMBODIMENT OF THE INVENTION

Figure 1:
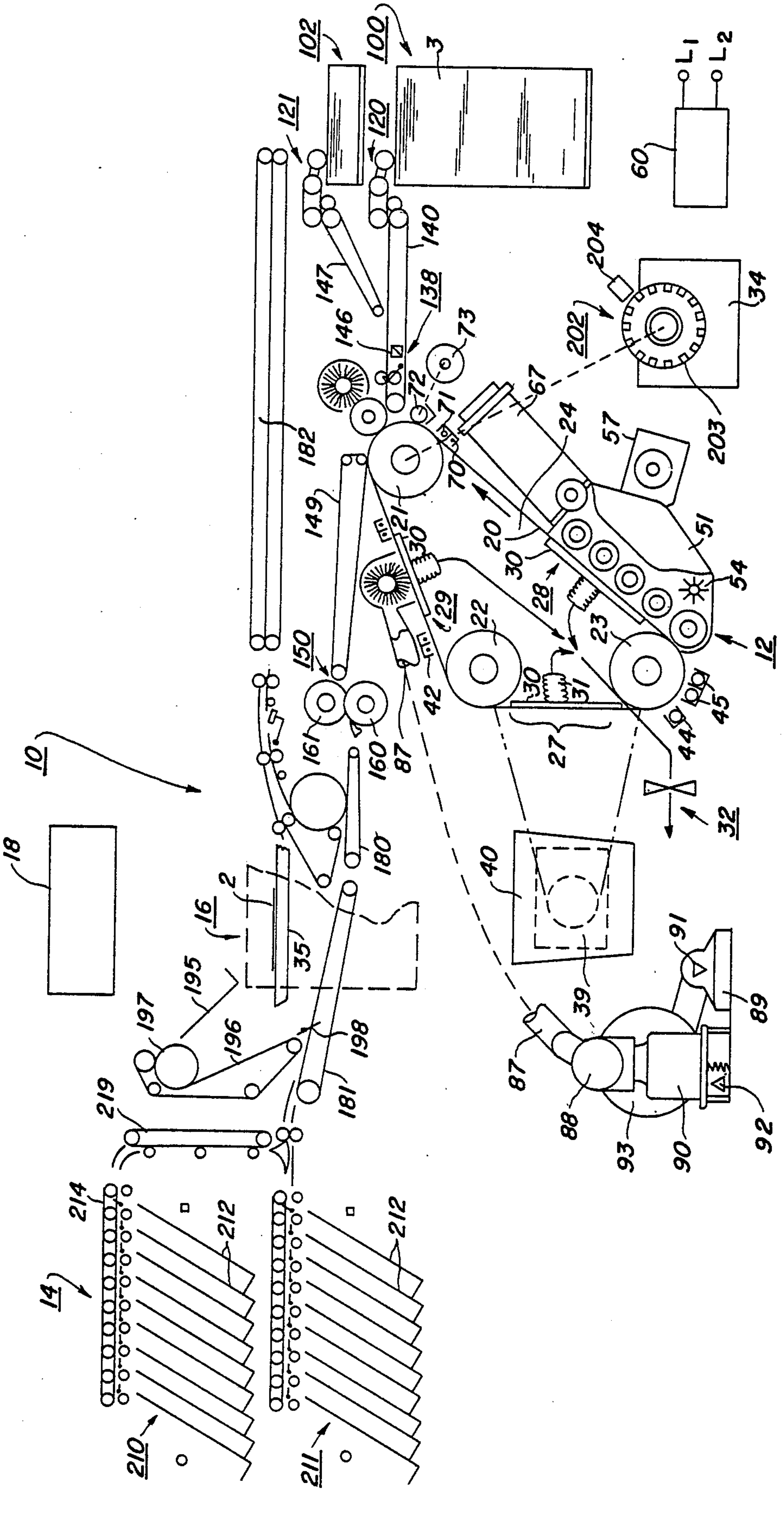
FIG. 1 is a schematic representation of an exemplary reproduction apparatus incorporating the control system of the present invention.
Figure 2:
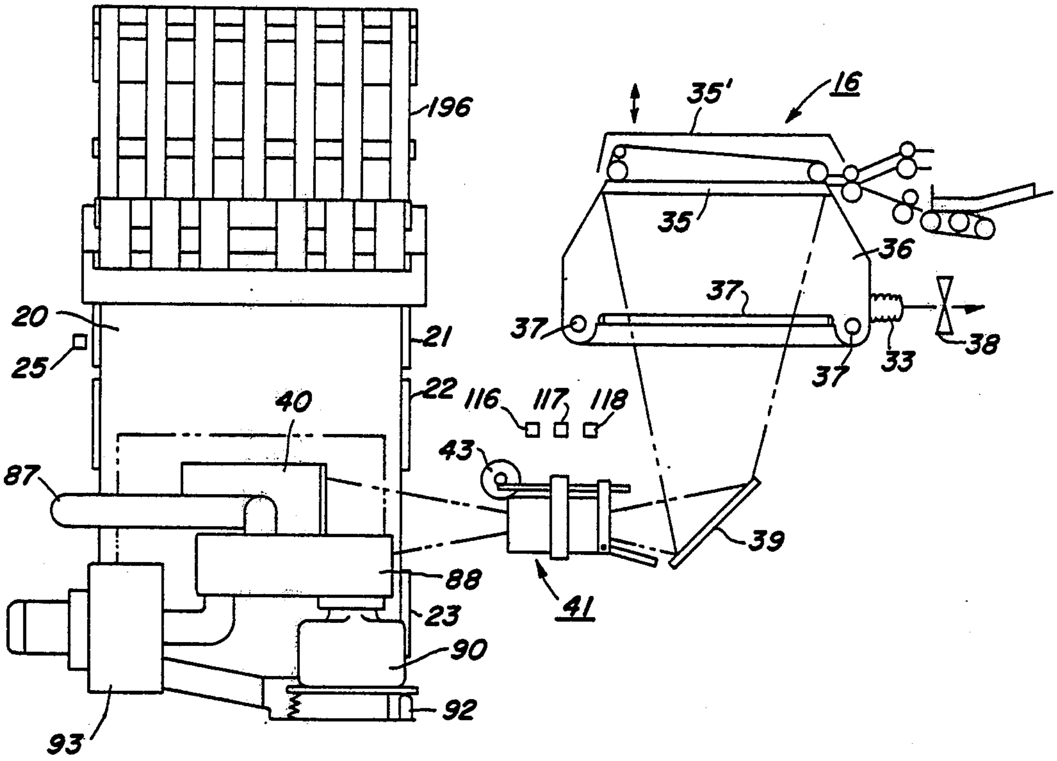
FIG. 2 is a vertical sectional view of the apparatus shown in FIG. 1 along the image plane.
Figure 3:
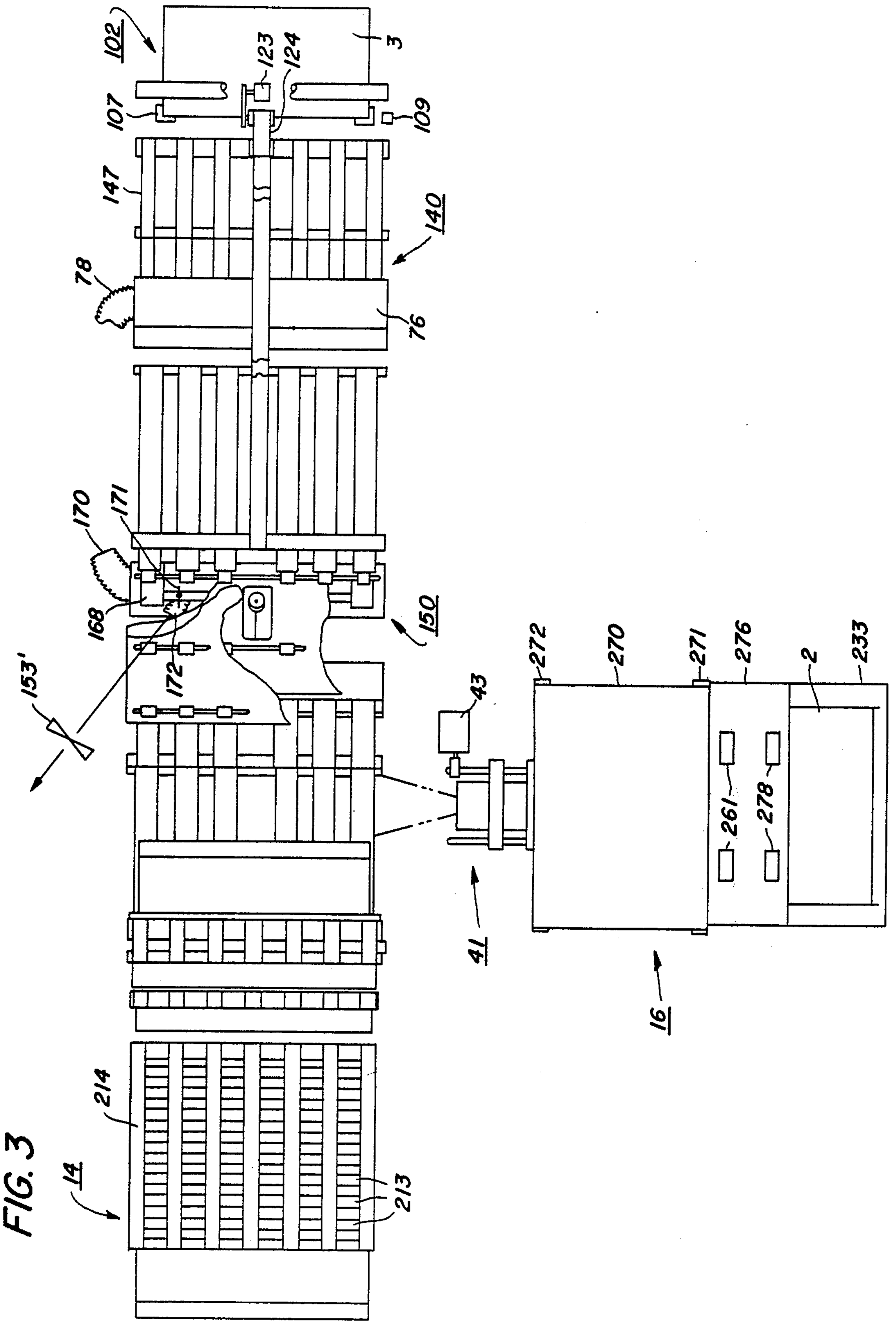
FIG. 3 is a top plan view of the apparatus shown in FIG. 1.

Referring particularly to FIGS. 1–3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imageing medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
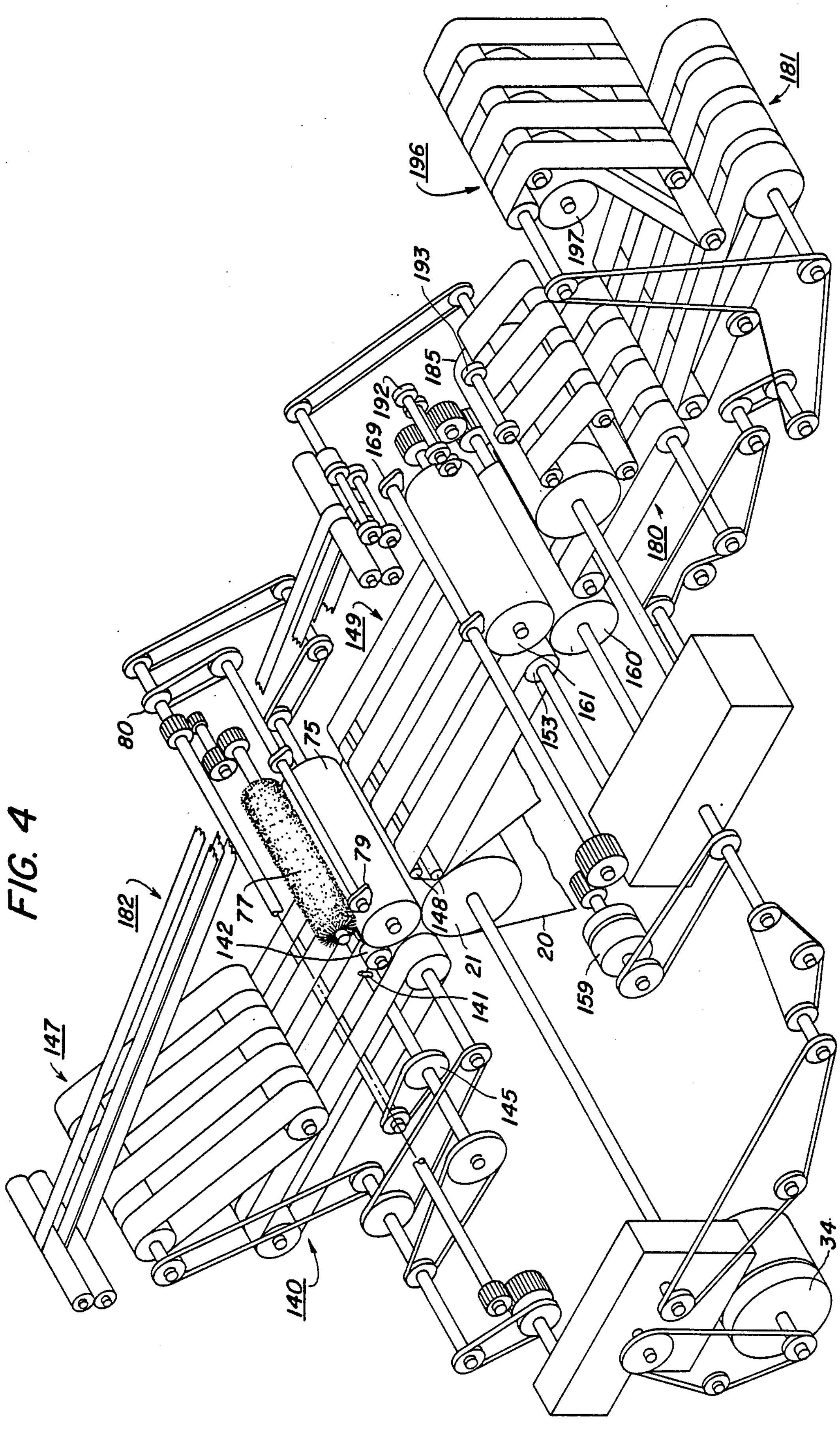
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined positions and combinations to provide the preselected image sizes corresponding to push button selectors 818, 819, 820 on operator module 800. (See FIG. 32) Sensors 116, 117, 118 signal the present disposition of lens assembly 41. Exposure of the previously charged belt 20 selectively discharges the photoconductive belt to produce on belt 20 an electrostatic latent image of the orignial 2. To prepare belt 20 for imaging, belt 20 is uniformly charged to a preselected level by charge corotron 42 upstream of the exposure station 27.

Figure 5:
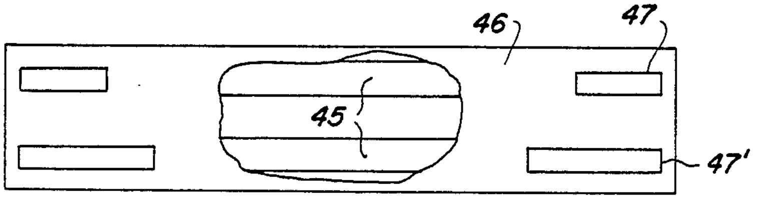
FIG. 5 is an enlarged view showing details of the photoreceptor edge fade-out mechanism for the apparatus shown in FIG. 1.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47′ of differing length adjacent each edge of belt 20. By selectively actuating one or the other of the lamps 45, the width of the area bordering the sides of the image that is erased can be controlled.

Figure 6:
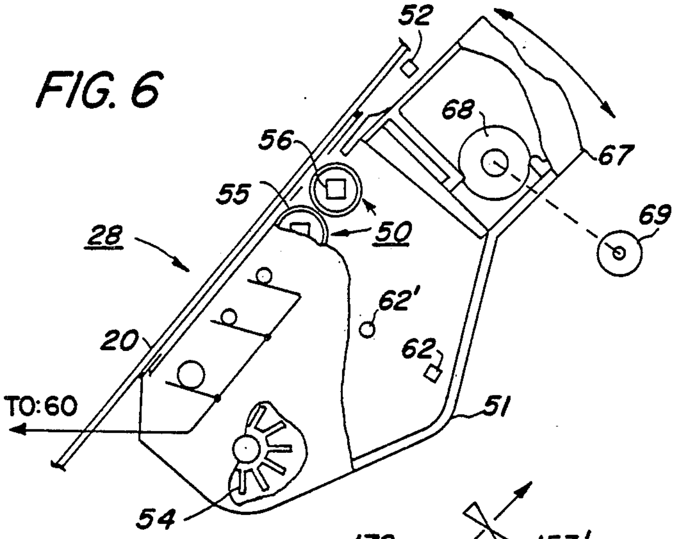
FIG. 6 is an enlarged view showing details of the developing mechanism for the apparatus shown in FIG. 1.
Figure 7:
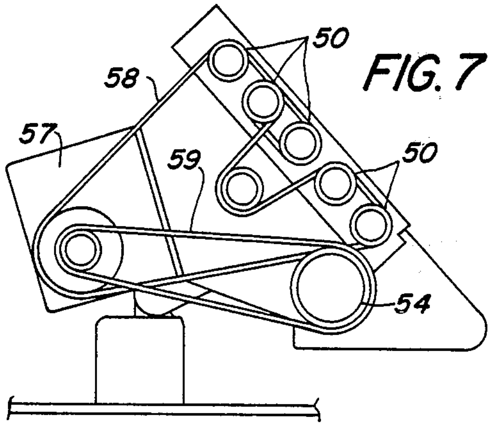
FIG. 7 is an enlarged view showing details of the developing mechanism drive.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Figure 8:
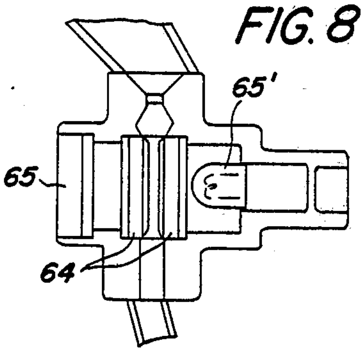
FIG. 8 is an enlarged view showing details of the developability control for the apparatus shown in FIG. 1.
Figure 11:
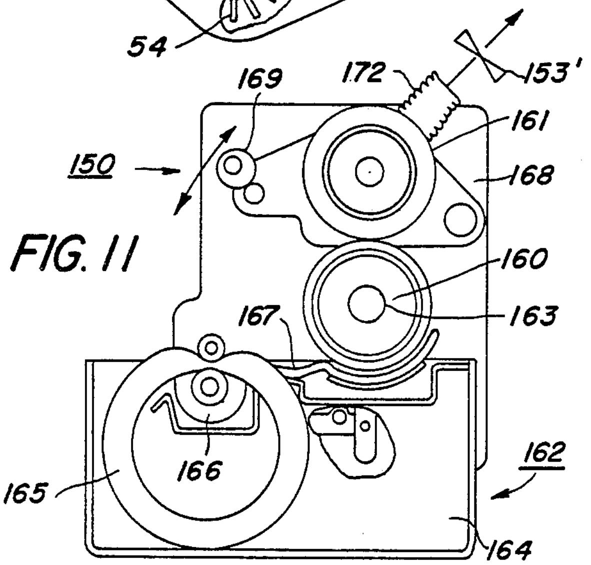
FIG. 11 is an enlarged view showing details of the fuser for the apparatus shown in FIG. 1.

Developing material is returned to the upper portion of developer housing 51 for reuse and is accomplished by utilizing a photocell 62 which monitors the level of developing material in housing 51 and a photocell lamp 62′ spaced opposite to the photocell 62 in cooperative relationship therewith. The disclosed machine is also provided with automatic developability control which maintains an optimum proportion of toner-to-carrier material by sensing toner concentration and replenishing toner, as needed. As shown in FIG. 8, the automatic developability control comprises a pair of transparent plates 64 mounted in spaced, parrallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65′ on the opposite side of plate pair 64 provides reference illumination. In this arrangement, the returning developing material is alternately attracted and repelled to and from plate 64. The accumulation of toner, i.e. density determines the amount of light transmitted from lamp 65′ to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Figure 9:
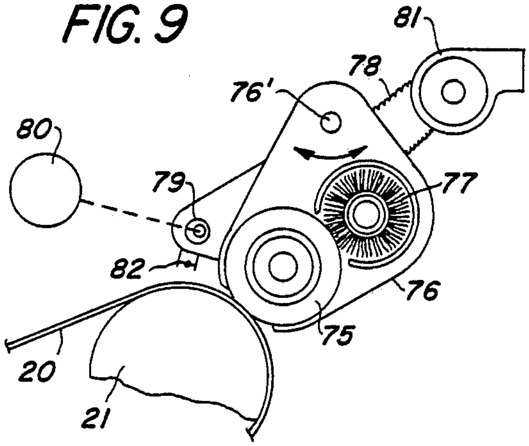
FIG. 9 is an enlarged view showing details of the transfer roll support mechanism for the apparatus shown in FIG. 1.
Figure 12:
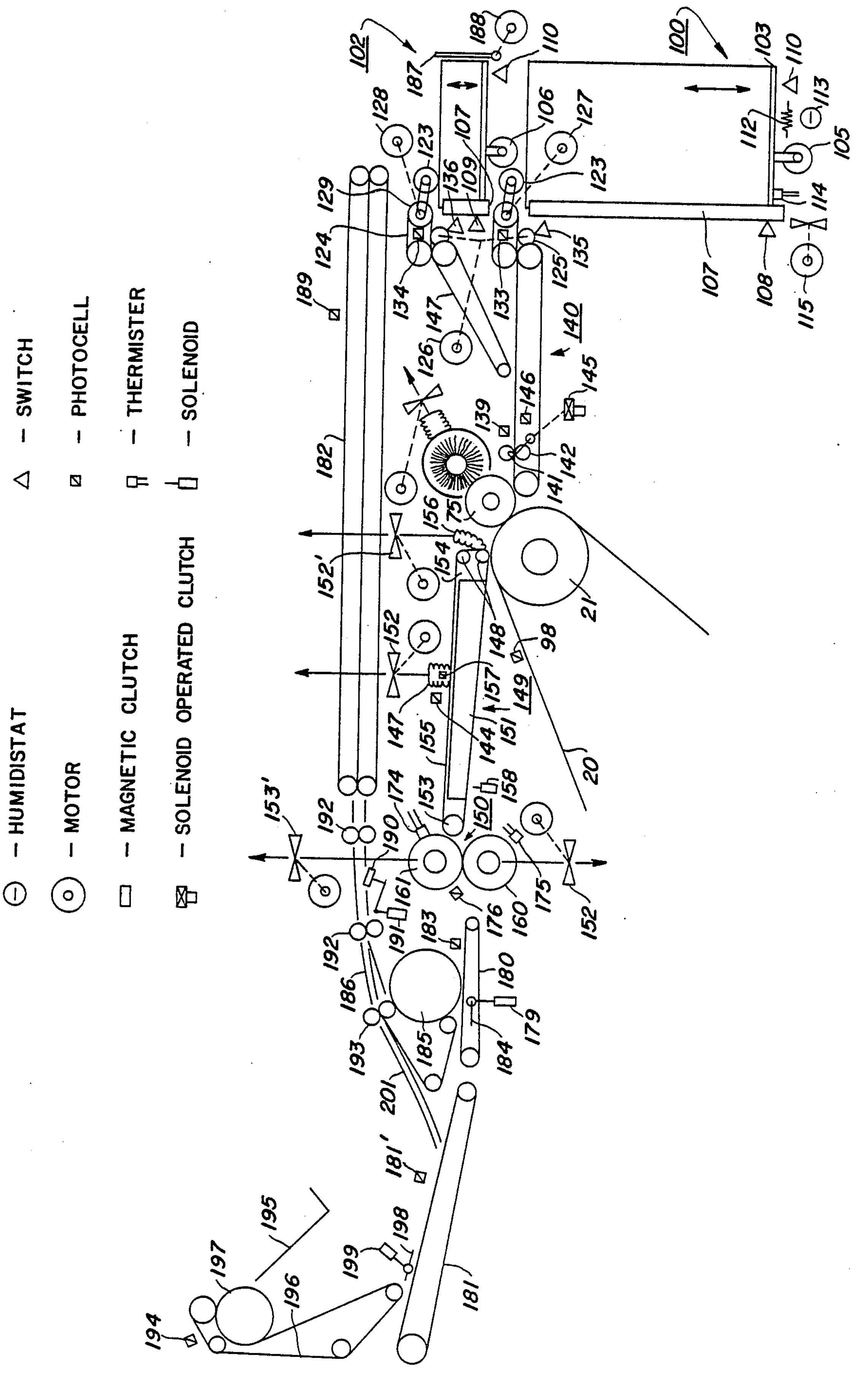
FIG. 12 is a schematic view showing the paper path and sensors of the apparatus shown in FIG. 1.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing opposite belt support roll 21. Housing 76 is pivotally mounted at 76′ to permit the transfer roll assembly to be moved into and out of operative relationship with belt 20. A transfer roll cleaning brush 77 is rotatably journalled in transfer roll housing 76 with the brush periphery in contact with transfer roll 90. Transfer roll 75 is driven through contact with belt 20 while cleaning brush 77 is coupled to main drive motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Figure 10:
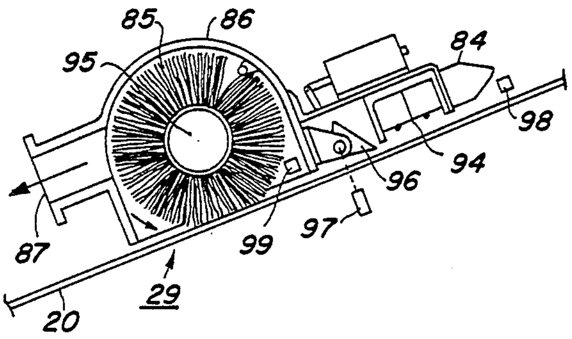
FIG. 10 is an enlarged view showing details of the photoreceptor cleaning mechanism for the apparatus shown in FIG. 1.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semicircular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of vacuum pump 93. A final filter 89 on the outlet of motor 93 traps particles that pass through separator 88. The heavier toner particles separated by separator 88 drop into and are collected in one or more collecting bottles 90. Pressure sensor 91 monitors the condition of final filter 89 while a sensor 92 monitors the level of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106. Side guide pairs 107, in each tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and theremostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagnetic clutch 145. A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 147 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 4, 10 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termed oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in the lower portion of fuser housing 162 serves to move housing section 168 and pressure roll 161 into operative relaitonship with fusing roll 160 against a suitable bias (not shown). Cam shaft 169 is coupled to main motor 34 through an electromagnetically operated one revolution clutch 159.

Fuser section 168 is evacuated, conduit 170 coupling housing section 168 with vacuum pump 152. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181 or, where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. The forward stop 187 of tray 102 is supported for oscillating movement. Motor 188 drives stop 187 back and forth tap sheets returned to auxiliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. Pinch roll pairs 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
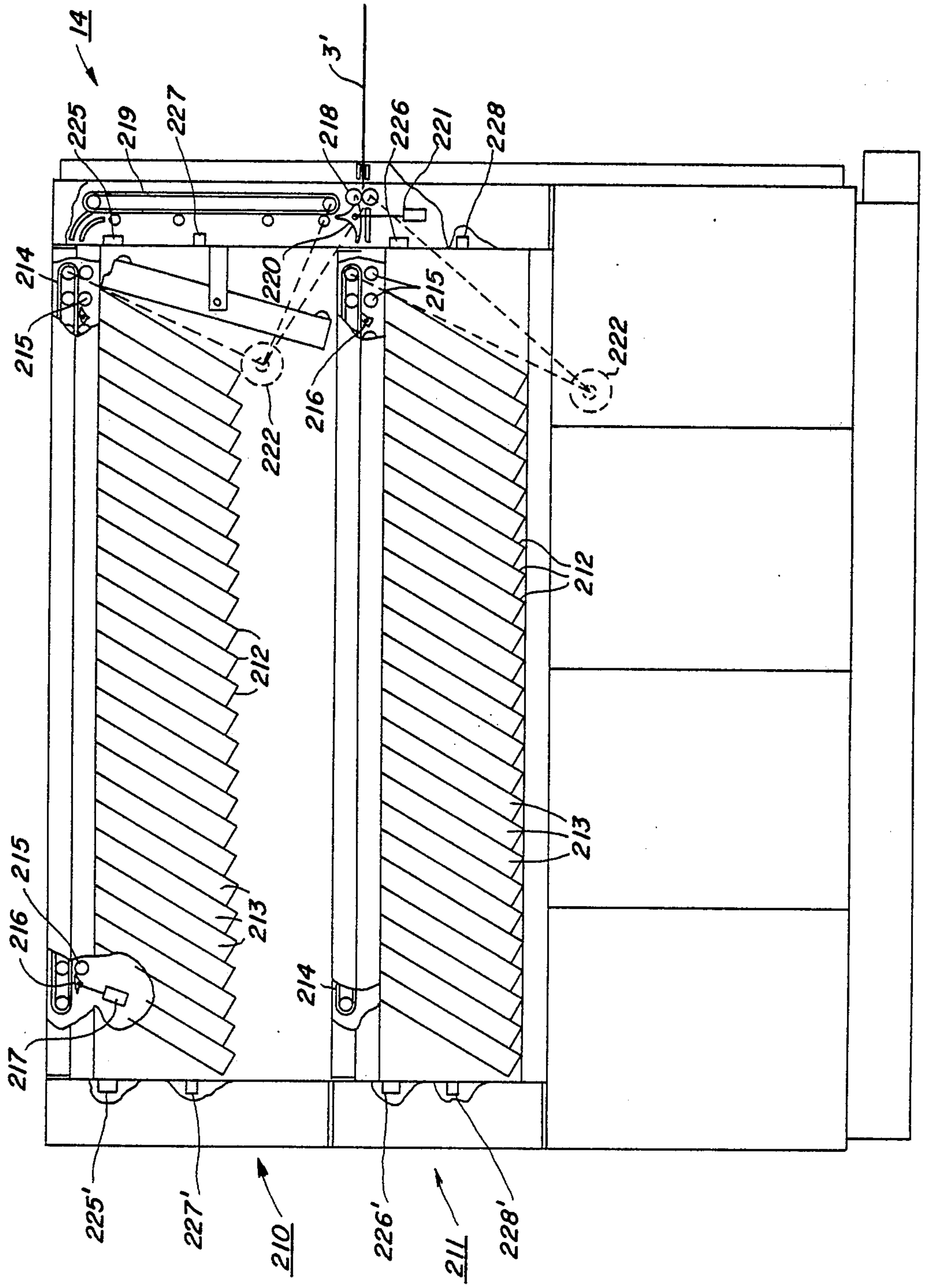
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual defelctors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided for each bin array to drive the conveyors 214 and 219 of upper bin array 210 and conveyor 214 of lower bin array 211. Roll pair 218 is drivingly coupled to both motors.

To detect entry of copies 3' in the individual bins 213, a photoelectric type sensor 225, 226 is provided at one end of each bin array 210, 211 respectively. Sensor lamps 225', 226' are disposed adjacent the other end of the bin arry. To detect the presence of copies in the bins 213, a second set of photoelectric type sensors 227, 228 is provided for each bin array, on a level with a tray cutout (not shown). Reference lamps 227', 228' are disposed opposite sensors 227, 228.

DOCUMENT HANDLER

Figure 14:
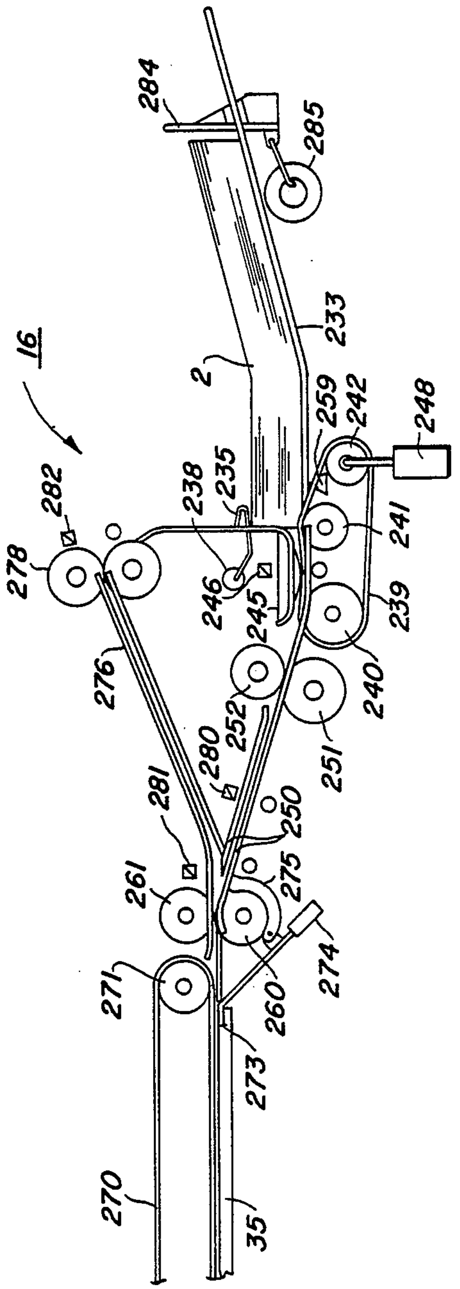
FIG. 14 is a schematic view showing details of the document handler for the apparatus shown in FIG. 1.
Figure 15:
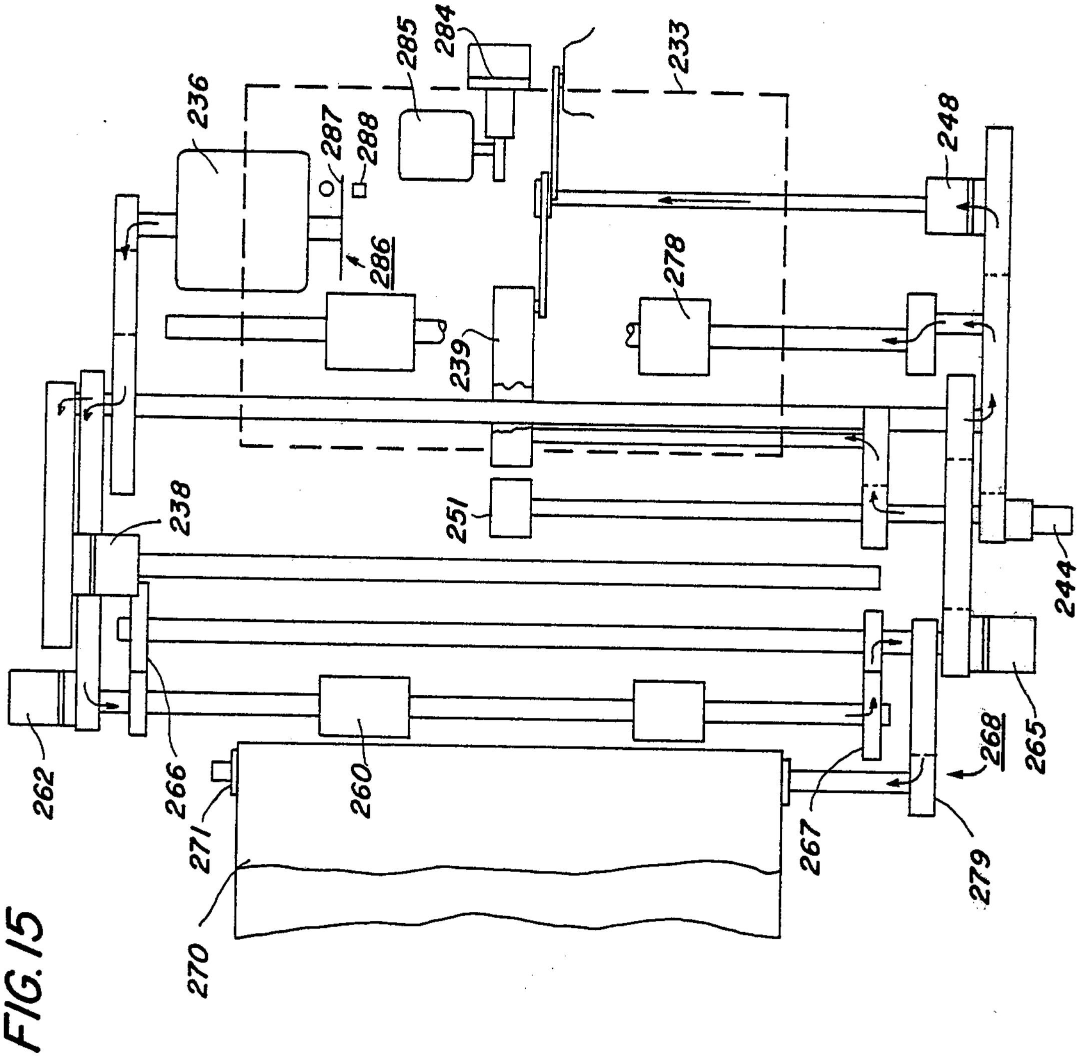
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid operated clutch 248 which raises kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto plate 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1, clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34, and the machine components driven therefrom.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
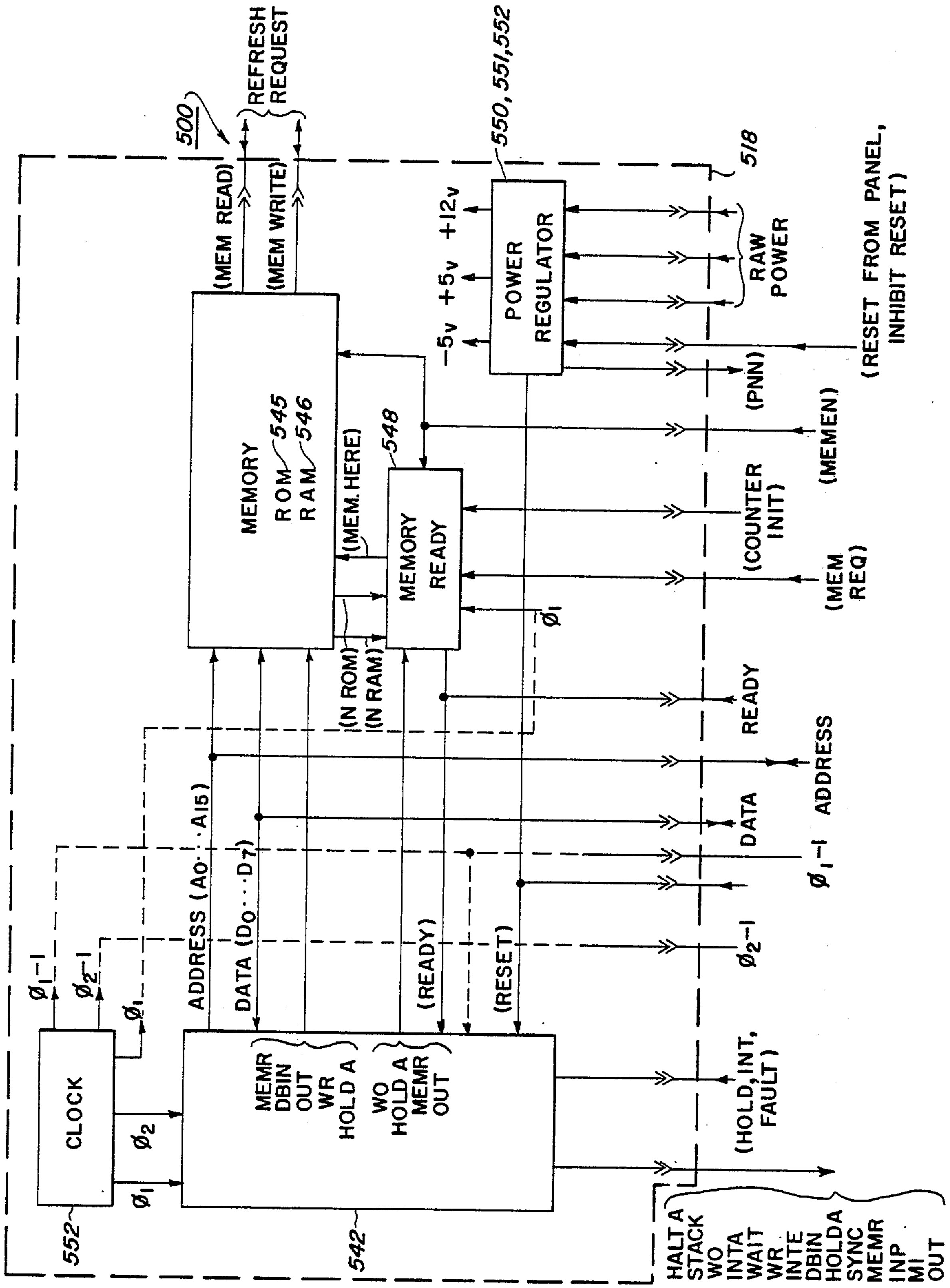
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock such as clock 552 of FIG. 17, is utilized to control internal operations of the controller 18 as is known in the art.

CONTROLLER

Figure 16:
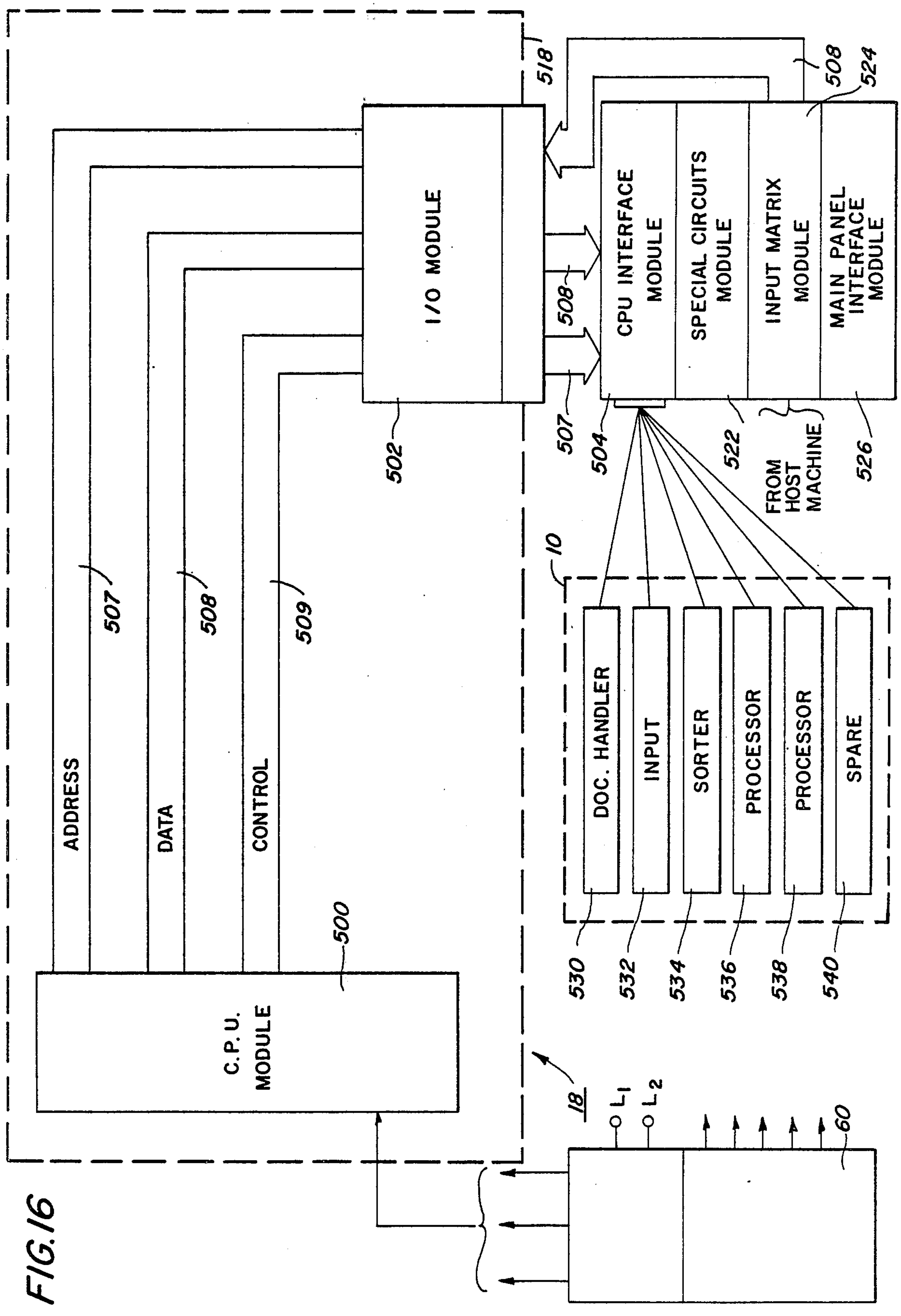
FIG. 16 is a block diagram of the controller for the apparatus shown in FIG. 1.

Referring to FIG. 16, controller 18 includes a Central Processor unit (CPU) Module 500, Input/Output (I/O) Module 502, and Interface 504. Address, Data and Control Buses 507, 508, 509 respectively operatively couple CPU Module 500 and I/O Module 502. CPU Module 500 I/O Module 502 are disposed within a shield 518 to prevent noise interference.

Interface 504 couples I/O Module 502 with special circuits module 522, input matrix module 524, and main panel interface module 526. Module 504 also couples I/O Module 502 to operating sections of the machine, namely, document handler section 530, input section 532, sorter section 534 and processor sections 536, 538. A spare section 540, which may be used for monitoring operation of the host machine, or which may be later utilized to control other devices, is provided.

Figure 18A:
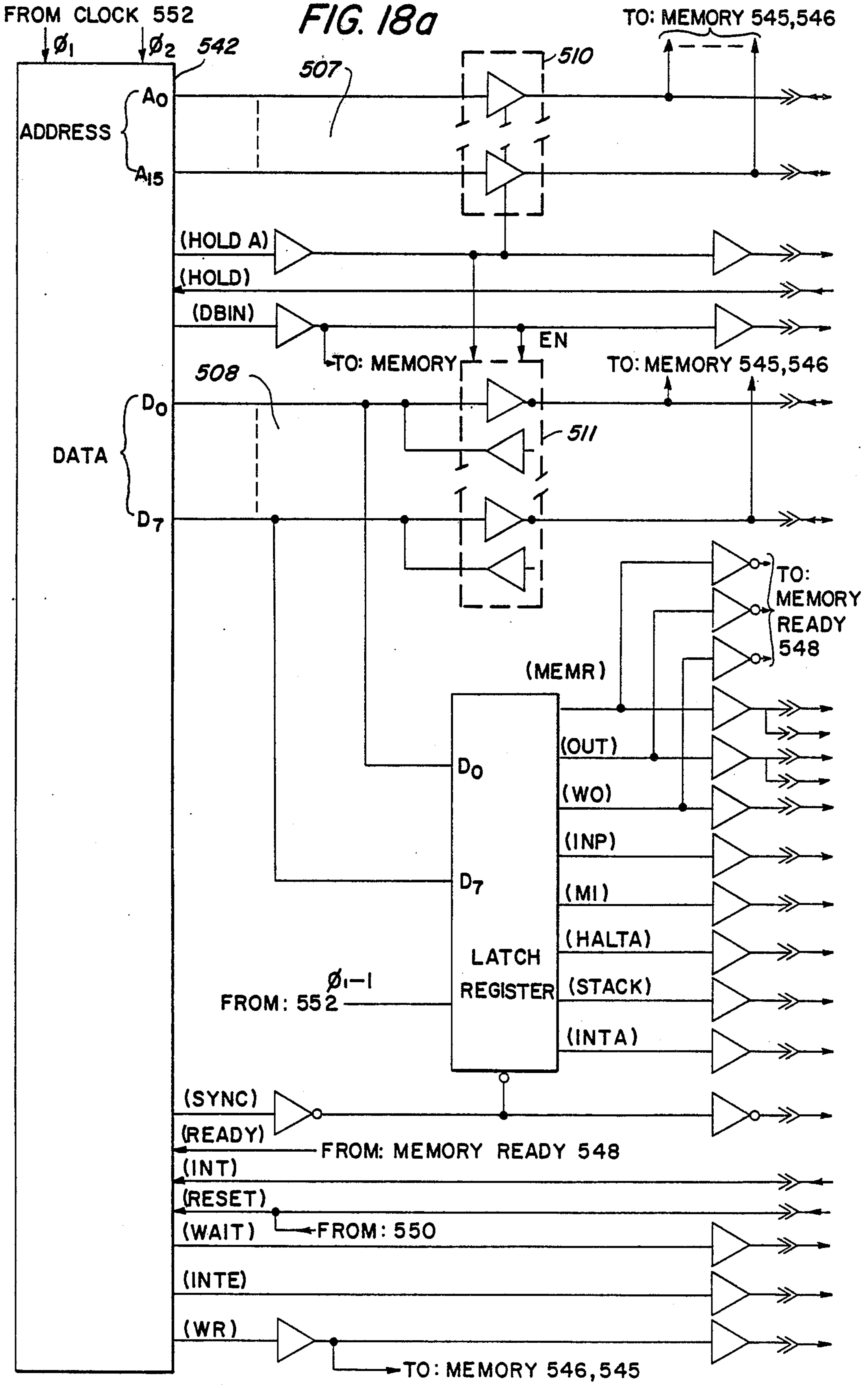
FIG. 18*a* is a block diagram showing the CPU microprocessor input/output connections.
Figure 18B:
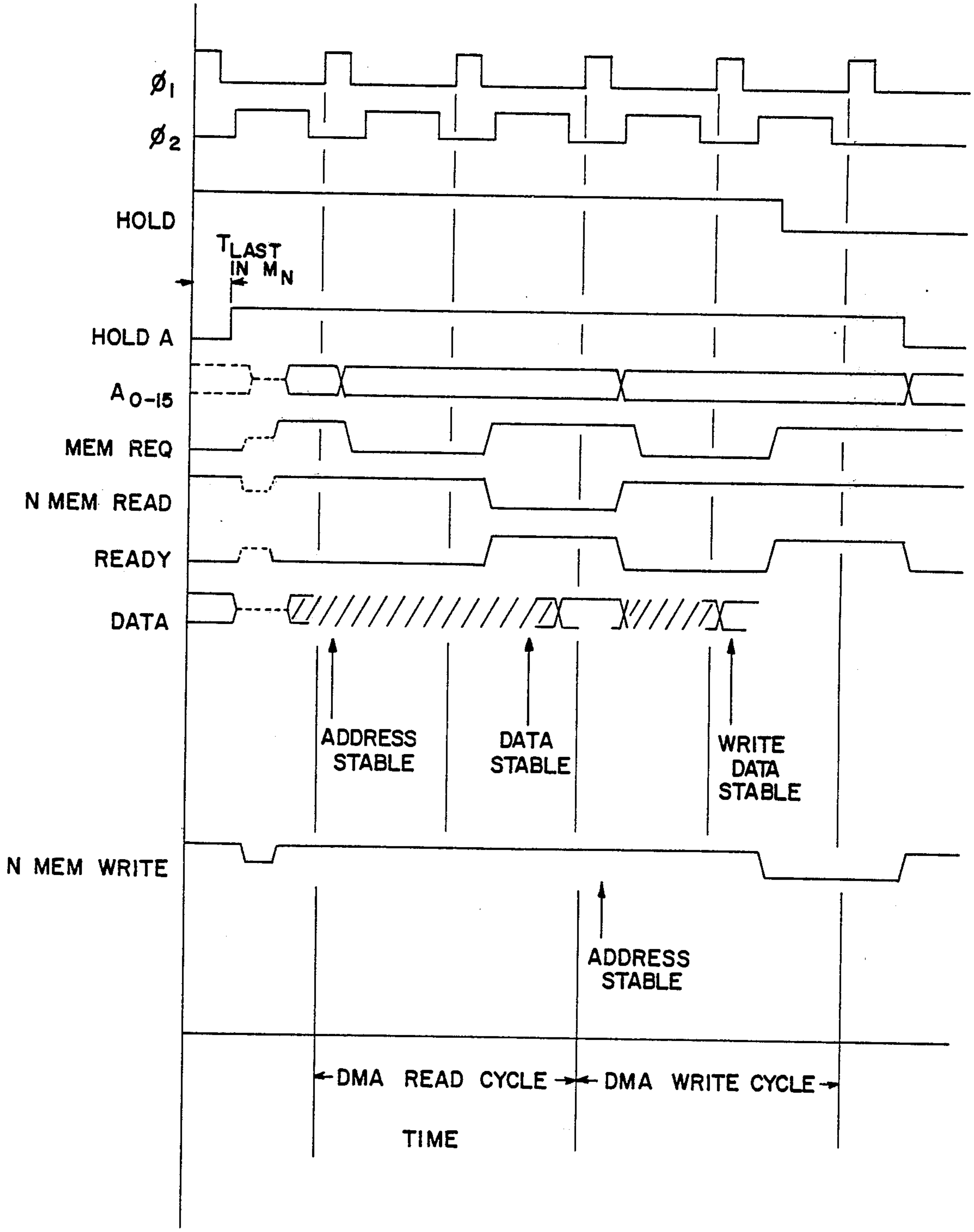
FIG. 18*b* is a timing chart of Direct Memory access (DMA) Read and Write cycles.

Referring to FIGS. 17, 18, CPU module 500 comprises a processor 542 such as an Intel 8080 microprocessor manufactured by Intel Corporation, Santa Clara, California, 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
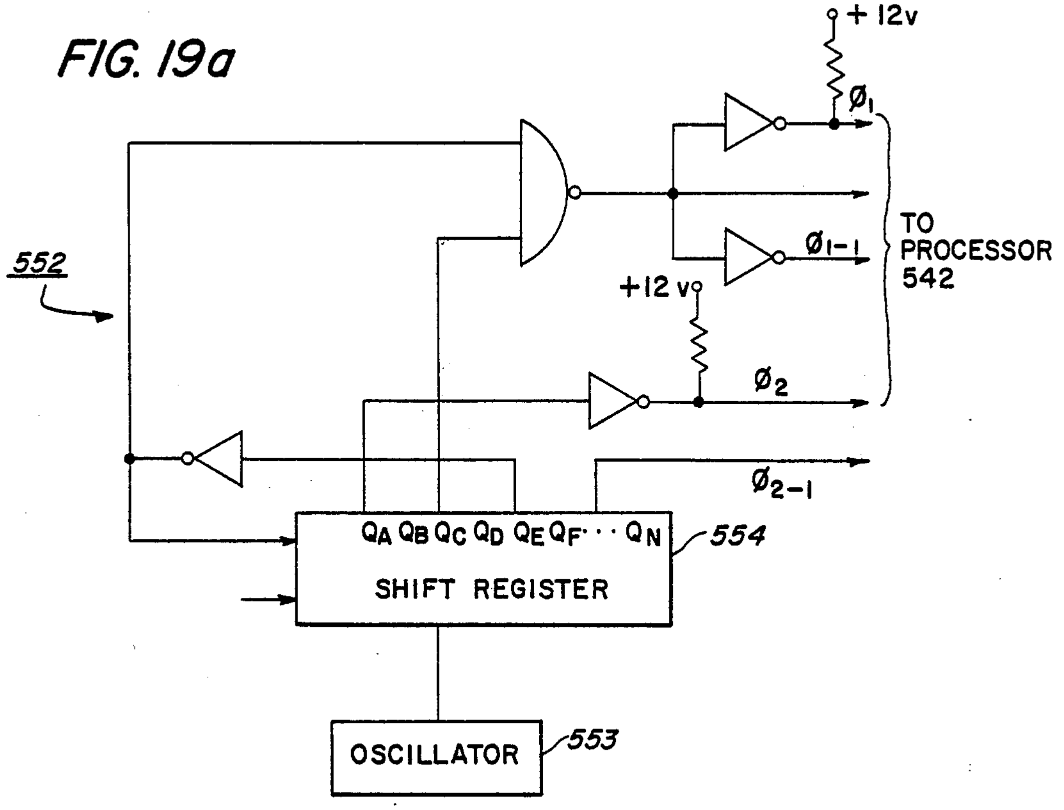
FIG. 19*a* is a logic schematic of the CPU clock.
Figure 19B:
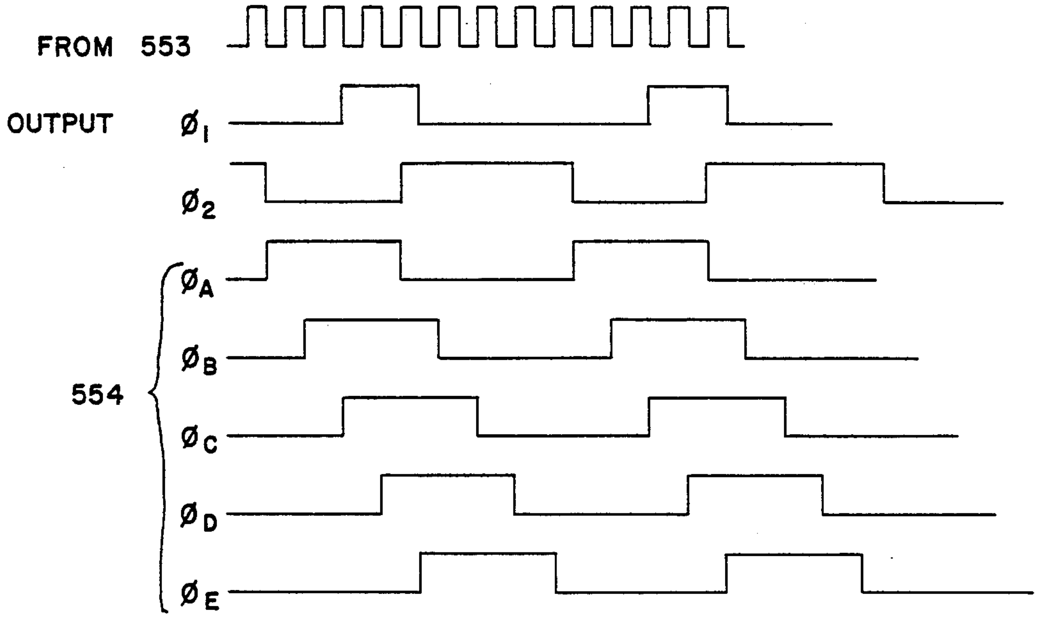
FIG. 19*b* is a chart illustrating the output wave form of the clock shown in FIG. 19*a;*

Referring particularly to FIG. 19, clock 552 comprises a suitable clock oscillator 553 feeding a multi-bite (Qa–Qn) shift register 554. Register 554 includes an internal feedback path from one bit to the serial input of register 554. Output signal waveforms $\phi_1$, $\phi_2$, $\phi_{1\text{-}1}$ and $\phi_{2\text{-}1}$ are produced for use by the system.

Figure 20:
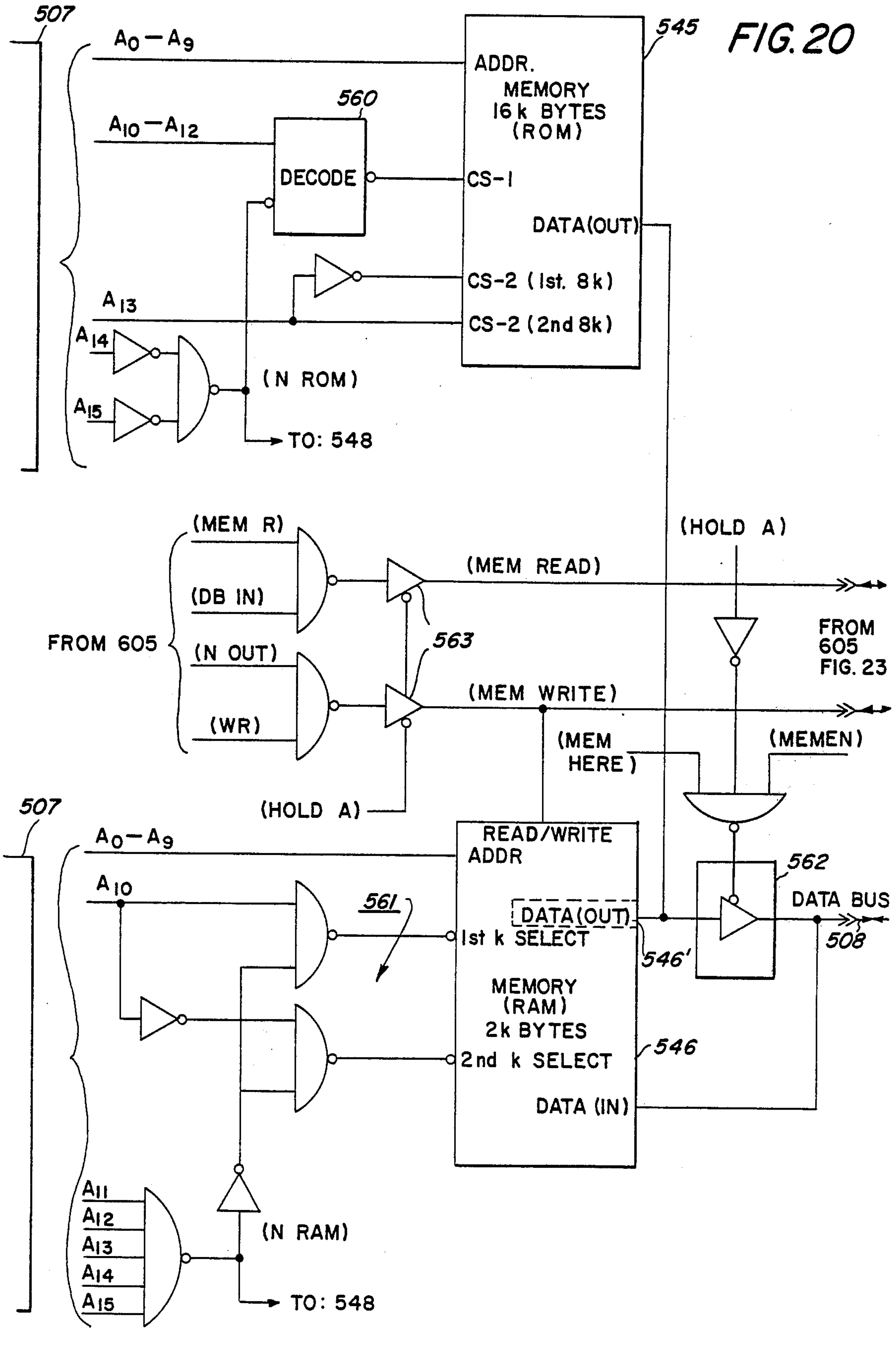
FIG. 20 is a logic schematic of the CPU memory.

Referring to FIG. 20, the memory bytes in ROM section 545 are implemented by address signals (A0–A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16K of the total 64 bytes of the addressing space. The memory bytes in RAM section 546 are implemented by Address signals (Ao–A 15) through selector circuit 561. Address bit A 10 serves to select the memory bank while the remaining five most significant bits (A 11–A 15) select the last 2K bytes out of the 64K bytes of addressing space. RAM memory section 546 includes a 40 bit output buffer the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 to access MEM READ and MEM WRITE control channels directly on a DMA signal (HOLD A) from processor 542 as will appear.

Referring to FIG. 21, memory ready section 548 provides a READY signal to processor 542. A binary counter 566, which is initialized by a SYNC signal ($\phi$,)

to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
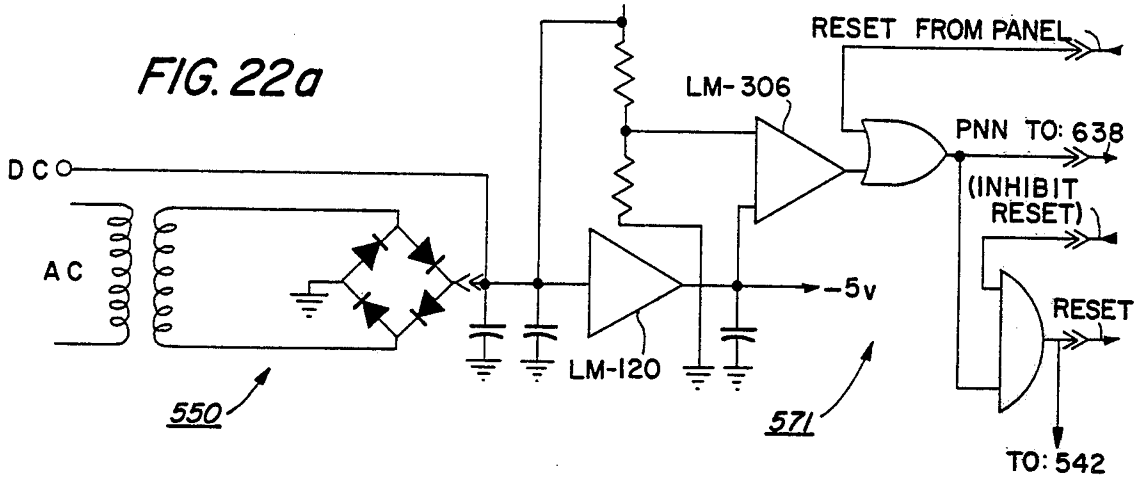
FIGS. 22*a*, 22*b*, 22*c* are logic schematics of the CPU power supply stages.
Figure 22B:
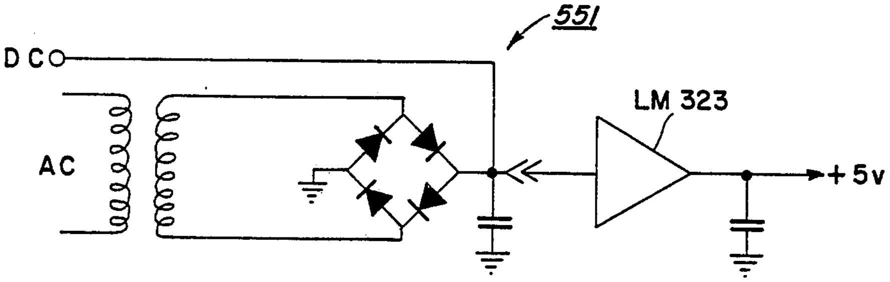
Figure 22C:
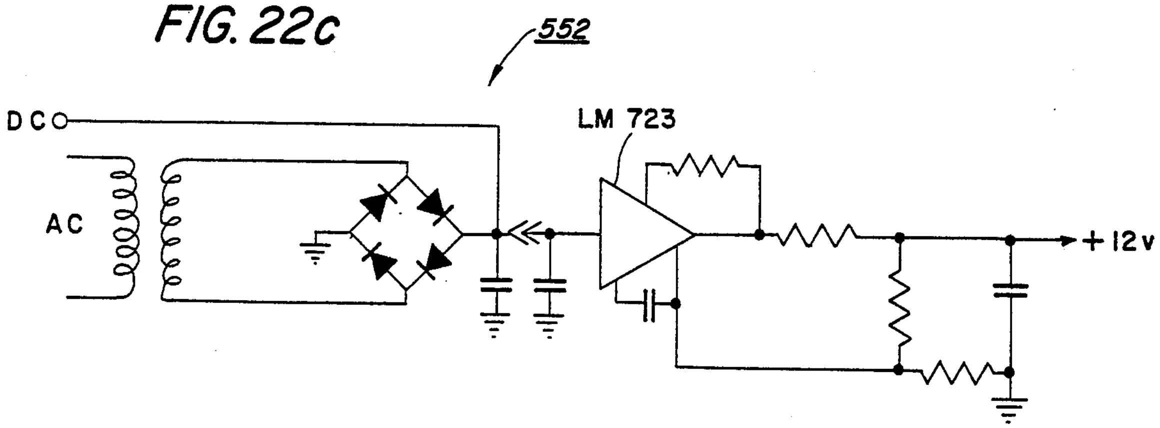

Referring to FIG. 22, power regulators 550, 551, 552 provide the various voltage levels, i.e. +5 v, +12 v, and −5 v D.C. required by the module 500. Each of the three on board regulators 550, 551, 552 employ filtered D.C. inputs. Power Not Normal (PNN) detection circuitry 571 is provided to reset processor 542 during the power up time. Panel reset is also provided via PNN. An enabling signal (INHIBIT RESET) allows completion of a write cycle in Non Volatile (N.V.) Memory 610 of I/O Module 502.

Figure 23A:
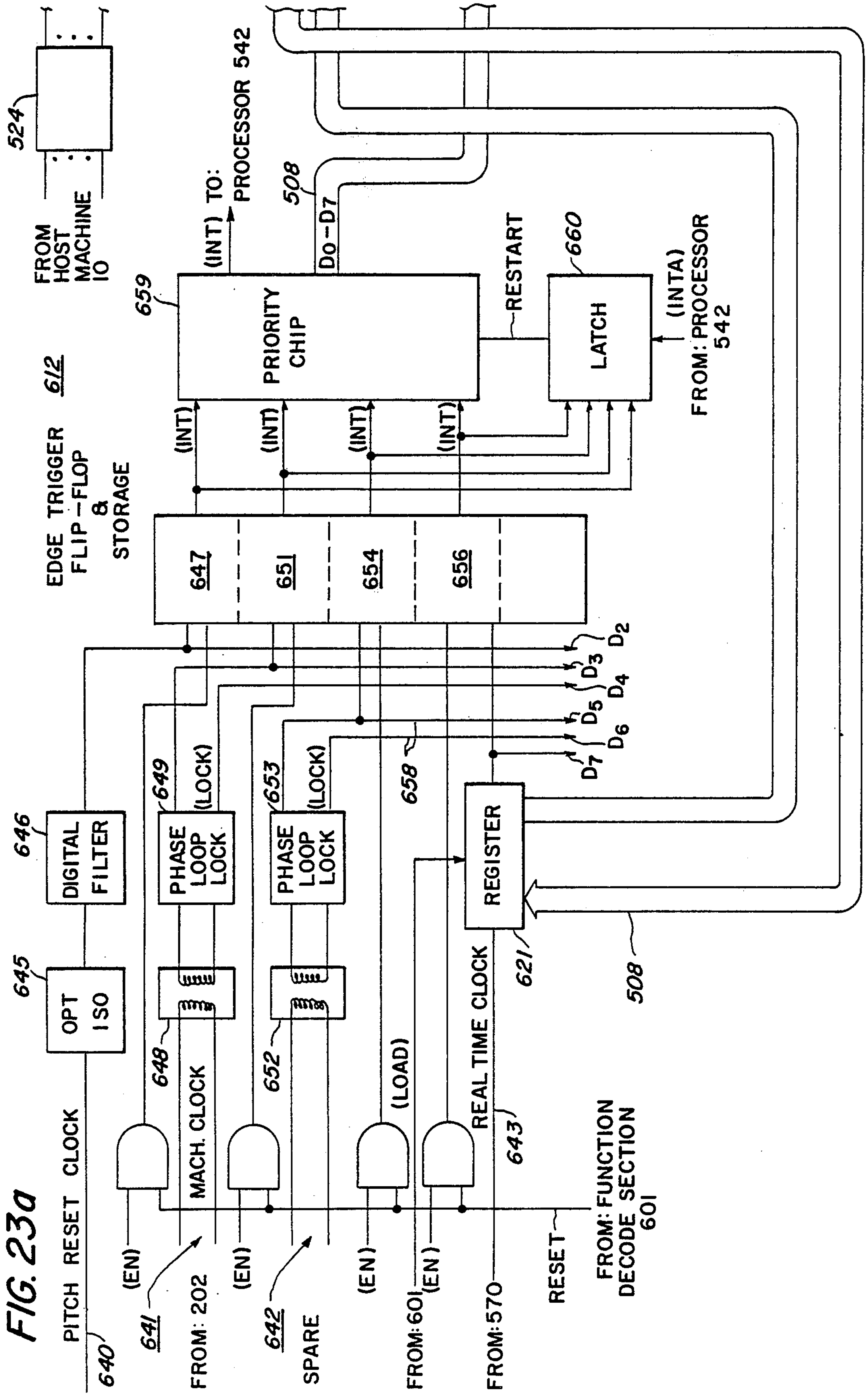
FIGS. 23*a* and 23*b* comprise a block diagram of the controller I/O module.

Referring to FIGS. 18, 20, 21, and the DMA timing chart (FIG. 18*a*) data transfer from RAM section 546 to host machine 10 is effected through Direct Memory Access (DMA), as will appear. To initiate DMA, a signal (HOLD) is generated by Refresh Control 605 (FIG. 23*a*). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Figure 23B:
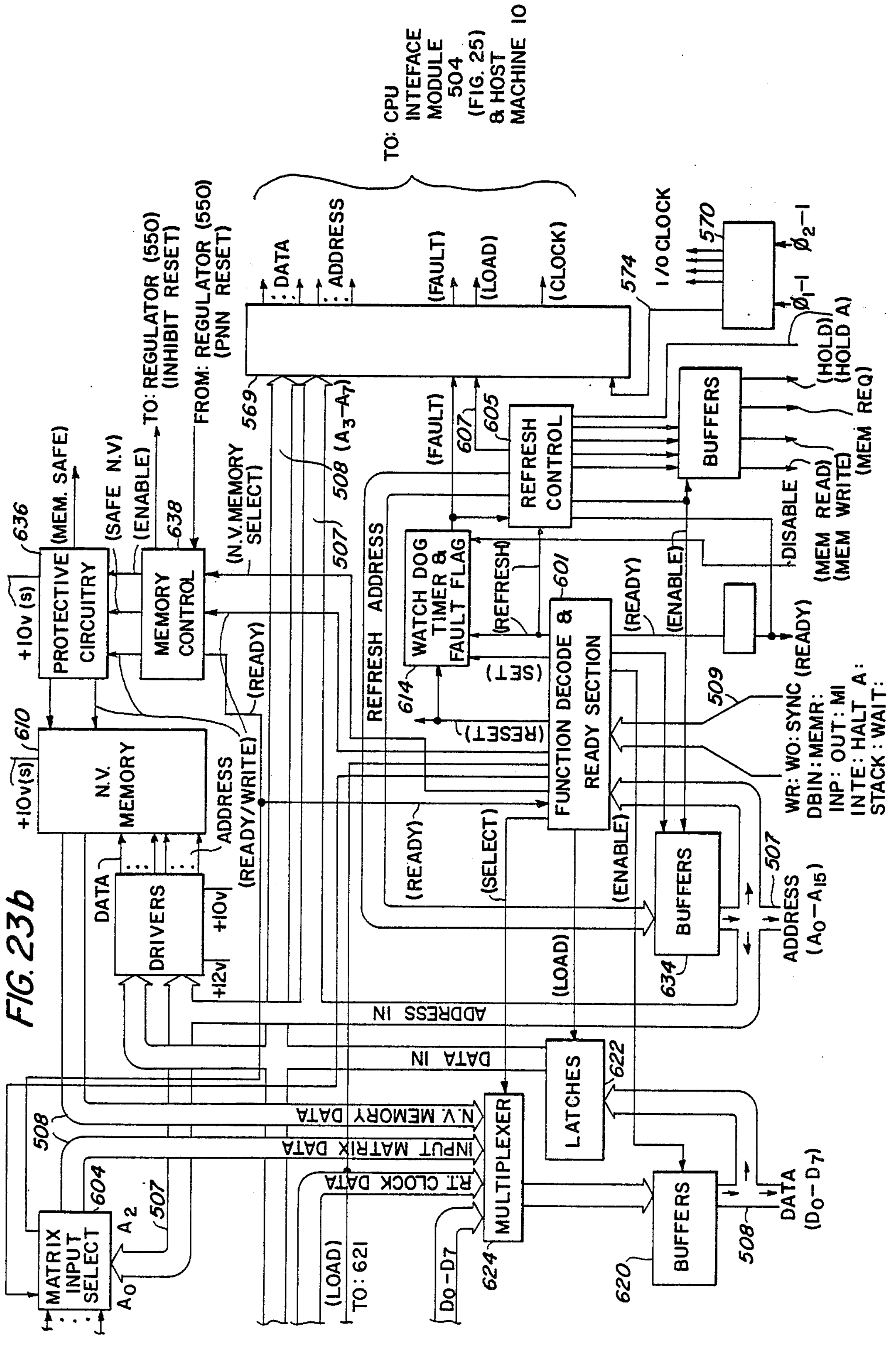

Referring to FIG. 23, I/O Module 502 interfaces with CPU module 500 through bi-directional Address, Data and Control buses 507, 508, 509. I/O Module 502 appears to CPU module 500 as a memory portion. Data transfers between CPU and I/O modules 500, 502, and commands to I/O module 502 except for output refresh are controlled by memory reference instructions executed by CPU module 500. Output refresh which is initiated by one of several uniquely decoded memory reference commands, enables Direct access (DMA) by I/O module 502 to RAM section 546.

I/O module 502 includes Matrix Input select 604 (through which inputs from the host machine 10, are received), Refresh Control 605, Nonvolatile (NV) memory 610, Interrupt Control 612, Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits Ao–A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 from data bus 508; and (i) resetting the Watch Dog timer or setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25 m sec) a fault flip flop is set and a signal (FAULT) sent to the host machine 10. The signal (FAULT) also raises the HOLD line to disable CPU Module 500. Clearing of the fault flip flop may be by cycling power or generating a signel (RESET). A selector (not shown) may be provided to disable (DISABLE) the watch dog timer when desired. The fault flip flop may also be set by a command from the CPU Module to indicate that the operating program detected a fault.

Matrix Input select 604 has capacity to read up to 32 groups of 8 discrete inputs from host machine 10. Lines $A_3$ through $A_7$ of Address bus 507 are routed to host machine 10 via CPU Interface Module 504 to select the desired group of 8 inputs. The selected inputs from machine 10 are received via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from RAM memory output buffer 546′ to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 to the high impedance state giving I/O module 502 control thereover. I/O module 502 then sequentially accesses the 32 memory words from output buffer 546′ (REFRESH ADDRESS) and transfers the contents to the host machine 10. CPU Module 500 is dormant during this period.

A control signal (LOAD) in line 607 along with the predetermined clock rate determined by the clock signal (CLOCK) in line 574 is utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

N.V. memory 610 comprises a predetermined number of bits of nonvolatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIGS. 23(*a*) and 34, the highest priority interrupt signal, Pitch reset signal 640, is generated by the signal output of pitch reset clock 138. The clock signal is fed via optical isolator 645 and digital filter 646 to edge trigger flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module 500. On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}$, $\phi_{2-1}$ of processor clock 552 (FIG. 19*a*). As described, clock 570 provides a reference clock pulse (in line 574) for synchronizing the output refresh data and is the source of clock pulses (in line 643) for driving Real Time register 621.

Figure 25:
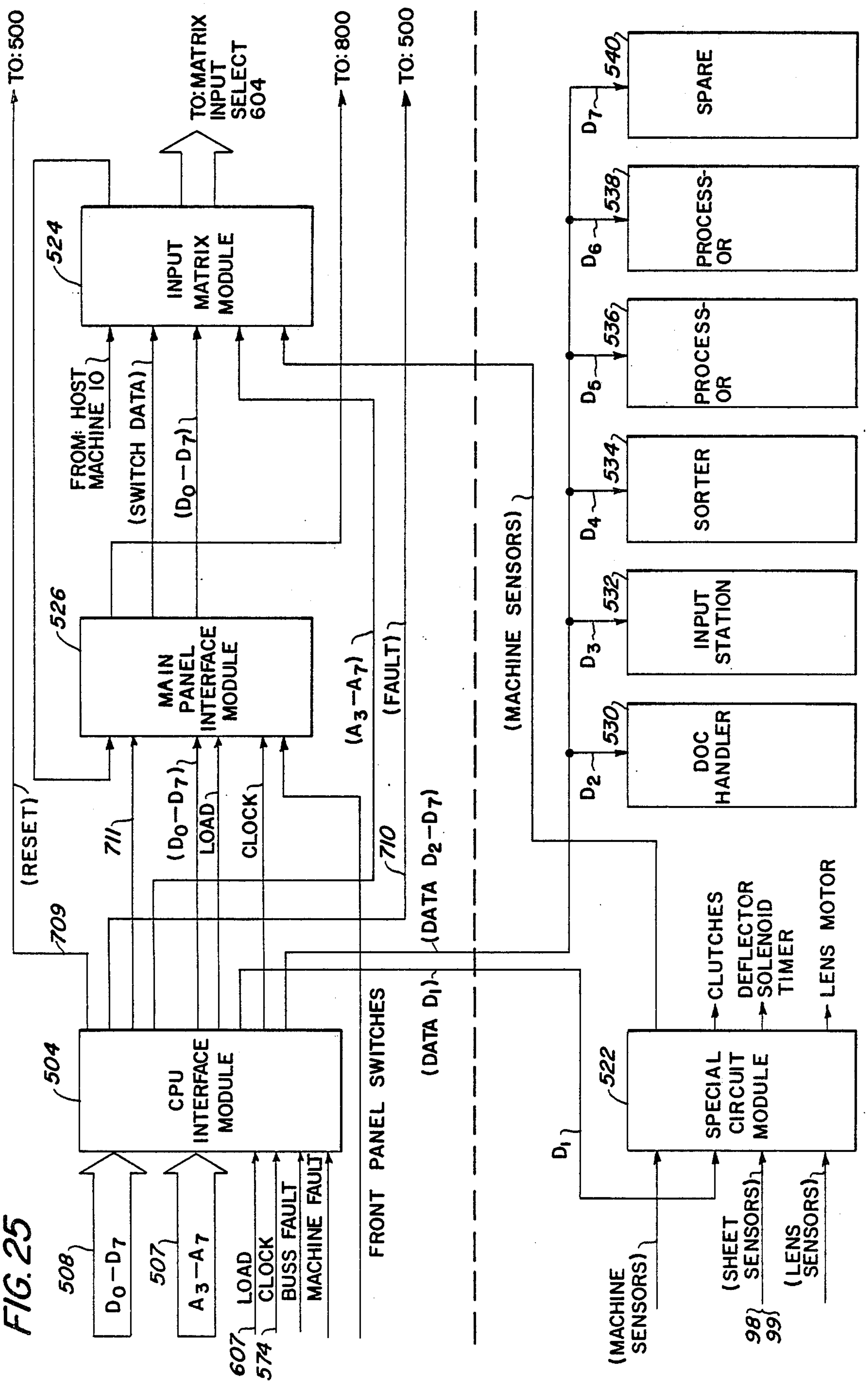
FIG. 25 is a block diagram of the apparatus interface and remote output connections.
Figure 26:
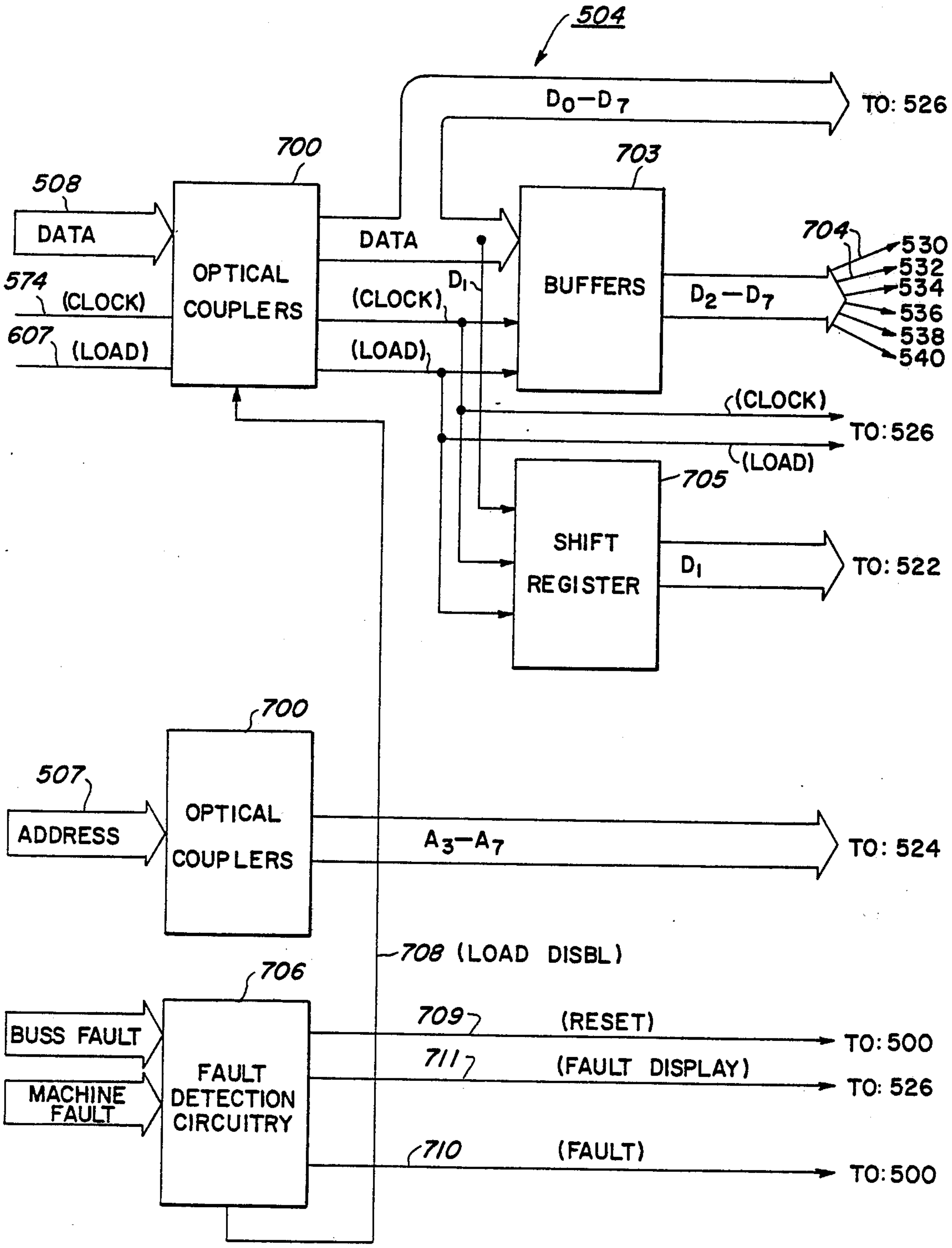
FIG. 26 is a block diagram of the CPU interface module.

CPU interface module 504 interfaces I/O module 502 with the host machine 10 and transmits operating data stored in RAM section 546 to the machine. Referring particularly to FIGS. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0–D7. As best seen in FIG. 25, each data channel D0–D7 has an assigned output function with data channel D0 being used for operating the front panel lamps 830 in the digital display, (see FIG. 32), data channel D1 for special circuits module 522, and remaining data channels D2–D7 allocated to the host machine operating sections 530, 532, 534, 536, 538 and 540. Portions of data channels D1–D7 have bits reserved for front panel lamps and digital display.

Since the bit capacity of the data channels D2–D7 is limited, a bit buffer 703 is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy", the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$ destined for special circuits module 522 is inputted to shift register type storage circuitry 705 for transmittal to module 522. Data is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperture as detected by sensor 175, etc. In the event of a bus fault, a reset signal (RESET) is generated automatically in line 709 to CPU module 500 (see FIGS. 17 and 18) until the fault is removed. In the event of a machine fault, a signal is generated by the CPU in line 710 to actuate a suitable relay (not shown) controlling power to all or a portion of host machine 10. A load disabling signal (LOAD DISBL) is inputted to optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Figure 27:
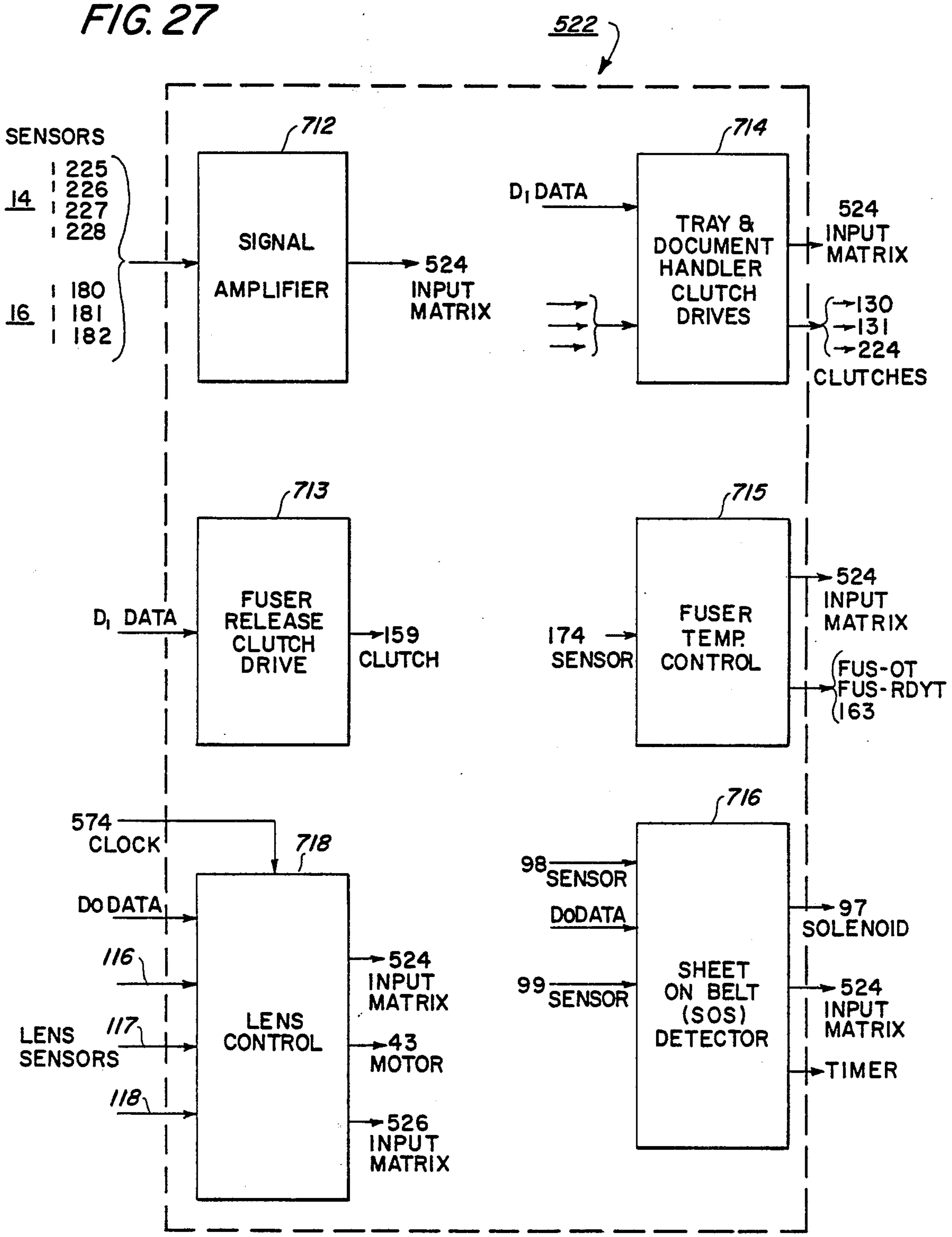
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser releaser clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUS-OT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDUT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Figure 28:
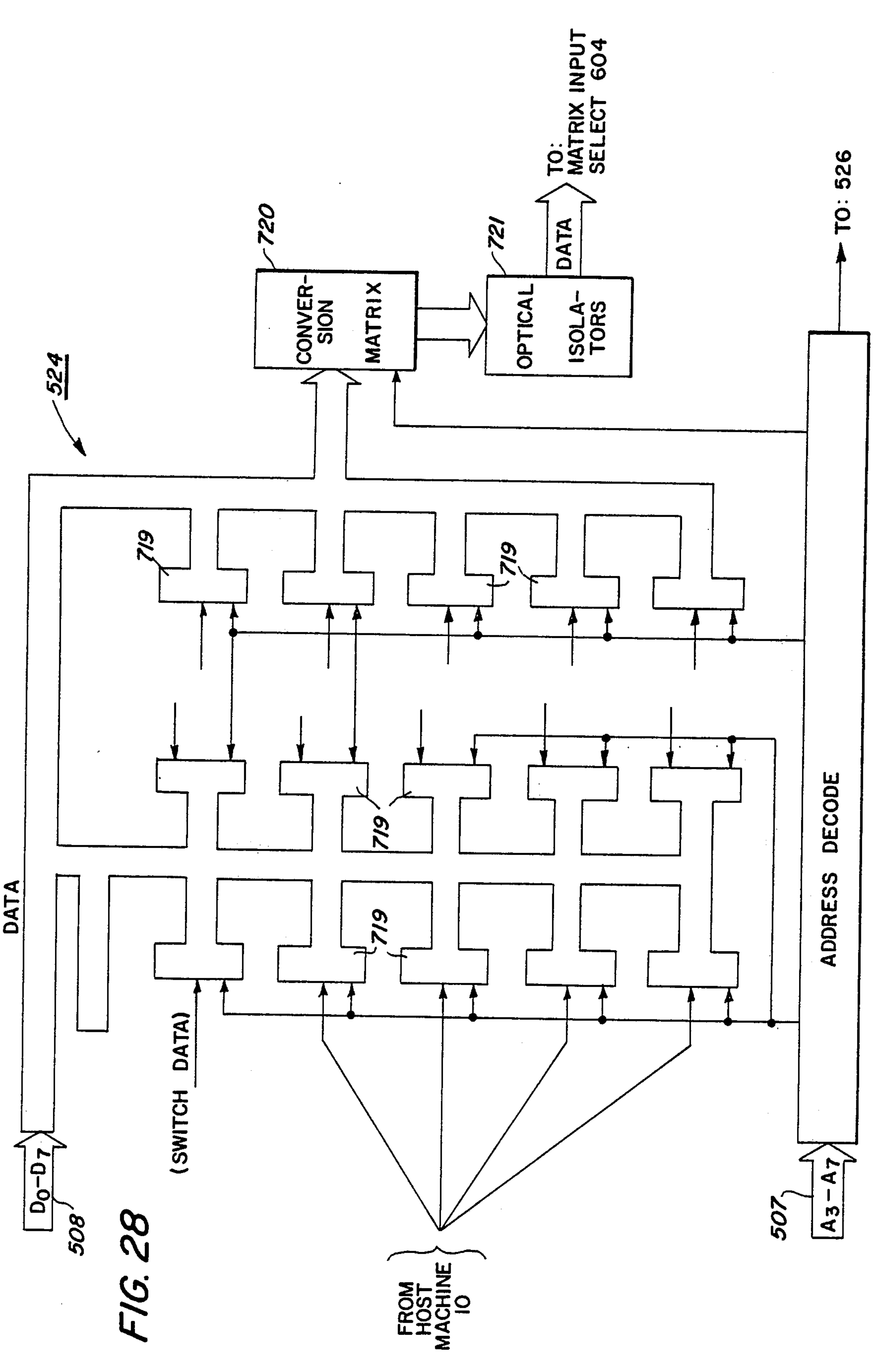
FIG. 28 is a block diagram of the main panel interface module.

Referring to FIG. 28, input matrix module 524 provides analog gates 719 for receiving data from the various host machine sensors and inputs (i.e. sheet sensors 135, 136; pressure sensor 157; etc), module 524 serving to convert the signal input to a byte oriented output for transmittal to I/O module 502 under control of Input Matrix Select 604. The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 and Input Matrix Select 604 of I/O module 502 to CPU Module 500.

Figure 29:
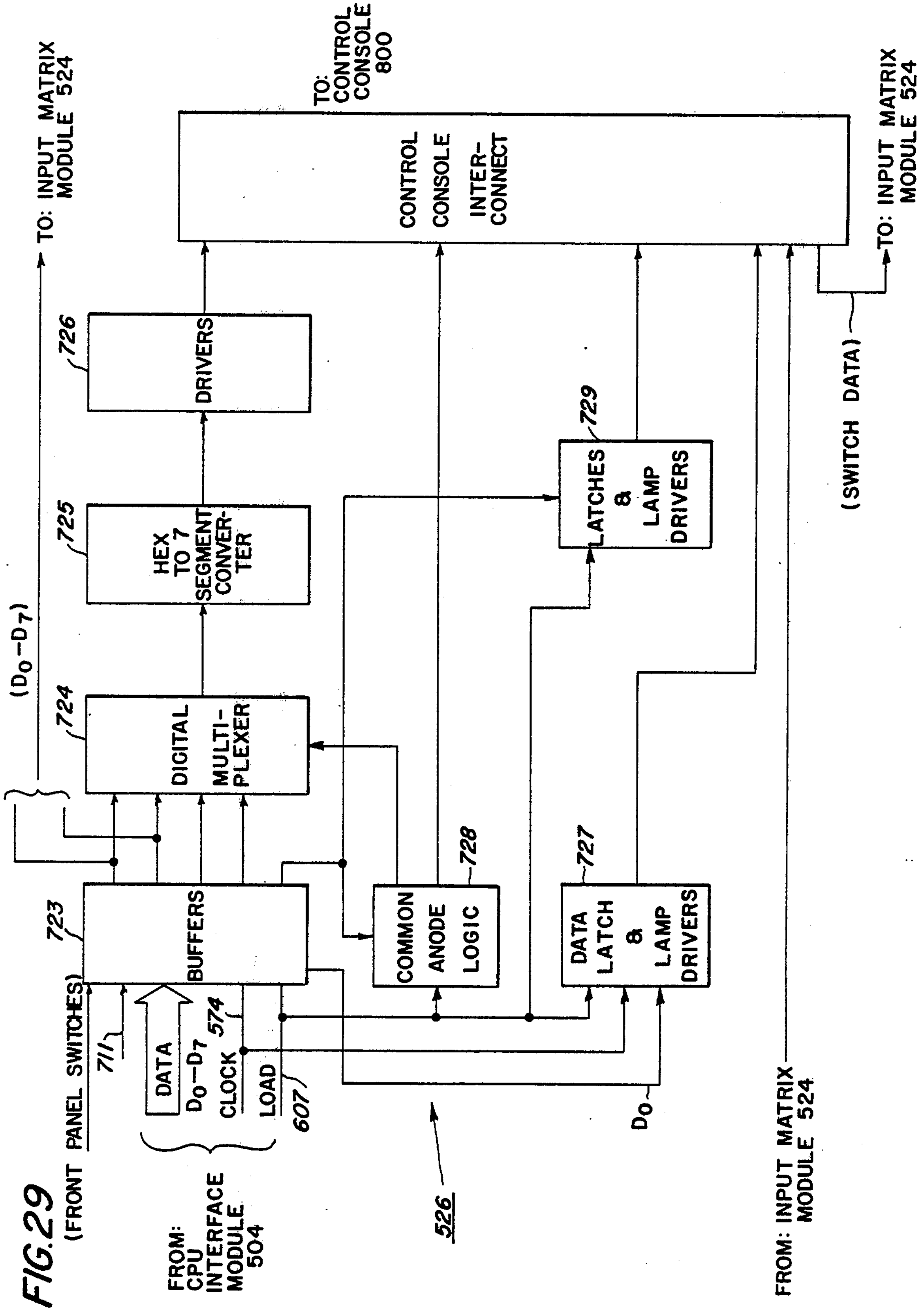
FIG. 29 is a block diagram of the input matrix module.

Referring particularly to FIG. 29, main panel interface module 526 serves as interface between CPU interface module 504 and operator control console 800 for display purposes and as interface between input matrix module 524 and the console switches. As described, data channels D0–D7 have data bits in each channel associated with the control console digital display or lamps. This data is clocked into buffer circuitry 723 and from there, for digital display, data in channels D1–D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift register 727 whose output is connected by drivers to the console lamps. Access by input matrix module 524 to the console switches and keyboard is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Figure 30:
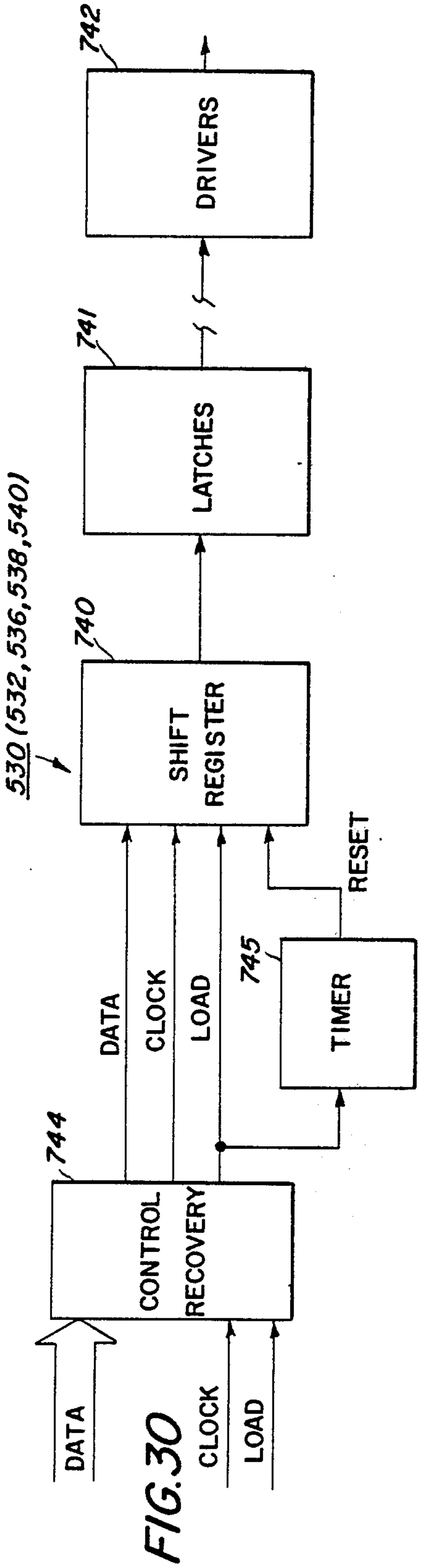
FIG. 30 is a block diagram of a typical remote.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Figure 31:
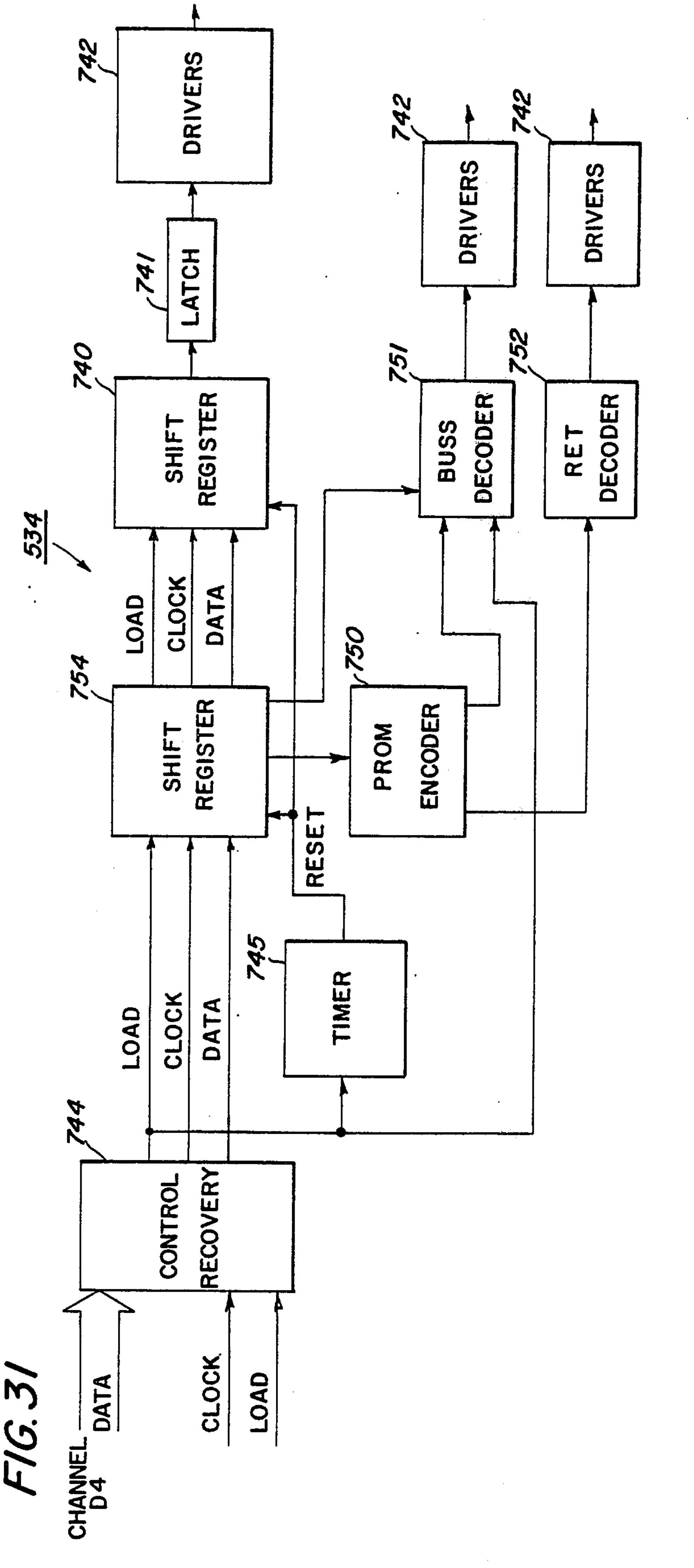
FIG. 31 is a block diagram of the sorter remote.

Referring to FIG. 31 wherein like numbers refer to like parts, to provide capacity for driving the sorter deflector solenoids 221, a decode matrix arrangement consisting of a Prom encoder 750 controlling a pair of decoders 751, 752 is provided. The output of decoders 751, 752 drive the sorter solenoids 221 of upper and lower bin arrays 210, 211 respectively. Data is inputted to encoder 750 by means of shift register 754.

Figure 32:
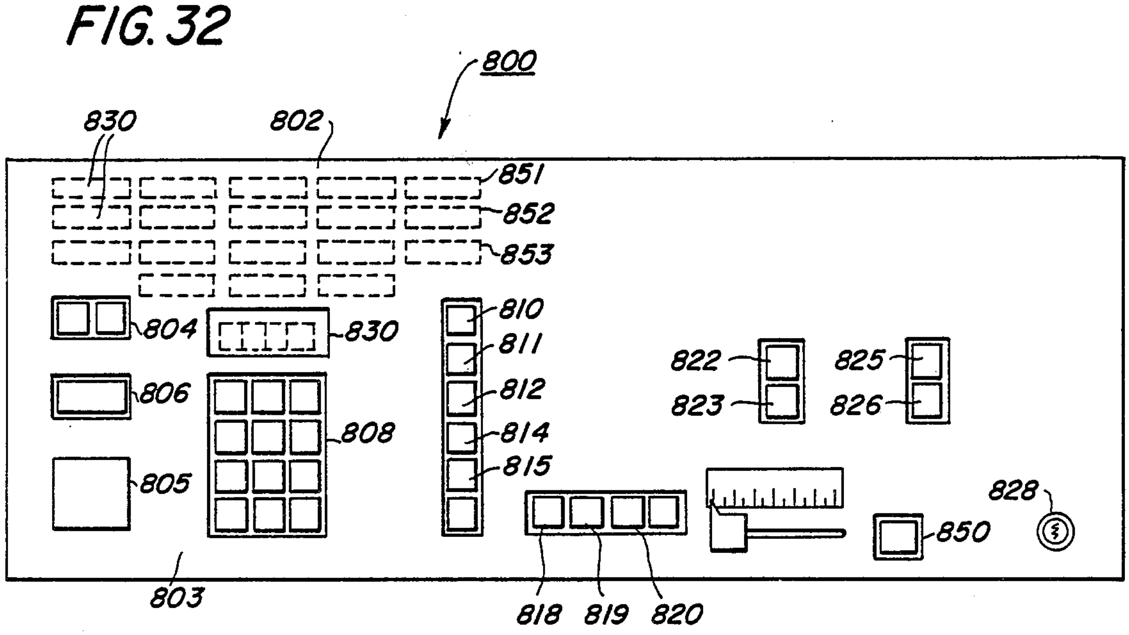
FIG. 32 is a view of the control console for inputting copy run instructions to the apparatus shown in FIG. 1.

Referring now to FIG. 32, control console 800 serves to enable the operator to program host machine 10 to perform the copy run or runs desired. At the same time, various indicators on console 800 reflect the operational condition of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop print (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stacks buttons 825, 826 are provided. An on/off service selector 828 is also provided for activating during machine servicing.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other display information may be envisioned.

MACHINE OPERATION

As will appear, host machine 10 is conveniently divided into a number of operational states. The machine control program is divided into background routines and Foreground routines with operational control normally residing in the Background routine or routines appropriate to the particular machine state then in effect. The output buffer 546' of RAM memory section 546 is used to transfer/refresh control data to the various remote locations in host machine 10, control data from both Background and Foreground routines being inputted to buffer 546' for subsequent transmittal to host machine 10. Transmittal/refresh of control data presently in output buffer 546' is effected through Direct Memory access (DMA) under the aegis of a Machine Clock interrupt routine.

Foreground routine control data which includes a Run Event Table built in response to the particular copy run or runs programmed, is transferred to output buffer 546' by means of a multiple prioritized interrupt system wherein the Background routine in process is temporarily interrupted while fresh Foreground routine control data is inputted to buffer 546' following which the interrupted Background routine is resumed.

The operating program for host machine 10 is divided into a collection of foreground tasks, some of which are driven by the several interrupt routines and background or non-interrupt routines. Foreground tasks are tasks that generally require frequent servicing, high speed response, or synchronization with the host machine 10. Background routines are related to the state of host machine 10, different background routines being performed with different machine states. A single background software control program (STCK) composed of specific sub-programs associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Figure 33:
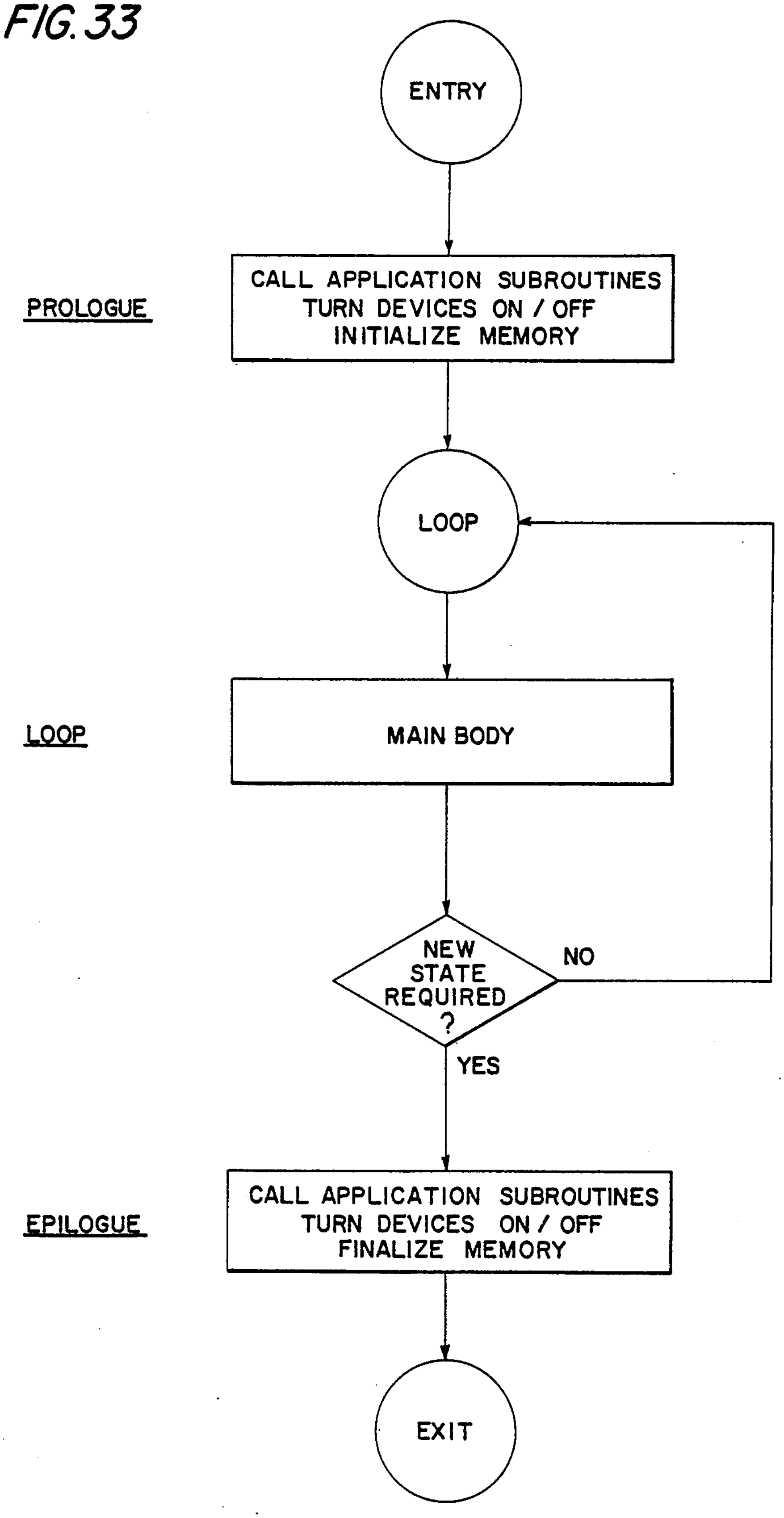
FIG. 33 is a flow chart illustrating a typical machine state.

Referring to FIG. 33, each STATE is normally divided into PROLOGUE, LOOP and EPILOGUE sections. As will be evident from the exemplary program STCK reproduced in TABLE I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clearing memory, presetting memory, etc.) are done directly.

Once the STATE PROLOGUE is completed, the main body (LOOP) is entered. The program (STCK) remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34:
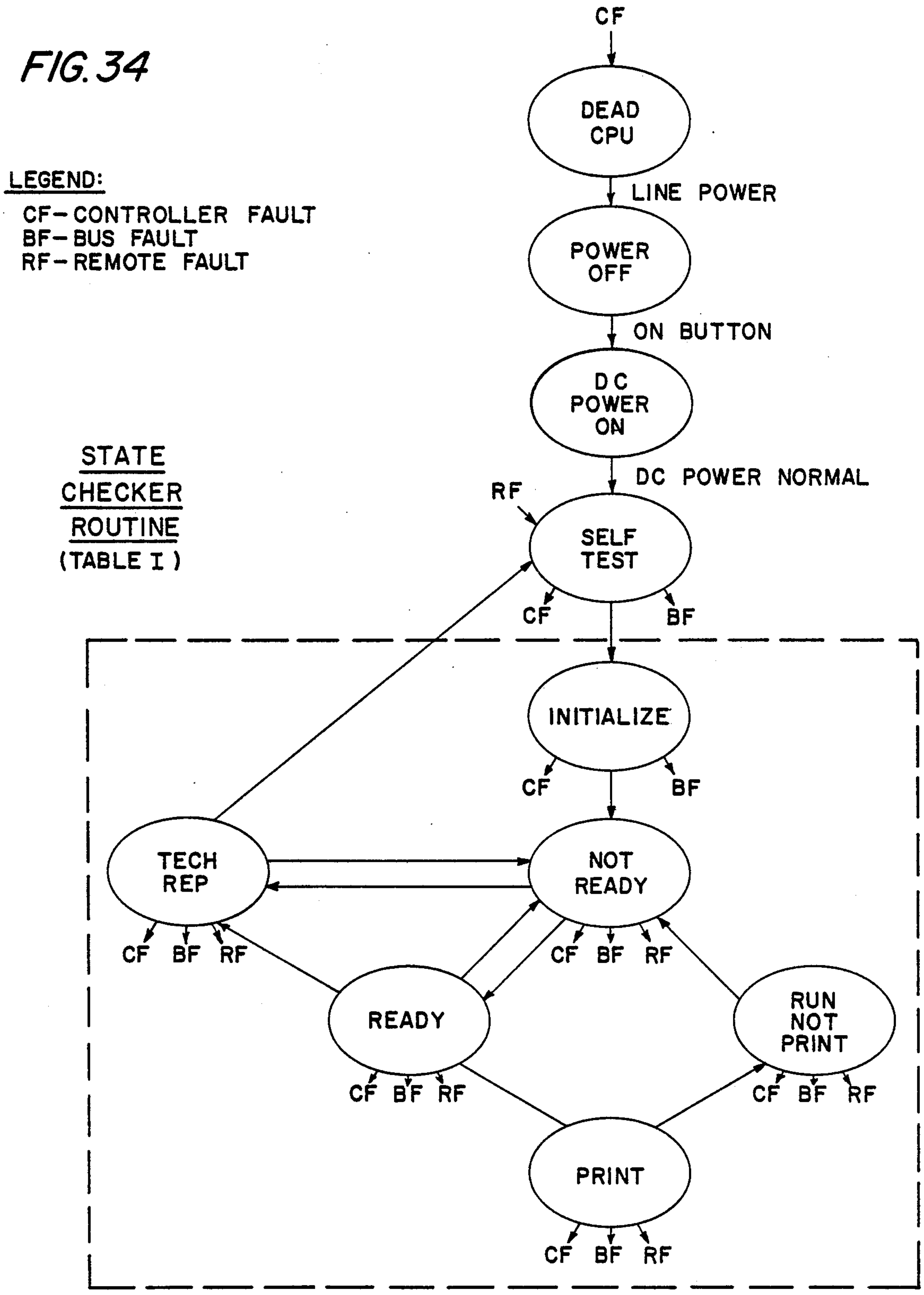
FIG. 34 is a flow chart of the machine state routine.

Referring to FIG. 34 and the exemplary program (STCK) in TABLE I. On actuation of the machine POWER-ON button 804, the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host machine 10 precluded.

When all ready conditions have been checked and found acceptable, the controller moves to the system ready state (RDY). The READY lamp on console 800 is lit and final ready checks made. Host Machine 10 is now ready for operation upon completion of input of a copy run program, loading of one or more originals 2 into document handler 16 (if selected by the operator), and actuation of START PRINT button 805. As will appear hereinafter, the next state is PRINT wherein the particular copy run programmed is carried out.

While the machine is completing a copy run, the controller normally enters the Run Not Print state (RUNNPRT) where the controller calculates the number of copies delivered, resets various flags, stores certain machine event information in the memory, as well as generally conditioning the machine for another copy run, if desired. The controller then returns to the System Not Ready state (NRDY) to recheck for ready conditions prepatory for another copy run, with the same state sequence being repeated until the machine is turned off by actuation of POWER OFF button 804 or a malfunction inspired shutdown is triggered. The last state (TECH REP) is a machine servicing state wherein certain service routines are made available to the machine/repair personnel, i.e. Tech Reps.

Referring particularly to FIG. 32 and Tables II, III, IV, V, VI and VII, the machine operator uses control console 800 to program the machine for the copy run desired. Programming may be done during either the System Not Ready (NRDY) or System Ready (RDY) states, although the machine will not operate during the System Not ready state should START PRINT button 805 be pushed. The copy run includes selecting (using keyboard 808) the number of copies to be made, and such other ancillary program features as may be desired, i.e. use of auxiliary paper tray 102, (push button 810), image size selection (push buttons 818, 819, 820), document handler/sorter selection (push buttons 822, 823, 825, 826), copy density (push buttons 814, 815), duplex or two sided copy button 811, etc. On completion of the copy run program, START PRINT button 805 is actuated to start the copy run programmed (presuming the READY lamp is on and an original or originals 2 have been placed in tray 233 of document handler 16 if the document handler has been selected).

With programming of the copy run instructions, controller 18 enters a Digit Input routine in which the program information is transferred to RAM section 546. The copy run program data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of Foreground tasks is built for operating in cooperation with the background tasks the various components of host machine 10 in an integrated manner to produce the copies programmed. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run programmed. The Variable Pitch Table (TABLE III) is comprised of machine events whose operational timing varies with the individual copy run programmed, i.e. timing of pitch fadeout lamp 44 (FO*ONBSE) and timing of flash illumination lamps 37 (FLSH BSE). The variable Pitch Table is built by the Pitch Table Builder (TABLE IV) from the copy run information programmed in by controller 18 (using the machine control program stored in ROM section 545 and Non-Volatile Memory 610), coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Figure 35:
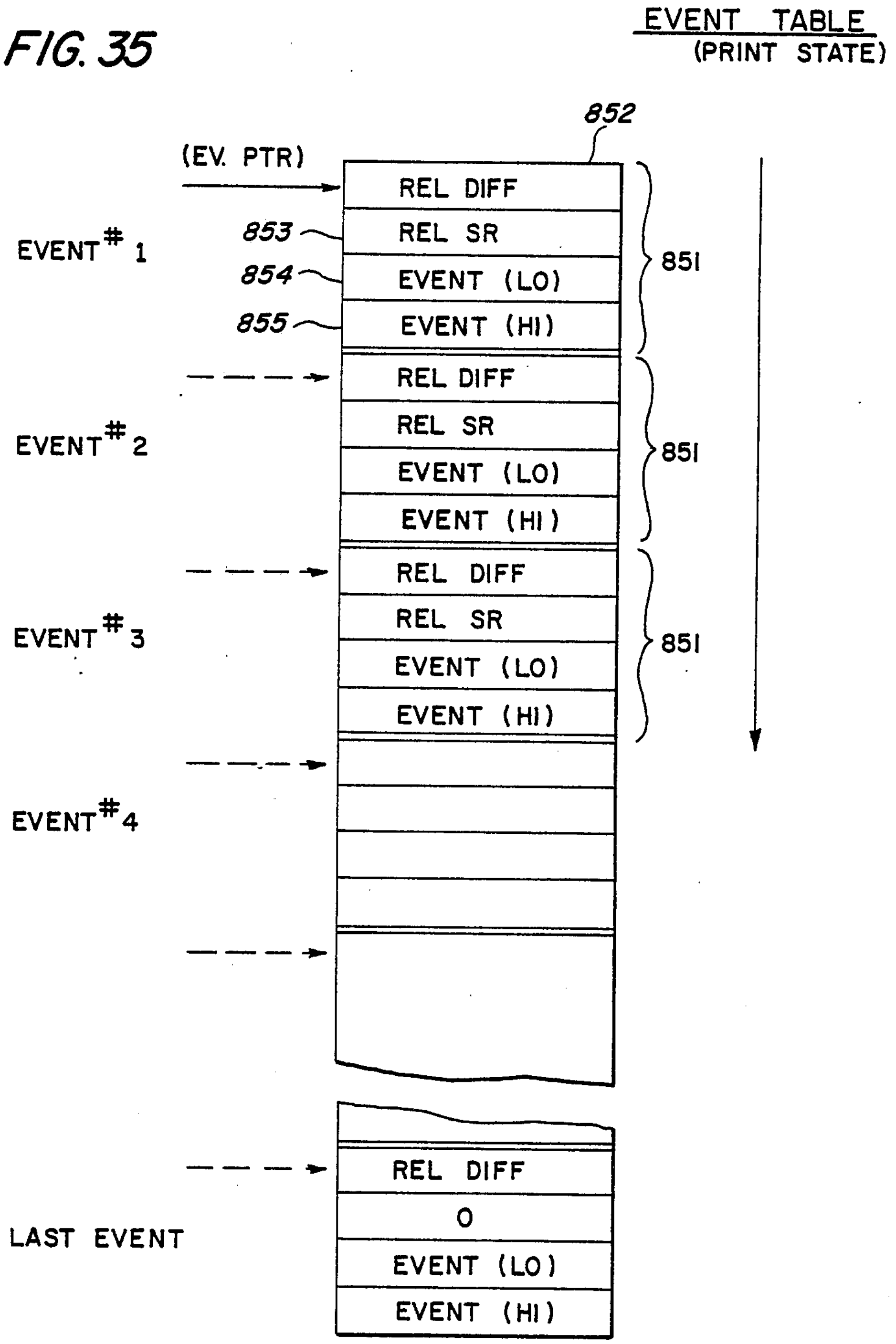
FIG. 35 is a view showing the event table layout.
Figure 36:
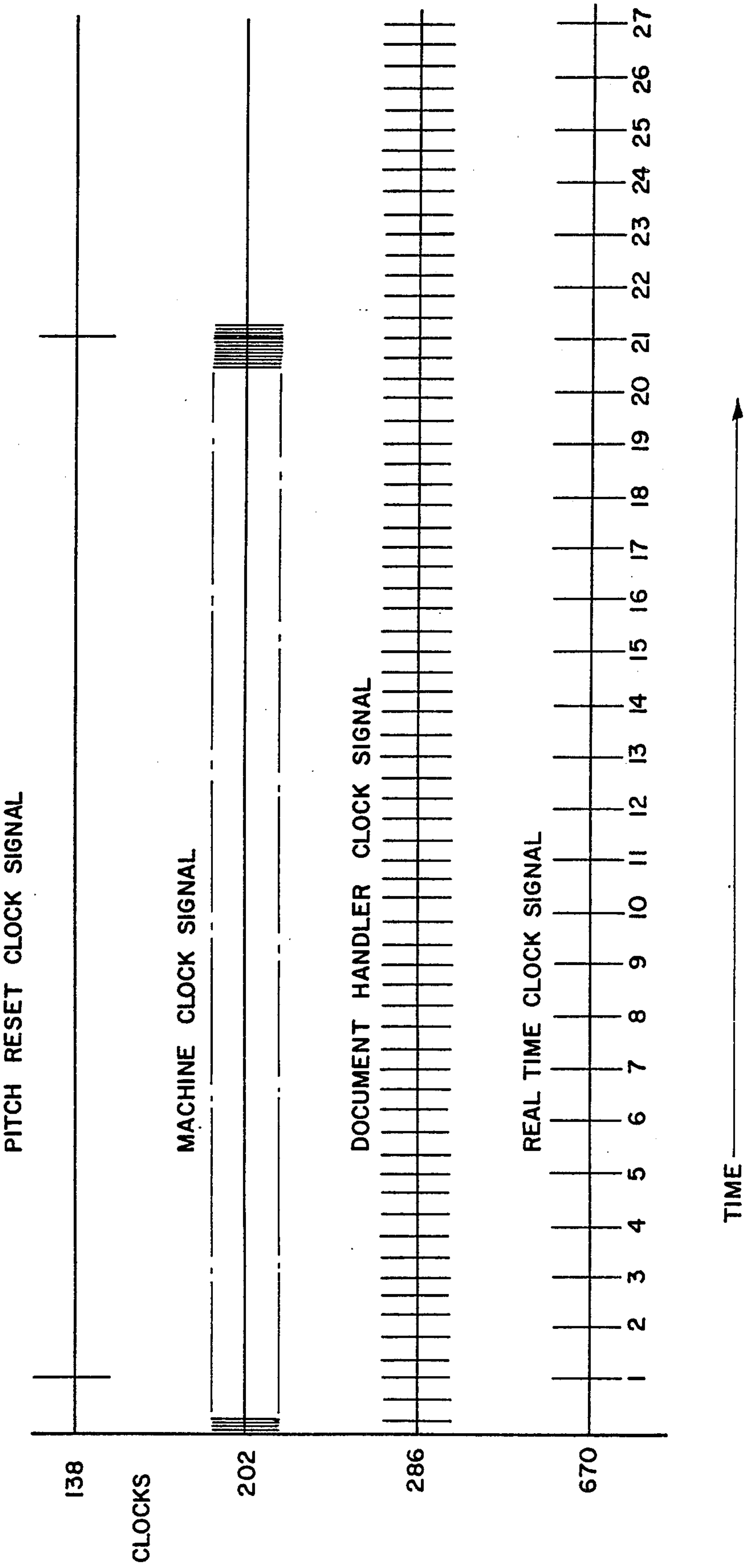
FIG. 36 is a chart illustrating the relative timing sequences of the clock interrupt pulses.
Figure 37:
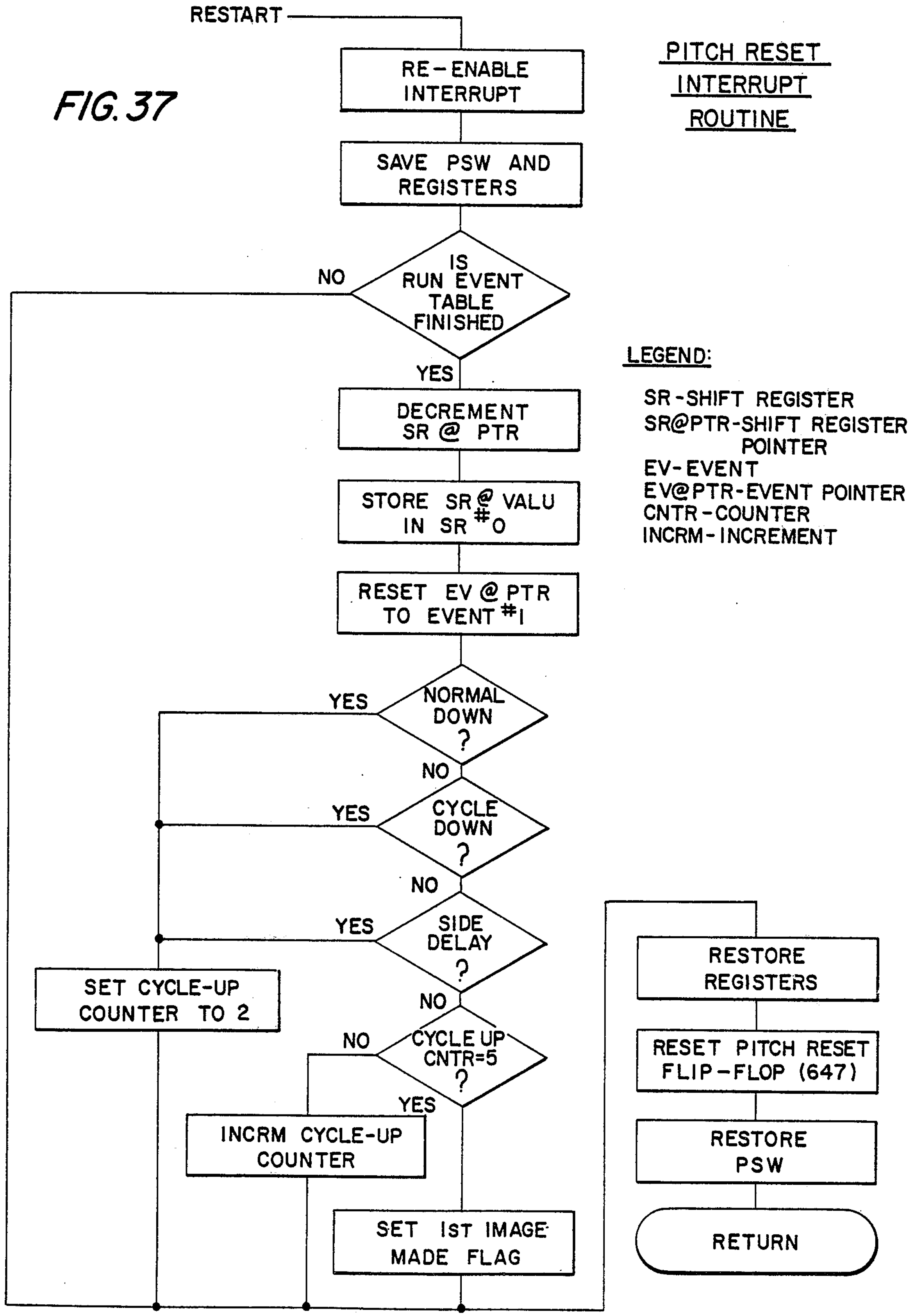
FIG. 37 is a flow charge of the pitch interrupt routine.

Referring particularly to FIG. 35, the Run Event Table consists of successive groups of individual events 851. Each event 851 is comprised of four data blocks, data block 852 containing the number of clock pulses (from machine clock 202) to the next scheduled pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from output buffer 546' of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIGS. 23 and 35–37 and TABLES VII, VIII the interrupt having the highest priority, the Pitch Reset interrupt (signl 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the pitch reset interrupt. The event pointer (EV*PTR), a two byte variable containing the full address of the next scheduled event, is reset to Event #1. The count in the C register equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been initiated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Figure 38:
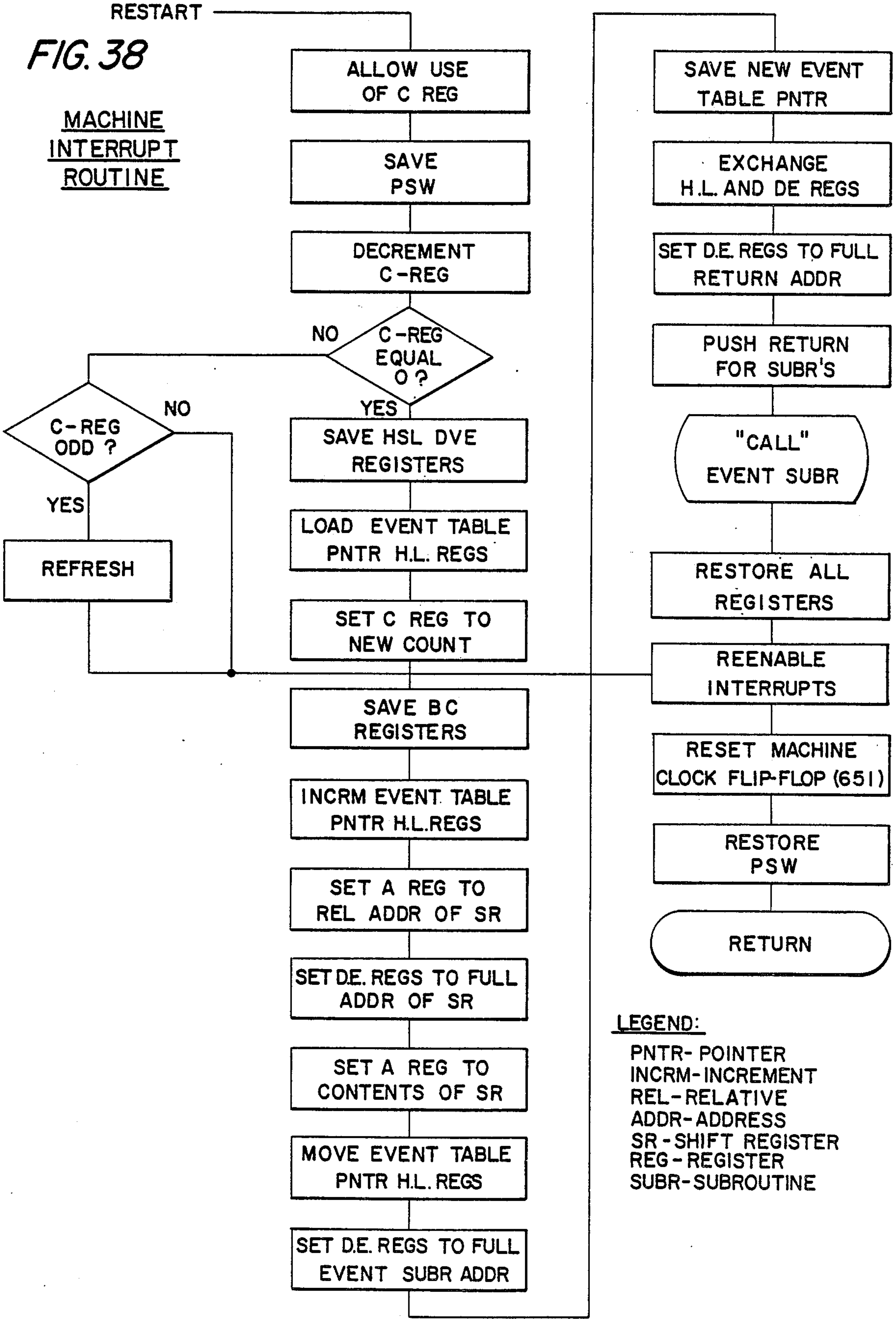
FIG. 38 is a flow chart of the machine clock interrupt routine.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39A:
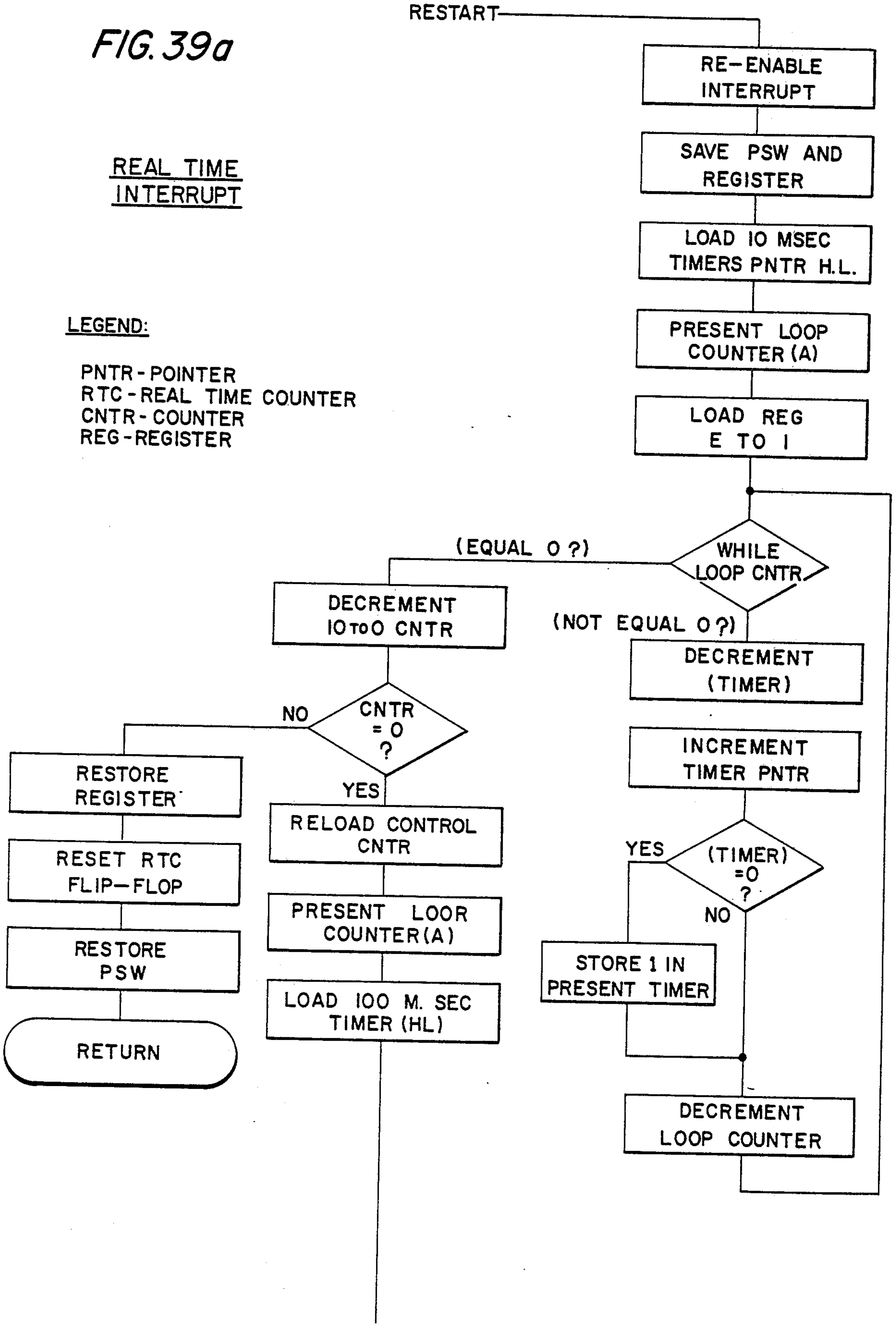
FIGS. 39*a* and 39*b* comprise a flow chart of the real time interrupt routines.
Figure 39B:
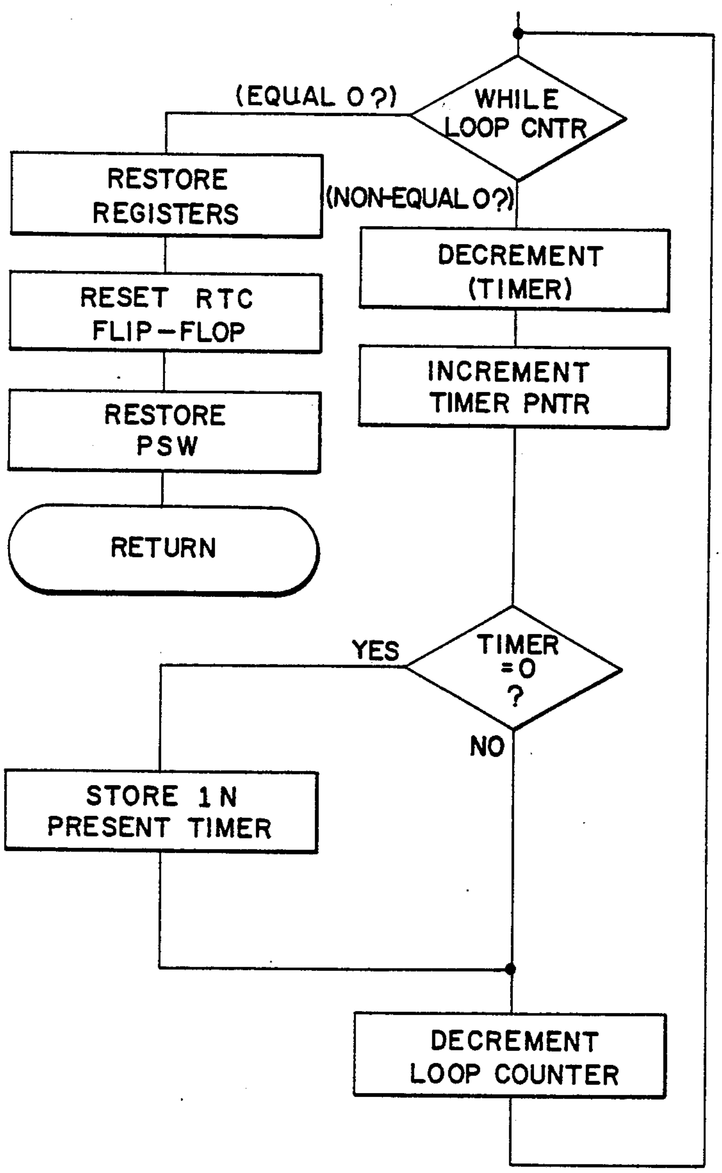

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously.

In the following TABLES:

" "—is used to indicate flags, counters and subroutine names.

"#"—is used to indicate input signals.

"$"—is used to indicate output signals.

":"—is used to indicate macro instructions, system subroutines, system flags, and data, etc.

For further explanation of the mnemonics and particular instructions utilized by the following routines, the reader is directed to Intel Corporation's Programming Manual for the 8080 Microcomputer System.

TABLE I

```
                                 *NAR
                                 *
                                 *        I N I T I A L I Z E   S T A T E
                                 *
                                 *        INIT! SUBROUTINE
                                 *
                                 *        INITIALIZE STATE. EXECUTED AFTER EACH START OR RESTART.  SETS
                                 *        ALL POINTERS, FLAGS, AND DATA TO INITIAL VALUES REQUIRED TO
                                 *        START EXECUTION OF ANY CONTROL ALGORITHIMS.  ALWAYS EXITS TO
                                 *        'NOT READY' STATE.

                                 *        EPILOG

05 00000   3E0A     A   INIT!    MVI      A,10
05 00002   3252FD   N            STA      DIVD!10                    INITIALIZE TO 10
05 00005   3285FC   N            STA      SLOWTOGL                   INITIALIZE TO 10
05 00008   211907   N            LXI      H,EV6STBY!                 H&L= ADDR OF STBY EVENT TABLE
05 0000B   2264FD   N            SHLD     EV@PTR:                    SAVE FOR MACH CLK ROUTINE
```

```
05 0000E   21FFFF  A    LXI      H,X'FFFF'                    INIT INSTRUMENTATION REMOTE
05 00011   2272FB  N    SHLD     INS@PTRR                      ADDR PNTR TO END OF RAM
05 00014   21FFFF  N    LXI      H,ADH@RAMT-1                 SET PNTR TO RAM CNTRL TABLE
05 00017   2278FB  N    SHLD     TAB@STRT                     SAVE PNTR
05 0001A   3E7F    A    MVI      A,X'7F'                      INIT TO UN-BYPASS
05 0001C   328DFC  N    STA      JAM@BYPS                                        ALL JAM SWS
                  *
                  *     TIMER INITIALIZATION
                  *     MUST BE DONE BEFORE ANY TIMERS CAN BE USED
                  *
05 0001F   211FF9  A    LXI      H,AVAIL!**8+X'1F'            SET H&L TO END OF AVAIL! TABLE
05 00022   36FF    A    MVI      M,X'FF'                      STORE X'FF' IN LAST TABLE ADDR
05 00024   3E1F    A    MVI      A,31                         SET A-REG TO VALUE TO BE STORED
                        REPEAT
05 00026   2D      A        DCR      L                        STEP TO NEXT TABLE LOCATION
05 00027   77      A        MOV      M,A                      STORE INITIALIZATION VALUE
05 00028   3D      A        DCR      A                        STEP TO NEXT VALUE
05 00029   C22600  N    UNTIL!   CC,Z,S                       IS INITIALIZATION COMPLETE
05 0002C   2120FE  A    LXI      H,ADR(DATA,TIME!OUT)         TO INITIALIZE TIME!OUT TABLE
05 0002F   225FFD  N    SHLD     INPTR!                        SET IN/OUT POINTERS TO
05 00032   2261FD  N    SHLD     OUTPTR!                       BEGINNING OF TIME!OUT TABLE
                  *
                  *     INITIALIZE SPOOL
                  *     POINTERS
                  *
05 00035   2140FE  A    LXI      H,ADR(DATA,SPL!TBL)          SET PNTRS
05 00038   226AFD  N    SHLD     SPL!IN                                 TO START
05 0003B   226CFD  N    SHLD     SPL!OUT                                        OF TABLE
                  *
                  *     CHECK IF PAPER WAS PRESENT WHEN POWER WENT DOWN
                  *
05 0003E   3AC9E2  A    RNVNIB   NV@JAM@N                     A = JAM INFO FROM POWER DOWN
05 00041   CF      A    RRC                                   SET CARRY TO FDR JAM INFO
05 00042   D25A00  N    IF!      CC,C,S                       WAS THERE PAPER IN FDR AREA
05 00045   47      A      MOV      B,A                        YES, SAVE JAM INFO
05 00046   213CFD  A      SFBIT,P  FDR@AJAM,FDR@MJAM          SET FEEDER JAMS
05 00049   3E0C    A
05 0004B   B6      A
05 0004C   77      A
05 0004D   2121F9  A      SFBIT,P  ON@X02,ON@X03              SIGNAL TRANSPT CL'RANCE REQ'D
05 00050   3E03    A
05 00052   B6      A
05 00053   77      A
05 00054   3E80    A      SFLG     CLP@REQD                   TELL FLT HNDLR CLEARANCE REQD
05 00056   3267F4  A
05 00059   78      A      MOV      A,B                        RESTORE THE A-REG
                        ENDIF
05 0005A   0F      A    RRC                                   SET CARRY TO IMED@ON!
05 0005B   D27100  N    IF!      CC,C,S                       WAS THERE AN IMED@ON!
                  *
05 0005E   2EFF    A      MVI      L,MSK(FBIT,L@PR@FLT,JAM2@FLT,JAM3@FLT,JAM4@FLT,;
                                   JAM5@FLT,JAM6@FLT,RET1@FLT,RET2@FLT)
                  *                                           SETS ALL JAM FBITS IN REG-L
05 00060   2603    A      MVI      H,MSK(FBIT,S@S@JAM,MISSTRIP)
                  *                                           SETS ADDITIONAL FBITS IN H
05 00062   223BFD  A      SHLD     ADR(FBYT,PAP!1)            MOVE FBITS INTO FBYTES
05 00065   3E80    A      SFLG     CLR@REQD                   TELL FLT HNDLR CLEARANCE REQD
05 00067   3267F4  A
05 0006A   2120F9  A      SFBIT,P  TS@FUS,TS@X02              TURN ON UNDEDICATED MAP LAMPS
05 0006D   3E21    A
05 0006F   B6      A
05 00070   77      A
                        ENDIF
05 00071   E60C    A    IF!      XBYT,A,AND,;                 IS EITHER SRT JAM FLAG SET
05 00073   CA8A00  N             MSK(NVBIT,NV@LOW@J,NV@UP@J),NZ ' IN NVNIB

05 00076   FE0C    A      IF!      XBYT,A,EQ,;                YES, ARE BOTH SET
05 00078   C28300  N               MSK(NVBIT,NV@LOW@J,NV@UP@J)
05 0007B   3E80    A        SFLG     TWO@ACT                  TELL SRT THAT THERE WAS A JAM
05 0007D   3261F4  A
05 00080   C38700  N      ELSE!
05 00083   0F      A        RRC                               GET NV@LOW@J TO SIGN BIT &
                            ID!READ  NV@LOW@J
05 00084   3237F4  A        MODFLG   LOW@MOD                  TELL SRT IF UP OR LOW JAM
                          ENDIF
05 00087   CD0000  N      CALL     JAM@SET                    LET SRT SET JAM FLAGS & LAMPS
                        ENDIF
05 0008A   3E80    A    SFLG     SRT@RDY                      SIGNAL SRT NOT IN USE (READY)
05 0008C   328CF7  A
05 0008F   3287F7  A    MODFLG   PROG@RDY                     SET PROG ROUTINE READY
05 00092   326BF4  A    MODFLG   2SD@ENAB                     ALLOW SELECTION OF DUPLEX MODE
05 00095   3EF2    A    MVI      A,X'F2'                      RE-ENABLE
05 00097   3200E6  A    STA      RSINTFF!                              INTERRUPT
05 0009A   FB      A    EI                                                     SYSTEM
05 0009B   CD0000  N    SOBIT,S  NPFO$ON,24V$SPL              PFO OFF (INVT'D) & 24V ON
05 0009E   02      A
05 0009F   E480    A
05 000A1   EE80    A
05 000A3   CD0000  N    STIMR    FLT@DLY,25000,FLT@CHK        START LENS FAULT TIMER
05 000A6   12      A
05 000A7   FA      A
05 000A8   0000    N
05 000AA   CD0000  N    CALL     DOC@CLR                      INITIALIZE DOC@NUM TO 1     (1)
05 000AD   327AFC  N    STA      CF@DIGIT                     ENABLE '0' IN QTY FLASHED   (2)
05 000B0   3E08    A    MVI      A,MSK(FBIT,P@P@RS)           TELL FLT ASSUME
05 000B2   3286FC  N    STA      XP@PREV                                 BRUSH HOUSE OPN
05 000B5   3E02    A    MVI      A,!NRDY                      INIT STCK
05 000B7   3254FD  N    STA      !STATE!                          SYNCRONIZED BACKGROUND
05 000BA   3253FD  N    STA      STATE!                                     CONTROL LOOP
05 000BD   CD3702  N    CALL     NRDY!PRL                     INIT CONTROL TO NOT-READY STATE
```

```
                                ***************************************************************
                                *                                                             *
                                *   S Y C R O N I Z E D   B A C K G R O U N D   C O N T R O L   L O O P S   *
                                *                                                             *
                                ***************************************************************

                                *        PRIORTIES:
                                *               FIRST      10MS TIME OUT REQUESTS
                                *               SECOND     10MS CALLS
                                *               THIRD      SPOOLED CALLS
                                *               FOURTH     20MS CALLS
                                *               FIFTH      100MS CALLS
                                *               SIXTH      100MS TIME OUT REQUESTS

05 000C0    2151FD   A          LXI      H,ADR(DATA,SB:RQST)          SET MEM PNTR TO SB BYTE
                                REPEAT                                LOOP-3 FROM HLT ON ALL INTER'S
                                   REPEAT                             LOOP-2 BACK AFTER EACH 100MS
                                      REPEAT                          LOOP-1 BACK AFTER EACH 20MS
05 000C3    7E       A                  MOV      A,M                  A= SYNC BKGND REQUESTS FROM RTC
                                        ID:READ  SB:RQST
05 000C4    07       A                  RLC                           TEST FOR 10MS
05 000C5    D2F700   N                  IF:      CC,C,S                            SB REQUEST
                                *
                                *                                     TIMER SERVICE REQUESTS
                                *                                     'CALLS TIMED OUT TIMER SUBRS
                                *                                      USING WRAP AROUND TABLE AND
                                *                                      IN/OUT PNTRS - RTCI SETS
                                *                                      INPTR: & ENTERS CALL ADDR
                                *
05 000C8    3A5FFD   N                     WHILE:   XBYT,INPTR:,NE,OUTPTR: ARE PNTRS AT SAME TABL
05 000CB    2161FD   N
05 000CE    BE       A
05 000CF    CAE500   N
05 000D2    6E       A                        MOV      L,M        SET L-REG TO ADDR(L) IN TABLE
05 000D3    26FE     A                        MVI      H,HADR(DATA,TIME:OUT) MEM PNTR NOW SET TO
05 000D5    5E       A                        MOV      E,M            MOVE CALL ADDR(L) TO E
05 000D6    23       A                        INX      H              STEP TO NEXT TABLE BYTE
05 000D7    56       A                        MOV      D,M            MOVE CALL ADDR(H) TO D
05 000D8    23       A                        INX      H              STEP TO NEXT TABLE BYTE
05 000D9    7D       A                        MOV  .   A,L        PREPARE TO UPDATE PNTR
                                              ID:READ  TIME:OUT   DYNAMIC TABLE CONTAINING ADDRS
                                              MODBYT   A,AND,)    ADJUST FOR END OF TABLE
05 000DA    E62F     A                                 TIME:MSK
05 000DC    3261FD   A                        STA      ADR(DATA,OUTPTR:) PNTR TO ADDR OF LAST SE
05 000DF    CD0000   N                        CALL     DE:IND     DO TIMEOUT CALL
05 000E2    C3C800   N                     ENDWHILE               YES, ALL TIME OUTS SERVICED
                                *                                 END TIMER SECTION
05 000E5    2A55FD   N                     LHLD     10:CALLS      GET PROPER 10MS CALL TABLE
05 000E8    CDC000   N                     CALL     HL:IND        DO 10MS CALLS
05 000EB    2151FD   A                     LXI      H,ADR(DATA,SB:RQST) SET MEM PNTR TO SB BYTE
05 000EE    F3       A                     DI
05 000EF    7E       A                     MODBYT   M,AND, 10:RQST REMOVE 10MS REQUEST
05 000F0    E67F     A
05 000F2    77       A

                                           ID:ALTR  SB:RQST
05 000F3    FB       A                     EI                     (WATCH OUT FOR UNPRINTABLE NOT)
05 000F4    C31501   N                  ELSE:                     DO ANY SPOOLED ROUTINES
05 000F7    3A6AFD   N                     IF:      XBYT,SPL:IN,NE,SPL:OUT
05 000FA    216CFD   N
05 000FD    BE       A
05 000FE    CA1101   N
05 00101    6E       A                        MOV      L,M
05 00102    26FE     A                        MVI      H,HADR(DATA,SPL:TBL)
05 00104    5E       A                        MOV      E,M
05 00105    23       A                        INX      H
05 00106    56       A                        MOV      D,M
05 00107    23       A                        INX      H
05 00108    7D       A                        MOV      A,L
05 00109    E64F     A                        MODBYT   A,AND,SPL:MSK
05 0010B    326CFD   A                        STA      ADR(DATA,SPL:OUT)
05 0010E    CD0000   N                        CALL     DE:IND
                                           ENDIF
05 00111    2151FD   A                     LXI      H,ADR(DATA,SB:RQST)
05 00114    7E       A                     MOV      A,M
                                        ENDIF
                                        ID:READ   SB:RQST
05 00115    07       A                  RLC
05 00116    07       A                  RLC                           TEST FOR 20MS
05 00117    D24201   N                  IF:      CC,C,S                            SB REQUEST
05 0011A    2A59FD   N                     LHLD     20PNTR        SET MEM PTR TO CALL IN 20MS TAB
05 0011D    5E       A                     MOV      E,M           MOVE CALL ADDR(L) TO E
05 0011E    23       A                     INX      H             STEP MEM PTR TO ADDR(H)
05 0011F    7E       A                     IF:      XBYT,M,EQ,X'FF' IS POINTER AT END OF TABLE
05 00120    FEFF     A
05 00122    C23701   N

05 00125    2AE7FD   N                        LHLD     20:PNTR    YES, SET MOVING POINTER
05 00128    2259FD   N                        SHLD     20PNTR          BACK TO BEGINNING OF TABLE
05 0012B    2151FD   A                        LXI      H,ADR(DATA,SB:RQST)       SET MEM PNTR TO
05 0012E    F3       A                        DI
05 0012F    7E       A                        MODBYT   M,AND, 20:RQST REMOVE 20MS REQUEST
05 00130    E6BF     A
05 00132    77       A

                                              ID:ALTR  SB:RQST
05 00133    FB       A                        EI
05 00134    C34201   N                     ELSE:
05 00137    56       A                        MOV      D,M        NO, MOVE CALL ADDR(H) TO D
05 00138    23       A                        INX      H              STEP TO NEXT CALL IN TABLE
05 00139    2259FD   N                        SHLD     20PNTR         SAVE FOR NEXT LOOP-1
05 0013C    CD0000   N                        CALL     DE:IND
05 0013F    2151FD   A                        LXI      H,ADR(DATA,SB:RQST) SET MEM PNTR TO SB BY
                                           ENDIF
                                        ENDIF
```

```
05 00142   7E      A          UNTIL:   XBYT,M,AND,20:RQST,Z  MORE 20MS CALLS TO DO  (LOOP-1)
05 00143   E640    A
05 00145   C2C300  N
                              ID:READ  SB:RQST
05 00148   7E      A          IF:      XBYT,M,AND,100:RQST,NZ TEST FOR 100MS SB REQUEST
05 00149   E620    A
05 0014B   CA9E01  N
                                 ID:READ  .SB:RQST
05 0014E   2A50FD  N             LHLD     100PNTR            SET MEM PNTR TO CALL IN 100 TAB
05 00151   5E      A             MOV      E,M                MOVE CALL ADDR(L) TO E
05 00152   23      A             INX      H                  STEP MEM PNTR TO ADDR(H)
05 00153   7E      A             IF:      XBYT,M,EQ,X'FF'    IS PNTR AT END OF TABLE
05 00154   FEFF    A
05 00156   C29301  N
05 00159   2A58FD  N                LHLD     100:PNTR        YES, SET MOVING PNTR BACK
05 0015C   2250FD  N                SHLD     100PNTR             TO BEGINNING OF TABLE
                          *
                          *                                  100MS TIMER SERVICE
                          *                                  DECREMENTS TIMERS AND CALLS
                          *                                  SUBROUTINE REQUESTED WHEN
                          *                                  TIMER TIMES OUT
                          *                                  USES 3 TABLES ON 3 CONSECUTIVE
                          *                                  RAM PAGES -100:CNT W/TIMER
                          *                                            -100:LS W/ADDR(L)
                          *                                            -100:LS W/ADDR(H)
                          *                                  ADDR IS FOR REQSTED SUBR
                          *
05 0015F   2130FA  N                LXI      H,100:CNT       STARTING ADDR OF 100MS TIMERS
05 00162   1614    A                MVI      D,100:TMAX      D-REG SET TO QTY OF 100MS THRS

                          *                                  CONDITIONAL HOLD OF 100MS TMRS

05 00164   3A45FD  A                IF:      FBIT,STDBOPNO,T IS STAND-BY RELAY OPEN
05 00167   E640    A
05 00169   CA6E01  N
                                       MVI      D,100:TMAX) YES, HOLD SPECIFIED NUMBER
05 0016C   1611    A                            -HOLDTMRS           OF TIMERS
                                    ENDIF
                          *
                                    REPEAT                   LOOP TO DECR & SERVICE TIMEOUTS
05 0016E   7E      A                   IF:      VBYT,M,NZ IS TIMER ACTIVE
05 0016F   A7      A
05 00170   CA8201  N
05 00173   35      A                      DCR       M     DECR TIMER
05 00174   C28201  N                      IF:       CC,Z,S HAS TIMER TIMED OUT
05 00177   D5      A                         PUSH      D       SAVE # TIMERS TO SERVICE
05 00178   E5      A                         PUSH      H       SAVE ADDR OF CURRENT TIMER
05 00179   24      A                         INR       H       STEP TO NEXT RAM PAGE
05 0017A   5E      A                         MOV       E,M     MOVE CALL ADDR(L) TO E
05 0017B   24      A                         INR       H       STEP TO NEXT RAM PAGE
05 0017C   56      A                         MOV       D,M     MOVE CALL ADDR(H) TO D
05 0017D   CD0000  N                         CALL      DE:IND
05 00180   E1      A                         POP       H       RECALL ADDR OF CURRENT THR
05 00181   D1      A                         POP       D       RECALL NUMBER OF TIMERS
                          *                                      YET TO BE SERVICED
                                          ENDIF
                                       ENDIF
05 00182   23      A                   INX        H          STEP TO NEXT TIMER ADDR
05 00183   15      A                   DCR        D          DECR NUMBER OF 100MS TIMERS
05 00184   C26E01  N                UNTIL:   CC,Z,S          HAVE ALL TIMERS BEEN SERVICED
                          *                                  END 100MS TIMER SECTION
05 00187   2151FD  A                LXI      H,ADR(DATA,SB:RQST) SET MEM PNTR TO SB BYTE
05 0018A   F3      A                DI
05 0018B   7E      A                MODBYT   M,AND, 100:RQST REMOVE 100MS REQUEST
05 0018C   E6DF    A
05 0018E   77      A
                                    ID:ALTR  SB:RQST
05 0018F   FB      A                EI
05 00190   C39E01  N             ELSE:
05 00193   56      A                MOV      D,M             NO, MOVE CALL ADDR(H) TO D
05 00194   23      A                INX      H                   STEP PNTR TO NEXT CALL
05 00195   2250FD  N                SHLD     100PNTR             SAVE FOR NEXT LOOP-2
05 00198   CD0000  N                 CALL     DE:IND
05 0019B   2151FD  A                 LXI      H,ADR(DATA,SB:RQST) SET MEM PNTR TO SB BYTE
                                 ENDIF
                              ENDIF
05 0019E   7E      A       UNTIL:   VBYT,M,Z                 MORE SB CALLS TO DO  (LOOP-2)
05 0019F   A7      A
05 001A0   C2C300  N
                           ID:READ  SB:RQST
05 001A3   76      A       HLT                               COOL IT UNTIL INTERRUPT RESTART
05 001A4   CAC300  N    UNTIL:   CC,Z,C                      WAS INTERRUPT RTC  (LOOP-3)
05 001A7   F3      A    DI                                   ONLY KIDDING BEFORE, BUT THIS
05 001A8   76      A    HLT                                  TIME REALLY STOP (ABORT)
                          *
                          *     SUBR TO SET CALL TABLE POINTERS
                          *     CALLED BY EACH STATE PROLOG
                          *
                          *     POSITION SB:TABLE POINTER
                          *
05 001A9   3A53FD  N    SB:PNTRS LDA     STATE:              WHAT STATE IS WANTED
05 001AC   110600  A             LXI     D,X'06'             LOAD D&E WITH SKIP NUMBER
05 001AF   21D501  N             LXI     H,SB:TABLE-X'06'    H&L=6'<' TABLE ADDR
                                 REPEAT
05 001B2   19      A                DAD     D                SKIP THREE WORDS
05 001B3   3D      A                DCR     A                DECR STATE LOOP COUNTER
05 001B4   F2B201  N             UNTIL:  CC,S,S              IS POINTER AT CORRECT STATE
                          *
                          *     TRANSFER ADDRS TO VARIABLE SB POINTERS
                          *
05 001B7   1155FD  N             LXI     D,101CALLS          SET D&E TO FIRST OF SB PNTRS
05 001BA   0602    A             MVI     B,2                 LOAD 101CALLS
```

```
05 001BC    CDCE01   N          CALL      MV:WORDS                          & 20:PNTR
05 001BF    2B       A          DCX       H                         ADJUST 'FROM' PNTR
05 001C0    2B       A          DCX       H                                   BACK 1 WORD
05 001C1    0602     A          MVI       B,2                       LOAD 20PNTR
05 001C3    CDCE01   N          CALL      MV:WORDS                          & 100:PNTR
05 001C6    2B       A          DCX       H                         ADJUST 'FROM' PNTR
05 001C7    2B       A          DCX       H                                   BACK 1 WORD
05 001C8    CDCC01   N          CALL      MV:WORD                   LOAD 100PNTR
                                ID:ALTR   10:CALLS,20:PNTR,20PNTR,: DATA WORDS MODIFIED
                                          100:PNTR,100PNTR            BY THIS SUBR
05 001CB    C9       A          RET
                        *NAR
                        *
                        *       MV:WORD/MV:WORDS SUBROUTINES
                        *
                        *       SUBR TO TRANSFER WORDS (2BYTES) FROM MEMORY POINTED TO BY <H&L>
                        *        TO MEMORY POINTED TO BY <D&E>. CALL MV:WORD FOR 1 TRANSFER,
                        *        AND CALL MV:WORDS (WITH B-REG # WORDS TO TRANSFER) FOR
                        *        MULTIPLE TRANSFERS. USES ALL BUT C-REG.
                        *
05 001CC    0601     A  MV:WORD MVI       B,1                       B= # WORDS TO BE MOVED
                        MV:WORDS REPEAT
05 001CE    7E       A                MOV       A,M                 A= 1ST 'FROM' BYTE
05 001CF    12       A                STAX      D                   STORE IN 1ST 'TO' LOCATION
05 001D0    23       A                INX       H                   ADVANCE 'FROM'
05 001D1    13       A                INX       D                          AND 'TO' PNTRS
05 001D2    7E       A                MOV       A,M                 A= 2ND 'FROM' BYTE
05 001D3    12       A                STAX      D                   STORE IN 2ND 'TO' LOCATION
05 001D4    23       A                INX       H                   ADVANCE 'FROM'
05 001D5    13       A                INX       D                          AND 'TO' PNTRS
05 001D6    05       A                DCR       B                   DECRM # OF WORDS CNTR
05 001D7    C2CE01   N          UNTIL:    CC,Z,S                    LOOP UNTIL ALL WORDS TRANSFERRD
05 001DA    C9       A          RET
                        *
                        *       TABLE OF SR CALL POINTERS
                        *       FOR EACH STATE
                        *
05 001DB    0906     N  SB:TABLE DW       COMP10
05 001DD    0A06     N          DW        COMP20
05 001DF    1206     N          DW        COMP100
05 001E1    B105     N          DW        TREP10
05 001E3    B505     N          DW        TREP20
05 001E5    C305     N          DW        TREP100
05 001E7    4202     N          DW        NRDY10
05 001E9    4602     N          DW        NRDY20
05 001EB    5202     N          DW        NRDY100
05 001ED    AF02     N          DW        RDY10
05 001EF    B302     N          DW        RDY20
05 001F1    BF02     N          DW        RDY100
05 001F3    AB03     N          DW        PRNT10
05 001F5    B203     N          DW        PRNT20
05 001F7    C803     N          DW        PRNT100
05 001F9    1905     N          DW        RUNN10
05 001FB    1D05     N          DW        RUNN20
05 001FD    2F05     N          DW        RUNN100

                        *
                        *       SUBR TO DO EPILOGS & PROLOGS LAST CALL IN EVERY 100MS TABLE
                        *
05 001FF    2153FD   A  STAT:CHG LXI      H,ADR(DATA,STATE:)        A= PRESENT STATE # IF UNCHANGED
                                                                     OR NEXT STATE IF CHANGED
05 00202    7E       A          MOV       A,M                       H&L= ADDR 'FORMER STATE' GLOBAL
05 00203    23       A          INX       H                         HAS THERE BEEN A STATE CHANGE
05 00204    BE       A          IF:       XBYT,A,NE,M
05 00205    CA3602   N
                                    ID:READ   STATE:,:STATE:
05 00208    46       A              MOV       B,M                   YES, B= FORMER STATE
05 00209    77       A              MOV       M,A                   UPDATE 'FORMER' TO 'PRESENT'
                                    ID:ALTR   :STATE:
05 0020A    78       A              CASE:     VBYT,B                DO EPILOG FOR FORMER STATE
05 0020B    111F02   N
05 0020E    FE06     A
05 00210    CD0000   N
05 00213    1806     N                  C,0       COMP:EPL          COMPONENT CONTROL STATE
05 00215    0B05     N                  C,1       TREP:EPL          TECH REP STATE
05 00217    7A02     N                  C,2       NRDY:EPL          NOT-READY STATE
05 00219    E302     N                  C,3       RDY:EPL           READY STATE
05 0021B    E603     N                  C,4       PRNT:EPL          PRINT STATE
05 0021D    4105     N                  C,5       RUNN:EPL          SYSTEM RUNNING, NOT PRINT STATE
                                    ENDCASE
05 0021F    3A53FD   N              CASE:     VBYT,STATE:           DO PROLOG FOR PRESENT STATE
05 00222    113602   N
05 00225    FE06     A
05 00227    CD0000   N
05 0022A    FF05     N                  C,0       COMP:PRL          COMPONENT CONTROL STATE
05 0022C    A505     N                  C,1       TREP:PRL          TECH REP STATE
05 0022E    3702     N                  C,2       NRDY:PRL          NOT-READY STATE
05 00230    A602     N                  C,3       RDY:PRL           READY STATE
05 00232    1603     N                  C,4       PRNT:PRL          PRINT STATE
05 00234    0805     N                  C,5       RUNN:PRL          SYSTEM RUNNING, NOT PRINT STATE
                                    ENDCASE
                                ENDIF
05 00236    C9       A          RET                                 RETURN TO 100 MSEC SYNC BKGND

                        *NAR
                        *
                        *       N O T    R E A D Y     S T A T E
                        *
                        *       NOT READY STATE- EXECUTES AFTER INITIALIZE UNTIL ALL READY CONDITIONS
                        *       ARE MET.  THIS STATE CAN ALSO BE ENTERED FROM 'RUN NOT PRINT','READY'
                        *       AND 'TECH REP'.  CONTROL EXITS TO EITHER 'READY' OR 'TECH REP' STATES.

                        *       PROLOG
```

```
05 00237   CDA901   N   NRDY:PRL CALL     SB:PNTRS                    SYNC BKG PNTRS TO NEW STATE
05 0023A   CD0000   N            STIMR    INSTOTMR,1000,NEXTOFLT      UPDATES INST FLT CODE IN STBY
05 0023D   49       A
05 0023E   64       A
05 0023F   0000     N
05 00241   C9       A            RET

                             *   CALLS FOR NOT READY 10 MS SYN BACKGROUND

05 00242   CD0000   N   NRDY10   CALL     ADHOCTRL
05 00245   C9       A            RET

                             *   CALLS FOR NOT READY 20 MS SYN BACKGROUND

05 00246   0000     N   NRDY20   DW       NRDYOSWS
05 00248   0000     N            DW       MNOELVRS
05 0024A   0000     N            DW       DSPLOCTL
05 0024C   0000     N            DW       LMPOCTRL
05 0024E   0000     N            DW       INSTRU
05 00250   FFFF     A            DW       X'FFFF'                     END OF TABLE

                             *   CALLS FOR NOT READY 100 MS SYN BACKGROUND

05 00252   0000     N   NRDY100  DW       NRILKACK
05 00254   0000     N            DW       REDOBGND
05 00256   0000     N            DW       DVLODUMP
05 00258   0000     N            DW       RECAPER
05 0025A   0000     N            DW       BINOCHK                     1
05 0025C   0000     N            DW       MINIPHS1                    2
05 0025E   0000     N            DW       BILOJMPO
05 00260   0000     N            DW       FUSOROUT
05 00262   0000     N            DW       FLTO100                     1
05 00264   0000     N            DW       FLTOCTRL                    2
05 00266   0000     N            DW       FLTOCLRN                    3
05 00268   0000     N            DW       PROG2SJM
05 0026A   0000     N            DW       PSDOSTBY
05 0026C   0000     N            DW       XHMOSTBY
05 0026E   0000     N            DW       JAMORST
05 00270   0000     N            DW       KEYOCNTR
05 00272   0000     N            DW       TSTOLP4
05 00274   8402     N            DW       NRDY:CHG                    TEST IF OK TO
05 00276   FF01     N            DW       STAT:CHG                              LEAVE NOT READY
05 00278   FFFF     A            DW       X'FFFF'                     END OF TABLE

                             *   EPILOG

05 0027A   CDC000   N   NRDY:EPL COBIT,S  WAIT*                       INSURE WAIT OFF AT NRDY EXIT
05 0027D   E9FE     A
05 0027F   AF       A            CFLG     STRT:PRT                    DIS-ABLE TRANSFER TO 'PRINT'
05 00280   325BF4   A
05 00283   C9       A            RET

                             *
                             *   SUBR FOR 'NOT-READY' 100MS SYNC BKGND
                             *    TESTS FOR CHANGE TO 'READY' OR 'TREP REP'
                             *
05 00284   CDCF05   N   NRDY:CHG CALL     TREP:CHG                    TEST FOR STATE CHANGE TO :TREP
05 00287   7E       A            IF:      XBYT,M,NE,:TREP             DID IT CHANGE TO :TREP STATE
05 00288   FE01     A
05 0028A   CA9302   N
                                     IO:READ   STATE:
05 0028D   CD9402   N                CALL      RDYTEST:               TEST ALL 'READY' FLAGS
05 00290   CD0803   N                CALL      NRDY:RDY               MOVE TO EITHER :NRDY OR :RDY
                                 ENDIF
05 00293   C9       A            RET

                             *
                             *   SUBR TO TEST ALL 'READY' FLAGS IN A LOOP
                             *
05 00294   2184F7   A   RDYTEST: LXI      H,RDYFLGS:                  H&L= START ADDR OF READY FLAGS
05 00297   0609     A            MVI      B,RDYFNUM:                  B= # OF READY FLAGS TO CHK
                                 REPEAT
05 00299   7E       A                MOV       A,M                    A= <PRESENT READY FLAG>
05 0029A   07       A                RLC                              SET C IF FLAG SET (READY)
05 0029B   DAA002   N                IF:       CC,C,C                 IS PRESENT FLAG INDICATING RDY
05 0029E   0601     A                    MVI       B,1                NO, DON'T TEST ANY FURTHER
                                     ENDIF
05 002A0   23       A                INX       H                      MOVE TO NEXT FLAG LOCATION
05 002A1   05       A                DCR       B                      DECRM LOOP CNTR (# READY FLAGS)
05 002A2   C29902   N            UNTIL:   CC,Z,S                      LOOP UNTIL ALL FLAGS CHKED
                                 IO:READ  LENSORDY,ELVORDY,FUSORDY,;  FLAGS READ
                                          PROGORDY,ILCKORDY,XMMORDY,;
                                          FLTORDY,ADHONMOV,SRTORDY
05 002A5   C9       A            RET                                  RETURN

                             *NAR
                             *
                             *   R E A D Y    S T A T E
                             *
                             *   READY STATE- EXECUTES WHEN MACHINE IS READY TO GO INTO PRINT STATE.
                             *   CONTROL CAN GO BACK TO 'NOT READY' OR GO TO 'TECH REP' IF REQUIRED.

                             *   PROLOG

05 002A6   CD0000   N   RDY:PRL  SOBIT,S  READY*
05 002A9   E701     A
05 002AB   CDA901   N            CALL     SB:PNTRS                    SYNC BKG PNTRS TO NEW STATE
05 002AE   C9       A            RET

                             *   CALLS FOR READY 10MS SYN BACKGROUND
```

```
05 002AF   CD0000   N  RDY10     CALL     ADH@CTRL
05 002B2   C9       A            RET

                       *         CALLS F@R READY 20MS SYN BACKGR@UND

05 002B3   0000     N  RDY20     DW       RDY@SWS
05 002B5   0000     N            DW       MN@ELV@S
05 002B7   0000     N            DW       DSPL@CTL
05 002B9   0000     N            DW       LMP@CTRL
05 002BB   0000     N            DW       INSTRU
05 002BD   FFFF     A            DW       X'FFFF'               END @F TABLE

                       *         CALLS F@R READY 100MS SYN BACKGR@UND

05 002BF   0000     N  RDY100    DW       BIN@CHK               1
05 002C1   0000     N            DW       MINIPHS1              2
05 002C3   0000     N            DW       BIL@JMP@
05 002C5   0000     N            DW       DVL@DUMP
05 002C7   0000     N            DW       RECAPEP
05 002C9   0000     N            DW       FUS@RDUT
05 002CB   0000     N            DW       FLT@100               1
05 002CD   0000     N            DW       FLT@CTRL              2
05 002CF   0000     N            DW       NRILK@CK
05 002D1   0000     N            DW       RED@BG@D
05 002D3   0000     N            DW       2SD@STPY
05 002D5   0000     N            DW       XMM@STPY
05 002D7   0000     N            DW       JAM@RST
05 002D9   0000     N            DW       KEY@CNTR
05 002DB   0000     N            DW       TST@LP4
05 002DD   E90?     N            DW       RDYICHG               TEST IF @K T@ LEAVE READY
05 002DF   FFC?     N            DW       STAT:CHG
05 002E1   FFFF     A            DW       X'FFFF'               END @F TABLE

                       *         EPIL@G

05 002E3   CD0000   N  RDYIEPL   C@BIT,S  READY$
05 002E6   E7FE     A
05 002E8   C9       A            RET

                       *         CHANGE @F STATE R@UTINES

                       *
                       *         SUBR F@R 'READY' 100MS SYNC BKGND
                       *          TESTS F@R CHANGE T@ 'N@T-READY' @R 'TECH REP'
                       *
05 002E9   CDDF05   N  RDYICHG   CALL     TREP!CHG              TEST F@R STATE CHANGE T@ !TREP
05 002EC   7E       A            IF!      XBYT,M,NE,!TREP       DID IT CHANGE T@ !TREP STATE
05 002ED   FE01     A
05 002EF   CA0A03   N
                                    ID!READ  STATE!
05 002F2   CD9402   N               CALL     RDYTEST!           TEST ALL 'READY' FLAGS
05 002F5   CD0B03   N               CALL     NRDY!RDY           M@VE T@ EITHER !NRDY @R !RDY
05 002F8   3A58F4   A               IF!      FLG,STRT!PRT,T     IS START PRINT REQUESTED
05 002FB   07       A
05 002FC   D20A03   N
05 002FF   2153FD   A                  LXI      H,ADR(DATA,STATE!)   SET MEM PNTR
05 00302   7E       A                  IF!      XBYT,M,EQ,!RDY       @K T@ G@ T@ PRINT
05 00303   FE03     A
05 00305   C20A03   N
                                          ID!READ  STATE!
05 00308   3604     A                     MVI      M,!PRNT       CHG T@ PRT STATE
                                          ID!ALTR  STATE!
                                       ENDIF
                                    ENDIF
                                 ENDIF
05 0030A   C9       A            RET

                       *
                       *         SUBR T@ USE INF@ FR@M 'RDYTEST' AND EXECUTE THE PR@PER CHANGE @F STATE
                       *
05 0030B   2153FD   A  NRDY!RDY  LXI      H,ADR(DATA,STATE!)    SET MEM PNTR
05 0030E   3603     A            MVI      M,!RDY                ASSUME G@ING T@ 'READY' STATE
                                 ID!ALTR  STATE!
05 00310   DA1503   N            IF!      CC,C,C                ARE ALL 'READY' FLAGS SET
05 00313   3602     A               MVI      M,!NRDY            N@, M@VE T@ 'N@T-READY' STATE
                                    ID!ALTR  STATE!
                                 ENDIF
05 00315   C9       A            RET

                       *NAR
                       *
                       *         P R I N T   S T A T E
                       *
                       *         PRINT STATE- EXECUTES WHILE MACHINE IS PR@DUCING C@PIES.
                       *         ENTERED FR@M 'READY' AND EXITS T@ 'RUN N@T PRINT'.

                       *         PR@L@G

05 00316   2160FE   N  PRNT:PRL  CLR!MEM  16,SHIFTREG           CLEAR SHIFT REGISTER
05 00319   0610     A
05 0031B   CD0000   N
05 0031E   3E60     A            MVI      A,LADR(DATA,SHIFTREG)  F@RCE SHIFT REG T@ START AT
05 00320   3263FD   A            STA      ADR(DATA,SR@PTR!)       BEGINNING @F SHIFTREG TABLE
                                 CLR!MEM  SD1@DLY-TIME@DN!+1,/   CLEAR THE F@LL@WING FLAGS
05 00323   21A7F4   A                     ADR(FLG,TIME@DN!)
05 00326   0609     A
05 00328   CD0000   N
                                 ID!CLR   TIME@DN!,IMED@DN!,/
                                          CYCL@DN!,N@RM@DN!,QWIK!@UT,/
                                          IMGMADE!,SD1@TIM@,SD1@DLY
05 0032B   3E80     A            SFLG     910@D@NE              ALL@W FIRST PITCH RESET
05 0032D   326FF4   A
```

```
05 00330   AF       A            XRA     A
05 00331   3266FD   N            STA     CYCUPCT!                       'INIT CYCLE-UP CNTR TO 0
05 00334   3269FD   N            STA     SR0VALU!                       INIT 'NEW SR VALUE' TO 0
05 00337   3250FA   N            STA     PLL0INFO                       INIT PLL SHUTDOWN CONTROL TO 0
05 0033A   3268FD   N            STA     SMPL0CT!                       INIT SAMPLE COPY CNTR TO 0
05 0033D   3E03     A            MVI     A,3
05 0033F   3267FD   N            STA     N0IMGCT!                       INIT 'NO IMAGE CNTR' TO 3
05 00342   CD0000   N            CALL    SRSK                           SHIFT REG SCHEDULER (INIT SR#0)
05 00345   CD0000   N            CALL    TIM0M0D                        CALC SHIFTED IMAGE VALUES   (1)
05 00348   CD0000   N            STIMR   935:THR,810,RETURN!            SET 'OVER-RUN EVENT' TIMER  (2)
05 0034B   22       A
05 0034C   51       A
05 0034D   0000     N
05 0034F   CD0000   N            CALL    TBLD0PPT                       BUILD NEW PITCH TABLE       (3)
05 00352   CD0000   N            S0BIT,S PRNT$RLY,PR$COOL               PRINT RELAY & COOLING FAN ON
05 00355   02       A
05 00356   EA08     A
05 00358   F608     A
05 0035A   AF       A            CTIMR   PR0COOL                        CLEAR COOLING FAN TIMER
05 0035B   3232FA   N
05 0035E   CD0000   N            C0BIT,S NPF0$ON                        TURN OFF PF0 (INVERTED DRIVER)
05 00361   E47F     A
05 00363   3AB0F4   A            IF!     FLG,ADH0SELC,T
05 00366   07       A
05 00367   D27003   N
05 0036A   CD0000   N                CALL    ADH0M0TN
05 0036D   C37503   N            ELSE!
05 00370   3E80     A                SFLG    ADH&WTEN
05 00372   32CCF4   A
                                 ENDIF
05 00375   CD0000   N            CALL    TRN0BSD
05 00378   CD0000   N            CALL    PAP&SIZE                       CHK PAPER WIDTH FOR FUSER   (1)
05 0037B   CD0000   N            CALL    EDGE&FA                        CHK WHICH EDGE FADE OUT     (2)
05 0037E   CD0000   N            CALL    PAP0PPL3
05 00381   CD0000   N            CALL    PROG&UP                        PROG INITIALIZATION SUBR
05 00384   CD0000   N            CALL    PROG&UP1
05 00387   CD0000   N            CALL    FDR&PRT                        CHECK FEEDER SELECTION
05 0038A   CD0000   N            CALL.   BLG&BKPT                       READ BILLING BREAK-POINTS
05 0038D   CD0000   N            CALL    D0&ELV                         CAUSE ELV TO EXECUTE
05 00390   3A54F4   A            IF!     FLG,SRT&SEL,T                  IS SORTER BEING USED
05 00393   07       A
05 00394   D29F03   N
05 00397   CD0000   N                CALL    SRT&INIT                   INITIALIZE SORTER JAM DETECT
                                     MVI     A,MSK(NVBIT,NV0FJAM,)      SETS ALL 4 JAM CONDITIONS
05 0039A   3E0F     A                        NV&IMED,NV0L0W0J,NV0UP0J)
05 0039C   C3A403   N            ELSE!
05 0039F   3AC9E2   A                RNVNIB  NV0JAM0N               READ SAVED PREVIOUS SRT JAMS
                                     MODBYT  A,OR,MSK(NVBIT,)       & SET IMED ON & FOR JAM
05 003A2   F603     A                        NV0FJAM,NV0IMED)
                                 ENDIF
05 003A4   32C9E2   A            WNVNIB  NV0JAM0N                       STORE IN CASE OF PWR DN
                                 IDIALTR NV0FJAM,NV0 MED,NV0L0W0J,      SEE ABOVE IF!/ELSE!
                                         NV0UP0J
05 003A7   CDA901   N            CALL    SB:PNTRS                       SYNC BKG PNTRS TO NEW STATE
05 003AA   C9       A            RET

                        *        CALLS FOR PRINT 10 MS SYN BACKGROUND

05 003AB   CD0000   N   PRNT10   CALL    ADH&CTPL
05 003AE   CDC004   N            CALL    PRT!IMD
05 003B1   C9       A            RET

                        *        CALLS FOR PRINT 20 MS SYN BACKGROUND

05 003B2   0000     N   PRNT20   DW      PRT0SWS
05 003B4   0000     N            DW      TON0DIS
05 003B6   0000     N            DW      PAP0TGL3
05 003B8   0000     N            DW      LMP&CTPL
05 003BA   0000     N            DW      FDR0BKFD
05 003BC   0000     N            DW      SORTER0
05 003BE   0000     N            DW      FLV0PRNT
05 003C0   0000     N            DW      S0S0JMDT
05 003C2   0000     N            DW      DSPL&CTL
05 003C4   0000     N            DW      INSTRU
05 003C6   FFFF     A            DW      X'FFFF'                        END OF TABLE

                        *        CALLS FOR PRINT 100 MS SYN BACKGROUND

05 003C8   0000     N   PRNT100  DW      RILK&CK
05 003CA   0000     N            DW      2SND0RUN
05 003CC   0000     N            DW      LITE&OFF
05 003CE   0000     N            DW      XMM0PRNT
05 003D0   0000     N            DW      FUS0RDUT
05 003D2   0000     N            DW      READY0CK
05 003D4   0000     N            DW      JAM0RST
05 003D6   0000     N            DW      MINIPHS8
05 003D8   4F06     N            DW      SMPL&CPY
05 003DA   0000     N            DW      RXCYCLDN                       STUB IN US IMG
05 003DC   0000     N            DW      KEY&CNTR
05 003DE   0000     N            DW      TST0LP4
05 003E0   2C04     N            DW      PRT:CHG                        TEST IF OK TO
05 003E2   FF01     N            DW      STAT!CHG                                 LEAVE PRINT
05 003E4   FFFF     A            DW      X'FFFF'                        END OF TABLE

                        *        EPIL0G

05 003E6   CD0000   N   PRNT!EPL CALL    AX0EPTY                        (1)
05 003E9   CD0000   N            CALL    FDM0EPL3                       (2)
05 003EC   CD0000   N            CALL    FDA0EPL3                       (3)
05 003EF   CD0000   N            CALL    TRN0EPL3
05 003F2   CD0000   N            CALL    DVL0NRDY
```

```
                                   COBIT,S  FUS$CAPL,FUS$LOAD,ILLM$SPL,;
05 003F5   CD0000   N                       FFO$11,EFO$12$5,SMPL$CPY,READY$
05 003F8   07       A
05 003F9   E6F7     A
05 003FB   EDFD     A
05 003FD   F2F7     A
05 003FF   ECF7     A
05 00401   EBF7     A
05 00403   E2FE     A
05 00405   E7FE     A
05 00407   CD0000   N              SOBIT,S  NPFO$ON              TURN OFF PFO (INVERTED DRIVER)
05 0040A   E480     A
05 0040C   AF       A              CFLG     ELVOAUTO             DISABLE AUTO-TRAY SWITCHING
05 0040D   3222F4   A
05 00410   CD0000   N              CALL     PAPOEPL3
05 00413   CD1704   N              CALL     ABORT
05 00416   C9       A              RET

                         *
                         *         SUBROUTINE
                         *

05 00417   F3       A    ABORT     DI                            TURN OFF INTERRUPT SYSTEM
05 00418   AF       A              CFLG     TBLOOFIN             SIGNAL NEW PITCH TABLE REQ'D
05 00419   325DF4   A
05 0041C   211907   N              LXI      H,EVOSTBY!           ADDR OF STBY EVENT TABLE
05 0041F   2264FD   N              SHLD     EVOPTR!              SAVE FOR MACH CLK ROUTINE
05 00422   CD0000   N              COBIT,S  BTR$LOAD,PRNT$RLY    UN-LOAD BTR & DROP PRINT RELAY
05 00425   02       A
05 00426   E17F     A
05 00428   EAF7     A
05 0042A   FB       A              EI
05 0042B   C9       A              RET

05 0042C   3A66FD   N    PRT!CHG   IF!      XBYT,CYCUPCT!,EQ,2   CHECK FOR PROLOG 2 OR CYCLE OUT
05 0042F   FEC2     A
05 00431   C23C04   N
05 00434   3E80     A                 SFLG     PRT$PRO2          YES, SET 'PRINT PROLOG 2' FLAG
05 00436   3271F4   A
05 00439   C37004   N              ORIF!    XBYT,A,EQ,3          NO, IS CYCLE UP CNTR=3
05 0043C   FEC3     A
05 0043E   C27004   N
05 00441   3A71F4   A              ANDIF!   FLG,PRT$PRO2,T       YES, AND IS PROLOG 2 FLAG SET
05 00444   07       A
05 00445   D27004   N
05 00448   AF       A                 CFLG     PRTOPRO2          YES, DO PROLOG 2 AND CLR FLAG
05 00449   3271F4   A
                         *
                         *         PRINT STATE BACKGROUND- PROLOG 2
                         *
05 0044C   CD0000   N                 CALL     PAPOPRI 2         RETN XPORT OFF IF NOT SIDE 1
05 0044F   CD0000   N                 CALL     PROGOUP2
05 00452   3AADF4   A                 IF!      FLG,IMGMADE!,T    HAS 1ST IMAGE BEEN MADE
05 00455   07       A
05 00456   D25C04   N
05 00459   CD0000   N                    CALL     PROGOUP        YES, CALL PROG INITIALIZATION
                                      ENDIF
05 0045C   3A57FA   N                 IF!      VBYT,MINIOBYTE,NZ IS MINI-PHYSICAL ACTIVE
05 0045F   A7       A
05 00460   CA7004   N
05 00463   AF       A                    CFLG     DSPLO1ST       YES, ENABLE DISPLAY UPDATE
05 00464   329AF4   A
05 00467   3C       A                    INR      A              DISPLAY QUANTITY
05 00468   3250FA   N                    STA      DSPLOST1        COMPLETE
05 0046B   3E06     A                    MVI      A,6            SET DOCUMENT TOTAL TO
05 0046D   326FFA   N                    STA      DOCOTOTL        6 FOR ADH DOCUMENT CHECK
                                      ENDIF
                                   ENDIF

                         *         END PROLOG2

                         *
                         *         BUILD FLAG BYTE
                         *
05 00470   0608     A              MVI      B,8                  NUMBER OF FLAGS REQ'D
05 00472   AF       A              XRA      A                    CLEAR A-REG
05 00473   57       A              MOV      D,A                  CLEAR D-REG
05 00474   21A9F4   A              LXI      H,ADR(FLG,IMEDODN!)  STARTING ADDR OF PRT!CHG FLAGS
                                   REPEAT
05 00477   7E       A                 MOV      A,M               LOAD A W/CONTENTS OF FLAG ADDR
05 00478   07       A                 RLC                        ROTATE FLAG(D7) INTO CARRY
05 00479   7A       A                 MOV      A,D               LOAD A W/FLAGS BILT INTO BYTE
05 0047A   17       A                 RAL                        PUT FLAG IN DO & SHIFT LEFT
05 0047B   57       A                 MOV      D,A               SAVE RESULT IN D-REG
05 0047C   23       A                 INX      H                 STEP TO NEXT FLAG
05 0047D   05       A                 DCR      B                 DECR NUMBER OF FLAGS REQ'D
05 0047E   C27704   N              UNTIL!   CC,Z,S               LOOP UNTIL ALL FLAGS IN BYTE
                                   ID!READ  IMEDODN!,CYCLODN!,NORMODN!,;  FLAGS READ
                                            QWIK!OUT,IMGMADE!,SD1OTIMO,;
                                            SD1OOLY,ADHOSELC
                         *
                         *         TEST FOR STATE CHANGE TO !RUNN
                         *
05 00481   3A67FD   N              LDA      NOIMGCT!             MOV CURRENT NO IMAGE COUNTER
05 00484   5F       A              MOV      E,A                  TO THE E-REG
05 00485   060E     A              MVI      B,14                 LOOP CNTR FOR STATE CHG TESTS
05 00487   21E104   N              LXI      H,CYC!OUT            TABLE ADDR OF PRT!CHG TESTS
                                   REPEAT
05 0048A   7A       A                 MOV      A,D               MOV FLAG BYTE TO THE A-REG
05 0048B   A6       A                 MODBYT   A,AND,M           MASK FOR DESIRED FLAGS
05 0048C   23       A                 INX      H                 STEP TO STATUS TEST
```

```
05 0048D   AE       A              MODBYT    A,XOR,M             TEST FLAG STATUS
05 0048E   C29F04   N              IF!       CC,Z,S              DID TEST PASS
05 00491   23       A                 INX       H                YES, STEP TO NOIMGCT! TEST
05 00492   78       A                 IF!       XBYT,E,GE,M      IS NOIMGCT! AT CORRECT VALUE
05 00493   BE       A
05 00494   DA9E04   N
05 00497   3E05     A                   MVI       A,!RUNN        YES, CHANGE STATE
05 00499   3253FD   N                   STA       STATE!          TO RUN NOT PRINT
05 0049C   0601     A                   MVI       B,1            FORCE END OF TESTS (EARLY OUT)
                                      ENDIF
05 0049E   2B       A                 DCX       H                ADJ PNTR BACK TO NO IMG TEST
                                   ENDIF
05 0049F   23       A              INX       H                   STEP OVER NO IMG TEST
05 004A0   23       A              INX       H                   STEP TO MASK FOR NEXT TEST
05 004A1   05       A              DCR       B                   DECR LOOP COUNTER
05 004A2   C28A04   N           UNTIL!    CC,Z,S                 ALL TESTS COMPLETE OR STATE CHG
                          *
05 004A5   7A       A           MOV       A,D                    MOV FLAG BYTE TO A-REG
05 004A6   E662     A           MODBYT    A,AND,D6!D5!D1         MASK AND TEST FOR FLAGS TRUE
                                ID!READ   NORMODN!,CYCLODN!,SD1ODLY  FROM ABOVE BYTE BUILD
05 004A8   CABF04   N           IF!       CC,Z,C                 ARE ANY FLAGS TRUE
05 004AB   2166FD   A              LXI       H,ADR(DATA,CYCUPCT!)  PREPARE TO TEST OR MODIFY
05 004AE   7E       A              IF!       XBYT,M,GE,3         HAS PROG PUSHED IT TO 0
05 004AF   FE03     A
05 004B1   DAB604   N
                                      ID!READ   CYCUPCT!
05 004B4   3602     A                 MVI       M,2              NO, FORCE CYCLE-UP MODE AGAIN
                                      ID!ALTR   CYCUPCT!
                                   ENDIF
05 004B6   CD0000   N              COBIT,S   ILLM#SPL            ILLM SPL OFF DURING DEAD CYCLE
05 004B9   F2F7     A
05 004BB   AF       A              CFLG      SMPLOFLG            CANCEL SAMPLE COPY SEQUENCE
05 004BC   324CF4   A
                                ENDIF
05 004BF   C9       A           RET


                        PRT!IMD  IF!       FLGS,IMEDODN!,AND,!       IS IMEDIATE DOWN REQUESTED
05 004C0   3AA9F4   A                      TBLOSFIN,T                AND HAS PROB BEEN DETECTED
05 004C3   2150F4   A
05 004C6   A6       A
05 004C7   F2D004   N
05 004CA   CD1704   N              CALL      ABORT
05 004CD   C3E004   N           ORIF!     FLG,TIMEDDN!,T         IF TIMED DWN REQ'D DROP OUT
05 004D0   3AA7F4   A
05 004D3   07       A
05 004D4   D2F004   N
05 004D7   21E1FF   A              COBIT     BTP#LOAD            BIAS TRANS ROLL (ASAP)
05 004DA   3E7F     A
05 004DC   F3       A
05 004DD   A6       A
05 004DE   77       A
05 004DF   F8       A
                                ENDIF
05 004E0   C9       A           RET

                          *
                          *                                      D7 6 5 4 3 2 1 0 (X=DON'T CARE)
                          *
                          *             TABLE OF FLAG STATUS TESTS     I C N O I S S A   N C
                          *              AND NO IMAGE COUNTER VALUES   M Y O W M O D D   O O
                          *              USED TO DETERMINE IF STATE    E C R I G 1 1 H     U   T N
                          *              SHOULD CHANGE FROM PRINT TO   D L M K M O O O   I N   E U
                          *              RUN NOT PRINT                 O O O ! A T D S   M T   S M
                          *                                            D D D O D I L E   A E   T B
                          *                                            N N N U E M Y L   G R     E
                          *                                            ! ! ! T ! O   C   E       R
                          *
05 004E1   48       A   CYC!OUT  DB        D6!D3              X 1 X X 0 X X X   00   1
05 004E2   40       A            DB        D6
05 004E3   00       A            DB        0
05 004E4   5C       A            DB        D6!D4!D3!D2        X 1 X 0 1 1 X X   16   2
05 004E5   4C       A            DB        D6!D3!D2
05 004E6   10       A            DB        16
05 004E7   5C       A            DB        D6!D4!D3!D2        X 1 X 0 1 0 X X   11   3
05 004E8   48       A            DB        D6!D3
05 004E9   0B       A            DB        11
05 004EA   68       A            DB        D6!D5!D3           X 0 1 X 0 X X X   00   4
05 004EB   20       A            DB        D5
05 004EC   00       A            DB        0
05 004ED   75       A            DB        D6!D5!D4!D2!D0     X 0 0 0 X 1 X 0   36   5
05 004EE   04       A            DB        D2
05 004EF   24       A            DB        36
05 004F0   75       A            DB        D6!D5!D4!D2!D0     X 0 0 0 X 1 X 1   20   6
05 004F1   05       A            DB        D2!D0
05 004F2   14       A            DB        20
05 004F3   7D       A            DB        D6!D5!D4!D3!D2!D0  X 0 1 0 1 1 X 0   36   7
05 004F4   2C       A            DB        D5!D3!D2
05 004F5   24       A            DB        36
05 004F6   7D       A            DB        D6!D5!D4!D3!D2!D0  X 0 1 0 1 1 X 1   20   8
05 004F7   2D       A            DB        D5!D3!D2!D0
05 004F8   14       A            DB        20
05 004F9   75       A            DB        D6!D5!D4!D2!D0     X 0 0 0 X 0 X 0   21   9
05 004FA   00       A            DB        0
05 004FB   15       A            DB        21
05 004FC   7D       A            DB        D6!D5!D4!D3!D2!D0  X 0 1 0 1 0 X 0   21   10
05 004FD   28       A            DB        D5!D3
05 004FE   15       A            DB        21
05 004FF   75       A            DB        D6!D5!D4!D2!D0     X 0 0 0 X 0 X 1   13   11
05 00500   01       A            DB        D0
05 00501   0D       A            DB        13
```

```
05 00502   70       A            DB       D6|D5|D4|D3|D2|D0             X 0 1 0 1 0 X 1   13   12
05 00503   29       A            DB       D5|D3|D0
05 00504   0D       A            DB       13
05 00505   10       A            DB       D4                            X X X 1 X X X X   11   13
05 00506   10       A            DB       D4
05 00507   0B       A            DB       11
05 00508   80       A            DB       D7                            1 X X X X X X X   00   14
05 00509   80       A            DB       D7
05 0050A   00       A            DB       0

                       *NAR
                       *
                       *         R U N   N O T   P R I N T   S T A T E
                       *
                       *         RUN NOT PRINT. EXECUTES WHILE MACHINE IS COMPLETING A COPY RUN.
                       *         ENTERED FROM 'PRINT' AND EXITS TO 'NOT READY'.

                       *         PROLOG

05 0050B   CD0000   N  RUNN:PRL CALL     DO&ELV                        CAUSE ELV TO EXECUTE
05 0050E   CD0000   N           STIMR    RUNN:TMR,2500,RUNN&CHG        STAY IN RUNN 2.5 SEC
05 00511   2F       A
05 00512   FA       A
05 00513   7505     N
05 00515   CDA901   N           CALL     SB:PNTRS                      SYNC BKG PNTRS TO NEW STATE
05 00518   C9       A           RET

                       *        CALLS FOR RUN NOT PRINT 10 MS SYN BACKGROUND

05 00519   CD0000   N  RUNN10   CALL     ADH&CTRL
05 0051C   C9       A           RET

                       *        CALLS FOR RUN NOT PRINT 20 MS SYN BACKGROUND

05 0051D   00C0     N  RUNN20   DW       RUNN&SWS
05 0051F   00C0     N           DW       SORTERS
05 00521   00C0     N           DW       SOS&JMOT
05 00523   00C0     N           DW       FLV&PRNT
05 00525   0000     N           DW       LMP&CTRL
05 00527   0000     N           DW       PAP&TGL4
05 00529   0000     N           DW       DSPL&CTL
05 0052B   0000     N           DW       INSTRU
05 0052D   FFFF     A           DW       X'FFFF'                       END OF TABLE

                       *        CALLS FOR RUN NOT PRINT 100 MS SYN BACKGROUND

05 0052F   0000     N  RUNN100  DW       JAM&RST
05 00531   0000     N           DW       RILK&CK
05 00533   0000     N           DW       FUS&RDUT
05 00535   0000     N           DW       2SD&RUN
05 00537   0000     N           DW       XHM&PRNT
05 00539   0000     N           DW       LITE&OFF
05 0053B   0000     N           DW       TST&LP4
05 0053D   FF01     N           DW       STAT:CHG                      TEST IF OK TO LEAVE RUN NOT PRT
05 0053F   FFFF     A           DW       X'FFFF'                       END OF TABLE

05 00541   CD0000   N  RUNN:EPL CALL     DEL&CK                        CALC COPIES DELIVERED
05 00544   CD0000   N           CALL     PAP&EPL4                      'RUNNPRT' PAPER PATH MOP UP SUB
05 00547   CD0000   N           CALL     MOT&OFF                       TURN OFF SORTER MOTORS
05 0054A   CD0000   N           CALL     DO&ELV                        CAUSE ELV TO EXECUTE
05 0054D   AF       A           CFLG     AXFD&FLT                      RESET FOR USE DURING NEXT RUN
05 0054E   323FF4   A
05 00551   2123FC   A           CFBIT,P  TF&XHMO                       STOP BLINKING OF XHM 'OTHER'
05 00554   3EFE     A
05 00556   A6       A
05 00557   77       A
05 00558   CD0000   N           COBIT,S  SOS$SMPL
05 0055B   ECFD     A
05 0055D   CD7B05   N           CALL     NV&JAM
05 00560   CD0000   N           CALL     RCP&STRE                      STORE RECAP DATA IN RAM
05 00563   CD0000   N           CALL     ADH&MOTF
05 00566   3E08     A           MVI      A,8
05 00568   3285FA   N           STA      COOLCNT                       SET COUNTER FOR 7 TIMEOUTS
05 0056B   CD0000   N           CALL     PR&FAN
05 0056E   CD0000   N           CALL     FLT&EPL5                      (1)
05 00571   CD0000   N           CALL     HIST&FLE                      (2) LOG HISTORY DATA FOR RUN
05 00574   C9       A           RET                                    (3)

05 00575   2153FD   N  RUNN&CHG LXI      H,STATE!                      SET H&L TO ADDR OF STATE!
05 00578   3602     A           MVI      M,:NRDY                       CHANGE STATE! TO NOT READY
                                IO:ALTR  STATE!
05 0057A   C9       A           RET

05 0057B   3A66F4   A  NV&JAM   RFLG     UP&JAM                        LOAD A WITH SRT UPPER JAM FLAG
05 0057E   07       A                                                  & SAVE IT IN THE CARRY BIT
                       *
05 0057F   3A36F4   A           LDAFLG   LOW&JAM                       LOAD A WITH SRT LOWER JAM FLAG
05 00582   17       A           RAL                                    & MOVE CARRY &
05 00583   17       A           RAL                                    LOW&JAM INTO THEIR POSITIONS
05 00584   07       A           RLC
05 00585   07       A           RLC
                                MODBYT   A,AND,MSK(NVBIT,(             MASK FOR DESIRED BITS
05 00586   E60C     A                    NV&LOWSJ,NV&UP&J)
05 00588   47       A           MOV      B,A                           & SAVE IT IN THE B-REG
05 00589   3AA9F4   A           IF!      FLG,IMFD&ON!,T                WAS THERE AN IMED ON CONDITION
05 0058C   07       A
05 0058D   D29605   N
05 00590   78       A                 MOV      A,B                     YES,RESTORE A-REG
                                      MODBYT   A,OR,MSK(NVBIT,NV&FJAM,(  & SET NV JAM BITS
```

```
05 00591   F^03     A                NV8IMED)
05 00593   C IA105  N         ELSE!
05 00596   3.\3CFD  A            IF!       FBITS,FDR8AJAM,8R,FDR8MJAM,T IS EITHER JAM CONDITION TRUE
05 00599   E.0C     A
05 0059B   C.9F05   N
05 0059E   3'       A               STC                            YES,SET CARRY
                                 ENDIF
05 0059F   1:       A            RAL                               ROTATE INTO DO
05 005A0   B(       A            M0DBYT    A,0R,B                  ,'0R' IN SRT JAM BITS
                              ENDIF
05 005A1   32C9E2   A         WNVNIB    NV8JAM0N
                              IDIALTR   NV8FJAM,NV8IMED,NV8L0W8J,NV8UP8J
05 005A4   C9       A         RET                                  RETURN TO STATE CHECKER

                      *NAR
                      *
                      *       T E C H    R E P    S T A T E
                      *
                      *       THE TECH REP STATE IS ENTERED WHEN THE SERVICE KEY IS ON IN
                      *       'NOT READY' & 'READY' STATES. THIS ALLOWS THE TECH REP TO PERFORM SUCH
                      *       TASKS AS ACCESS NON-VOLATILE MEMORY & COMPONENT CONTROL.

                      *
                      *       PROLOG
                      *
05 005A5   CD0000   N TREP:PRL COBIT,S   WAITS                     INSURE WAIT OFF AT TREP ENTRANC
05 005A8   E9FE     A
05 005AA   CD0000   N         CALL      DGN8PRL                    DIAGNOSTIC PROLOG
05 005AD   CDA901   N         CALL      SB:PNTRS                   SYNC BKG PNTRS TO NEW STATE
05 005B0   C9       A         RET

                      *       CALLS FOR TECH REP 10MS SYN BACKGROUND

05 005B1   CD0000   N TREP10  CALL      ADH8CTRL
05 005B4   C9       A         RET

                      *       CALLS FOR TECH REP 20MS SYN BACKGROUND

05 005B5   0000     N TREP20  DW        TREP8SWS
05 005B7   0000     N         DW        MN8ELVRS
05 005B9   0000     N         DW        LMP8CTRL
05 005BB   0000     N         DW        DSPL8CTL
05 005BD   0000     N         DW        DGN8BKG
05 005BF   0000     N         DW        INSTRU
05 005C1   FFFF     A         DW        X'FFFF'                    END OF TABLE

                      *       CALLS FOR TECH REP 100MS SYN BACKGROUND

05 005C3   0000     N TREP100 DW        NRILK8CK
05 005C5   0000     N         DW        PSD8STPY
05 005C7   0000     N         DW        XMM8STPY
05 005C9   0000     N         DW        RED8BGND
05 005CB   0000     N         DW        BIN8CHK
05 005CD   0000     N         DW        JAM8RST
05 005CF   0000     N         DW        DVL8DUMP
05 005D1   0000     N         DW        FUS8ROUT
05 005D3   0000     N         DW        TST8LP4
05 005D5   DF05     N         DW        TREP:CHG                   TEST IF OK TO
05 005D7   FF01     N         DW        STAT:CHG                             LEAVE TREP REP
05 005D9   FFFF     A         DW        X'FFFF'                    END OF TABLE

                      *
                      *       EPILOG  (TECH REP STATE)
                      *
05 005DB   CD0000   N TREP:EPL CALL     DGN8EPL                    DIAGNOSTIC EPILOG
05 005DE   C9       A         RET

                      *       CHANGE OF STATE CHECK

05 005DF   2153FD   A TREP:CHG LXI      H,ADR(DATA,STATE:)         PREPARE FOR POSSIBLE STATE CHG
05 005E2   7E       A         IF:       XBYT,M,NE,:COMP            DO NOT CHG STATE IF IN COMP
05 005E3   FE00     A
05 005E5   CAFE05   N
05 005E8   3A49F4   A            IF:       FLG,SER8ACT,T           IF SERVICE KEY IS ON AND IF
05 005EB   07       A
05 005EC   D2FC05   N
05 005EF   3A20FC   A            ANDIF:    FBIT,DGN8PRT8,F          IN DIAG PRINT PROGRAM
05 005F2   E6C2     A
05 005F4   C2FC05   N
05 005F7   3601     A               MVI       M,:TREP              CHG TO TREP STATE
05 005F9   C3FE05   N            ELSE:                             IF KEY IS TURNED OFF
05 005FC   36C2     A               MVI       M,:NRDY              CHG TO NOT READY STATE
                                 ENDIF
                                 IDIALTR   STATE:
                              ENDIF
05 005FE   C9       A         RET
```

TABLE II

```
 96                              *        FIXED PITCH EVENT TABLE
 97                              *
 98                              *        EVENTS MUST BE IN SEQUENTIAL ORDER STARTING
 99                              *        WITH THE EVENT CLOSES TO PITCH RESET FIRST
100                              *
101                              *        THERE CAN BE NO MORE THAN 256 COUNTS BETWEEN EVENTS
102                              *
103                              *        FORMAT OF EVENTS FOR EVENT TABLE
104                              *
105                              *        EVENT     X,Y,Z
106                              *        WHERE:
107                              *        X = ABSOLUTE COUNTS FROM RESET
108                              *        Y = SHIFT REGISTER NEEDED IN EVENT
109                              *        Z = EVENT NAME
110                              *
111                              *
112                              *        PITCH EVENTS
113                              *
114                                       TABLE
115  05 0001E    0200     A               EVENT     2,3,TRN2CURR
     05 00020    03       A
     05 00021    0000     N
116  05 00023    0300     A               EVENT     3,2,ADCOACT
     05 00025    02       A
     05 00026    0000     N
117  05 00028    0400     A               EVENT     4,3,FDR5AFLT
     05 0002A    03       A
     05 0002B    0000     N
118  05 0002D    0700     A               EVENT     7,0,SPLYSOON
     05 0002F    00       A
     05 00030    0000     N
119  05 00032    0800     A               EVENT     8,2,FDR1AXFD
     05 00034    02       A
     05 00035    0000     N
120  05 00037    0A00     A               EVENT     10,3,FUSOLOAD
     05 00039    03       A
     05 0003A    0000     N
121  05 0003C    3000     A               EVENT     48,8,DECGOINV        DECISION GATE FOR INVTD COPIES
     05 0003E    08       A
     05 0003F    0000     N
122  05 00041    3600     A               EVENT     54,5,FUSONTLD        FUSER LOADED TEST
     05 00043    05       A
     05 00044    0000     N
123  05 00046    5500     A               EVENT     85,3,FDR6MFLT
     05 00048    03       A
     05 00049    0C00     N
124  05 0004B    5900     A               EVENT     89,2,FDR2MNFD
     05 0004D    02       A
     05 0004E    0000     N
125  05 00050    5D00     A               EVENT     93,8,JAM6ONON        PAPER PATH JAM SW PITCH EVENT
     05 00052    08       A
     05 00053    0000     N
126  05 00055    7600     A               EVENT     118,9,JAM5OINV       PAPER PATH JAM SW PITCH EVENT
     05 00057    09       A
     05 00058    0000     N
127  05 0005A    7800     A               EVENT     120,0,FSHOOFF
     05 0005C    00       A
     05 0005D    0000     N
128  05 0005F    8700     A               EVENT     135,0,PROGOHST       PROG HISTORY FILE UPDATE
     05 00061    00       A
     05 00062    0000     N
129  05 00064    8F00     A               EVENT     143,6,JAM4OCHK       PAPER PATH JAM SW PITCH EVENT
     05 00066    06       A
     05 00067    0000     N
130  05 00069    AA00     A               EVENT     170,10,RET2OCHK      PAPER PATH JAM SW PITCH EVENT
     05 0006B    0A       A
     05 0006C    0000     N
131  05 0006E    CF00     A               EVENT     207,3,SOSOCLN
     05 00070    03       A
     05 00071    0000     N
132  05 00073    D100     A               EVENT     209,2,TRN5CURR
     05 00075    02       A
     05 00076    0000     N
133  05 00078    E300     A               EVENT     227,5,JAM3OCHK       PAPER PATH JAM SW PITCH EVENT
     05 0007A    05       A
     05 0007B    0000     N
134  05 0007D    0901     A               EVENT     265,2,FDR3AEDG       ENABLE AUX FDR WT SENSOR
     05 0007F    02       A
     05 00080    0000     N
135  05 00082    0B01     A               EVENT     267,4,JAM2OCHK       PAPER PATH JAM SW PITCH EVENT
     05 00084    04       A
     05 00085    0000     N
136  05 00087    0E01     A               EVENT     270,8,RET1OCHK       PAPER PATH JAM SW PITCH EVENT
     05 00089    08       A
     05 0008A    0000     N
137  05 0008C    6901     A               EVENT     361,3,TRN3DTCK
     05 0008E    03       A
     05 0008F    0000     N
138  05 00091    6C01     A               EVENT     364,2,FDR4MEDG       ENABLE MAIN WT SENSOR
     05 00093    02       A
     05 00094    0000     N
139  05 00096    B901     A               EVENT     441,9,JAM6OINV       PAPER PATH JAM SW PITCH EVENT
     05 00098    09       A
     05 00099    0000     N
```

```
140  05 00098  C201  A        EVENT   450,4,FUS@UNLD
     05 0009D  04    A
     05 0009E  0000  N
141  05 000A0  C301  A        EVENT   451,2,TRN1ROLL
     05 000A2  02    A
     05 000A3  0000  N
142  05 000A5  F401  A        EVENT   500,0,DPM@SMPL
     05 000A7  00    A
     05 000A8  0000  N
143  05 000AA  0E02  A        EVENT   526,3,TRN4DTCK
     05 000AC  03    A
     05 000AD  0000  N
144  05 000AF  1B02  A        EVENT   539,0,DVLV@OFF    TURN OFF VAR DENS DEVELOPERS
     05 000B1  00    A
     05 000B2  0000  N
145  05 000B4  5802  A        EVENT   600,0,BIL@PLOP    TEST FOR PLATEN OPEN      (BLG)
     05 000B6  00    A
     05 000B7  0000  N
146  05 000B9  7602  A        EVENT   630,5,INVTRCTL    INVTR GATE & RETURN CONTROL
     05 000BB  05    A
     05 000BC  0000  N
147  05 000BE  8A02  A        EVENT   650,6,DECG@NON    DECISION GATE FOR NON-INVTD
     05 000C0  06    A
     05 000C1  0000  N
148  05 000C3  9A02  A        EVENT   666,0,JAM@DLY
     05 000C5  00    A
     05 000C6  0000  N
149  05 000C8  BC02  A        EVENT   700,7,JAM5@NON    PAPER PATH JAM SW PITCH EVENT
     05 000CA  07    A
     05 000CB  0000  N
150  05 000CD  2003  A        EVENT   800,0,PROGMODE
     05 000CF  00    A
     05 000D0  0000  N
151  05 000D2  2203  A        EVENT   802,0,FSH@ENB
     05 000D4  00    A
     05 000D5  0000  N
152  05 000D7  5003  A        EVENT   848,0,DVB@VAR     TURN ON VARIABLE-BIAS DEVELOPER
     05 000D9  00    A
     05 000DA  0000  N
153  05 000DC  5203  A        EVENT   850,4,SRSK@EV     INIT SRSK & SRT MOTOR
     05 000DE  04    A
     05 000DF  0000  N
154  05 000E1  5403  A        EVENT   852,0,PEC@FFEV    TURN OFF POST EXP. COROTRON
     05 000E3  00    A
     05 000E4  0000  N
155  05 000E6  8C03  A        EVENT   908,0,PEC@NEV     TURN ON POST EXP COROTRON
     05 000E8  00    A
     05 000E9  0000  N
156  05 000EB  8EC3  A        EVENT   910,0,910@EV
     05 000ED  00    A
     05 000EE  0000  N
157  05 000F0  9003  A        EVENT   912,0,DGN@HCNT
     05 000F2  00    A
     05 000F3  0000  N
158  05 000F5  A703  A        EVENT   935,0,OVER@RUN
     05 000F7  00    A
     05 000F8  0000  N
159                           ENDTABLE
```

TABLE III

```
71                                  *
72                                  *        VARIABLE PITCH EVENT TABLE
73                                  *
74             00000001             FLSH@BSE  EQU   1
75             00000019             F@@ONBSE  EQU   25
76             00000064             F@@OFFBS  EQU   100
77   05 00000  0100      A          ROM@FSH   DW    FLSH@BSE
78   05 00002  00        A                    DB    0
79   05 00003  0000      N                    DW    FSH@ON
80   05 00005  6400      A          ROM@@FF   DW    F@@OFFBS
81   05 00007  00        A                    DB    0
82   05 00008  0000      N                    DW    F@@OFF
83   05 0000A  1900      A          ROM@@N    DW    F@@ONBSE
84   05 0000C  00        A                    DB    0
85   05 0000D  0000      N                    DW    F@@ON
86   05 0000F  0100      A          ROM@FSHS  DW    FLSH@BSE
87   05 00011  00        A                    DB    0
88   05 00012  0000      N                    DW    FSH@ON@S
89   05 00014  6400      A          ROM@@FFS  DW    F@@OFFBS
90   05 00016  00        A                    DB    0
91   05 00017  0000      N                    DW    F@@OFF@S
92   05 00019  1900      A          ROM@@NS   DW    F@@ONBSE
93   05 0001B  00        A                    DB    0
94   05 0001C  0000      N                    DW    F@@ON@S
95                                  *
```

TABLE IV

```
          00000396           BASE@CNT SET      918                           #CLK CNTS/PITCH
          0000038E           SAFE@CNT SET      910                           MIN # CLK CNTS/PITCH
                             *
                             *        PITCH TABLE BUILDER
                             *
                             *        BUILD VARIABLE PITCH EVENT TABLE INTO RAM
                             *        FROM ROM DATA + REDUCTION ADJUST & FO TRIM
                             *
     05 000FA   2A0000   N   TBLD@PRT LHLD     ROM@FSH                       H&L= BASE CNT OF FLASH
     05 000FD   EB       A            XCHG                                   D&E= BASE CNT OF FLASH
     05 000FE   2A9AFC   N            LHLD     1FLSH@ON                      H&L= RED ADJ
     05 00101   19       A            DAD      D                             H&L= BASE + ADJ
     05 00102   2244FC   N            SHLD     RAM@FSH                       RAM@FSH = BASE + ADJ
                             *
     05 00105   2A0500   N            LHLD     ROM@OFF                       H&L= BASE CNT OF FO OFF
     05 00108   EB       A            XCHG                                   D&E= BASE CNT OF FO OFF
     05 00109   2A9CFC   N            LHLD     1FO@OFF                       H&L= RED ADJ + TRIM ADJ
     05 0010C   19       A            DAD      D                             H&L= BASE + ADJ
     05 0010D   2249FC   N            SHLD     RAM@OFF                       RAM@OFF = BASE + ADJ
                             *
     05 00110   2A0A00   N            LHLD     ROM@ON                        H&L= BASE CNT OF FO ON
     05 00113   EB       A            XCHG                                   D&E= BASE CNT OF FO ON
     05 00114   2A9EFC   N            LHLD     1FO@ON                        H&L= RED ADJ + TRIM ADJ
     05 00117   19       A            DAD      D                             H&L= BASE + ADJ
     05 00118   CDEA02   N            CALL     ON@MOD                        CALL MOD ROUTINE TO MOD IF<C
     05 0011B   224EFC   N            SHLD     RAM@ON                        RAM@ON = RESULTS OF ABOVE
                             *
     05 0011E   3A31F4   A            IF!      FLG,IMG@SFT,T                 IS THERE IMAGE SHIFT
     05 00121   07       A
     05 00122   D25601   N
     05 00125   3E06     A                 MVI      A,6                      YES,# OF VAR EVENTS TO USE = 6
     05 00127   47       A                 MOV      B,A                      SET UP B-REG FOR LOOP CONTROL
     05 00128   3262FA   N                 STA      TBLD@NUM                 STORE # OF VAR EVENTS
     05 0012B   3D       A                 DCR      A                        SET UP # OF TIMES TO GO
     05 0012C   3263FA   N                 STA      TBLD@TMP                 THRU SORT
                             *
     05 0012F   2A0F00   N                 LHLD     ROM@FSHS                 UPDATE ROM@FSHS TO
     05 00132   EB       A                 XCHG                              INCLUDE RED MODE ADJ + SHIFT
     05 00133   2AA0FC   N                 LHLD     2FLSH@ON                 ADJ AND SAVE FOR THE
     05 00136   19       A                 DAD      D                        IMAGE SHIFT
     05 00137   2253FC   N                 SHLD     RAM@FSHS                 FLASH EVENT
                             *
     05 0013A   2A1400   N                 LHLD     ROM@OFFS                 UPDATE ROM@OFFS TO INCLUDE
     05 0013D   EB       A                 XCHG                              RED MODE ADJ + TRIM ADJ +
     05 0013E   2AA2FC   N                 LHLD     2FO@OFF                  SHIFT ADJ AND SAVE
     05 00141   19       A                 DAD      D                        FOR THE IMAGE SHIFT
     05 00142   2258FC   N                 SHLD     RAM@OFFS                 FADE OUT EVENT
                             *
     05 00145   2A1900   N                 LHLD     ROM@ONS                  UPDATE ROM@ONS TO INCLUDE
     05 00148   EB       A                 XCHG                              RED MODE ADJ + TRIM ADJ +
     05 00149   2AA4FC   N                 LHLD     2FO@ON                   SHIFT ADJ
     05 0014C   19       A                 DAD      D
     05 0014D   CDEA02   N                 CALL     ON@MOD                   CALL MOD ROUTINE TO MOD IF <0
     05 00150   225DFC   N                 SHLD     RAM@ONS                  SAVE THE RESULTS
                             *
     05 00153   C36001   N            ELSE!
     05 00156   3E03     A                 MVI      A,3                      IF IMAGE SHIFT NOT SET
     05 00158   47       A                 MOV      B,A                      #OF VAR EVENTS TO USE = 3
     05 00159   3262FA   N                 STA      TBLD@NUM                 SET UP B-REG FOR LOOP CONTROL
     05 0015C   3D       A                 DCR      A                        STORE # OF VAR EVENTS & SETUP
     05 0015D   3263FA   N                 STA      TBLD@TMP                 #OF TIMES TO GO THRU SORT
                                      ENDIF
                             *
```

```
                             *
                             *        SUBROUTINE TO DETERMINE IF MODIFIED FO ON EVENT
                             *        CLK COUNT IF CLK COUNT RESULTS ARE NEGATIVE OR 0
                             *
     05 002EA   7C       A   ON@MOD   MOV      A,H                           A= MS PART OF ABS CLK COUNT
     05 002EB   07       A            RLC                                    CARRY= SIGN OF ABS CLK COUNT
     05 002EC   D20203   N            IF!      CC,C,S                        IS THE ABS CLK CNT NEG
     05 002EF   119603   A                 LXI      D,BASE@CNT               YES,ADD # CLK COUNTS PER PITCH
     05 002F2   19       A                 DAD      D                        TO NEG #
     05 002F3   118E03   A                 IF!      XWRD,H,GE,SAFE@CNT       IS RESULTS GE SAFE # CLK/PITCH
     05 002F6   CD0000   N
     05 002F9   DAFF02   N
     05 002FC   210100   A                      LXI      H,1                 YES,MOVE TO TURN ON LATER
                                           ENDIF
     05 002FF   C30E03   N            ORIF!    XWRD,H,EQ,0                   IF RESULTS = 0, MOVE LATER IN
     05 00302   110000   A
     05 00305   CD0000   N
     05 00308   C20E03   N
     05 0030B   210100   A                 LXI      H,1                      PITCH BECUASE EVENT MUST BE > 0
                                      ENDIF
     05 0030E   C9       A            RET
                                      END

CONTROL SECTION SUMMARY: 01 00000   PT 0    02 00000   PT 0    03 00000   PT 0    04 OFFD8   PT 2
                         05 0030F   PT 1
* NO UNDEFINED SYMBOLS
*    ERROR SEVERITY LEVEL: 0
* NO ERROR LINES
```

TABLE V

```
252                                   *
253                                   *     SORTS VARIABLE RAM EVENT TABLE BY
254                                   *     ABS CLK COUNT & LOWEST ENDS IN EV@RAM
255                                   *
256                                   *     SORTS ONLY 1ST 3 IF NO IMAGE SHIFT, OTHERWISE SORTS ALL 6
257                                   *
258  05 0017E   2144FC    N    LXI     H,EV@RAM                         H&L= ADDR OF TOP OF VAR RAM TBL
259  05 00181   3A63FA    N    WHILE:  XBYT,TBLD@TMP,NE,0              TIMES TO GO THRU OUTER LOOP
     05 00184   FE00      A
     05 00186   CAFD01    N
260  05 00189   3253FA    N       STA     IN@LP@CT                     INTER LOOP CNT=OUTER LOOP CNT
261  05 0018C   3E*0      A       SFLG    TBLD@1ST                     SET 1ST FLAG FOR THIS POSITION
     05 0018E   325EF4    A
262  05 00191   2252FB    N       SHLD    FIX@ADDR                     ADDR OF POSITION TO FULL
263  05 00194   B7        A       ORA     A                            CLEAR Z CONDITION BIT
264  05 00195   CAEF01    N       WHILE:  CC,Z,C
265  05 00198   5E        A          MOV     E,M                       E= LS PART OF ABS CLK COUNT
266  05 00199   23        A          INX     H
267  05 0019A   56        A          MOV     D,M                       D= MS PART OF ABS CLK COUNT
268  05 0019B   D5        A          PUSH    D                         STORE ABS CLK CNT OF FILL POS
269  05 0019C   3A5EF4    A          IF:     FLG,TBLD@1ST,T            IS IT 1ST TIME FOR THIS POS
     05 0019F   07        A
     05 001A0   D2AE01    N
270  05 001A3   AF        A             CFLG    TBLD@1ST               YES, CLEAR ITS FLAG
     05 001A4   325EF4    A                                            ,
271  05 001A7   23        A             INX     H                      AND INCREMENT
272  05 001A8   23        A             INX     H                      POINTER TO LS PART OF
273  05 001A9   23        A             INX     H                      ABS CLK COUNT OF NEXT
274  05 001AA   23        A             INX     H                      EVENT
275  05 001AB   C3B601    N          ELSE:
276  05 001AE   2A5CFB    N             LHLD    VAR@ADDR               H&L= ADDR
277  05 001B1   23        A             INX     H                      OF LS PART OF
278  05 001B2   23        A             INX     H                      ABS CLK COUNT TO
279  05 001B3   23        A             INX     H                      COMPARE TO FILL
280  05 001B4   23        A             INX     H                      POSITION
281  05 001B5   23        A             INX     H
282                                   ENDIF
283  05 001B6   225CFB    N          SHLD    VAR@ADDR                  STORE POINTER TO COMPARE EVENT
284  05 001B9   5E        A          MOV     E,M                       E= LS PART OF COMPARE ABS CLK
285  05 001BA   23        A          INX     H
286  05 001BB   56        A          MOV     D,M                       D= MS PART OF COMPARE ABS CLK
287  05 001BC   E1        A          POP     H                         H&L= ABS CLK COUNT OF FILL POS
288  05 001BD   EB        A          IF:     XWRD,D,LT,H               IS CLK OF COMPARE < FILL
     05 001BE   CD0000    N
     05 001C1   D2E501    N
289  05 001C4   2A5CFB    N             LHLD    VAR@ADDR               YES, SWITCH THE 2 EVENTS
290  05 001C7   EB        A             XCHG                           D&E= ADDR LOWER CLK VALUE
291  05 001C8   2A52FB    N             LHLD    FIX@ADDR               H&L= ADDR LARGER CLK VALUE
292  05 001CB   3EFB      A             MVI     A,-5                   INITIALIZE LOOP COUNTER TO 5
293  05 001CD   3265FA    N             STA     TSW@NUM                WHICH = # OF ITEMS TO MOVE
294  05 001D0   B7        A             ORA     A                      CLEAR Z CONDITION BIT
295  05 001D1   CAE501    N             WHILE:  CC,Z,C
296  05 001D4   1A        A                LDAX    D                   A= CONTAINS OF COMPARE EVENT
297  05 001D5   46        A                MOV     B,M                 B= CONTAINS OF FILL EVENT
298  05 001D6   77        A                MOV     M,A                 UPDATE FILL POS
299  05 001D7   78        A                MOV     A,B                 UPDATE COMPARE POS
300  05 001D8   12        A                STAX    D                   WITH NEW VALUE
301  05 001D9   13        A                INX     D                   MOVE POINTERS TO
302  05 001DA   23        A                INX     H                   NEXT ITEM
303  05 001DB   3A65FA    N                LDA     TSW@NUM             INC MOVE
304  05 001DE   3C        A                INR     A                   LOOP CONTROL
305  05 001DF   3265FA    N                STA     TSW@NUM             COUNTER
306  05 001E2   C3D101    N             ENDWHILE
307                                   ENDIF
308  05 001E5   2153FA    N          DECBYT  IN@LP@CT                  DECRM INNER LOOP CNTR
     05 001E8   35        A
309  05 001E9   2A52FB    N          LHLD    FIX@ADDR                  H&L= ADDR OF FILL POSITION
310  05 001EC   C39501    N       ENDWHILE
311  05 001EF   110500    A       LXI     D,5                          MOVE H&L TO LOOK AT NEXT EVENT
312  05 001F2   19        A       DAD     D                            POSITION TO FILL
313  05 001F3   3A63FA    N       LDA     TBLD@TMP                     DECREMENT # OF EVENTS
314  05 001F6   3D        A       DCR     A                            TO SORT
315  05 001F7   3263FA    N       STA     TBLD@TMP
316  05 001FA   C38101    N    ENDWHILE
```

TABLE VI

```
223                                   *
224                                   *     MOVE THE SR# & EVENT ADDR FROM ROM TABLE
225                                   *     TO RAM TABLE. MOVES ONLY THE FIRST 3 IF
226                                   *     NO IMAGE SHIFT, OTHERWISE MOVES ALL 6
227                                   *
228  05 00160   1144FC    N    LXI     D,RAM@FSH                        D&E = ADDR OF RAM TABLE
229  05 00163   210000    N    LXI     H,ROM@FSH                        H&L = ADDR OF ROM TABLE
230  05 00166   B0        A    ORA     B                                CLEAR Z CONDITION BIT
231  05 00167   CA7E01    N    WHILE:  CC,Z,C
232  05 0016A   23        A       INX     H                             INCREMENT H&L AND D&E
233  05 0016B   23        A       INX     H                             POINTERS OVER THE
234  05 0016C   13        A       INX     D                             ABS CLK COUNT
235  05 0016D   13        A       INX     D
236  05 0016E   7E        A       MOV     A,M                           LOAD A WITH SR#
237  05 0016F   12        A       STAX    D                             STORE SR# IN RAM TABLE
238  05 00170   23        A       INX     H                             MOVE POINTERS TO LS
239  05 00171   13        A       INX     D                             ADDR OF EVENT
```

```
05 00172   7E       A              MOV     A,M                   LOAD A WITH LS ADDR OF EVENT
05 00173   12       A              STAX    D                     & STORE IT IN RAM TABLE
05 00174   23       A              INX     H                     MOVE POINTERS TO MS
05 00175   13       A              INX     D                     ADDR OF EVENT
05 00176   7E       A              MOV     A,M                   MOVE MS ADDR OF EVENT
05 00177   12       A              STAX    D                     TO RAM
05 00178   23       A              INX     H                     MOVES POINTERS TO
05 00179   13       A              INX     D                     LS PART OF ABS CLK COUNT
05 0017A   05       A              DCR     B                     DECREMENT LOOP COUNTER
05 0017B   C36701   N            ENDWHILE
                          *
```

TABLE VII

```
                          *
                          *      MERGE VARIABLE PITCH EVENT TABLE & FIXED EVENT
                          *      TABLE CALCULATING THE REL DIFFERENCE WITH THE
                          *      RESULTS GOING INTO THE RUN EVENT TABLE
                          *
05 001FD   2A44FC   N            LHLD      EV@RAM                     INITIALIZE VAR@CLK TO ABS CLK
05 00200   225EFB   N            SHLD      VAR@CLK                    COUNT OF 1ST VAR PITCH EVENT
05 00203   2144FC   N            LXI       H,EV@RAM                   INITIALIZE VAR@ADDR TO ADDR OF
05 00206   225CFB   N            SHLD      VAR@ADDR                   1ST VAR PITCH EVENT
05 00209   211E00   N            LXI       H,EV@ROM                   INITIALIZE FIX@ADDR TO ADDR OF
05 0020C   2252FB   N            SHLD      FIX@ADDR                   1ST FIXED PITCH EVENT
05 0020F   3E80     A            SFLG      TBLD@1ST                   NOTES 1ST EVENT TO RUN TABLE
05 00211   325EF4   A
05 00214   3E2C     A            MVI       A,TABLENUM                 INITIALIZE TSW@NUM TO # OF
05 00216   3265FA   N            STA       TSW@NUM                    EVENTS IN FIXED PITCH TABLE
05 00219   2A1E00   N            LHLD      EV@ROM                     INITIALIZE D&E WITH ABS CLOCK
05 0021C   EB       A            XCHG                                 COUNT OF 1ST FIXED EVENT
05 0021D   AF       A            CFLG      VAR@DONE                   FLAG DENOTES VAR EVENTS
05 0021E   3259F4   A
05 00221   3A59F4   A            WHILE:    FLG,VAR@DONE,F             WHILE THERE ARE MORE VAR EVENTS
05 00224   07       A
05 00225   DA6F02   N
05 00228   2A5EFB   N                IF:       XWRD,VAR@CLK,LE,D      IS VAR CLK CNT <= FIXED CLK CNT
05 0022B   CD0000   N
05 0022E   DA3402   N
05 00231   C25902   N
05 00234   2A5CFB   N                    LHLD      VAR@ADDR           YES, H&L= VAR EVENT ADDR
05 00237   CD9302   N                    CALL      TBLD@UPD           PLACE VAR EVENT AT END RUN TBL
05 0023A   3A62FA   N                    LDA       TBLD@NUM           DECREMENT # OF
05 0023D   3D       A                    DCR       A                  VARIABLE EVENTS LEFT
05 0023E   3262FA   N                    STA       TBLD@NUM           TO MERGE
05 00241   C24C02   N                    IF:       CC,Z,S             DID TBLD@NUM GO TO 0
05 00244   3E80     A                        SFLG      VAR@DONE       YES,DENOTE NO MORE VAR EVENTS
05 00246   3259F4   A
05 00249   C35602   N                    ELSE:
05 0024C   225CFB   N                        SHLD      VAR@ADDR       STORE ADDR OF NEXT VAR EVENT
05 0024F   5E       A                        MOV       E,M            UPDATE VAR@CLK TO
05 00250   23       A                        INX       H              VALUE OF ABS CLK COUNT
05 00251   56       A                        MOV       D,M            OF PRESENT VARIABLE
05 00252   EB       A                        XCHG                     EVENT
05 00253   225EFB   N                        SHLD      VAR@CLK
                                         ENDIF
05 00256   C36602   N                ELSE:                            IF FIXED TABLE CLK COUNT IS
05 00259   2A52FB   N                    LHLD      FIX@ADDR           LESS THEN VAR TABLE UPDATE THE
05 0025C   CD9302   N                    CALL      TBLD@UPD           RUN TABLE WITH THAT EVENT
05 0025F   2252FB   N                    SHLD      FIX@ADDR           UPDATE TO NEXT FIXED EVENT
05 00262   2165FA   N                    LXI       H,TSW@NUM          DECREMENT # OF FIXED EVENTS
05 00265   35       A                    DCR       M                  LEFT
                                     ENDIF
05 00266   2A52FB   N                LHLD      FIX@ADDR
05 00269   5E       A                MOV       E,M                    UPDATE D&L TO =
05 0026A   23       A                INX       H                      ABS CLK CNT VALUE
05 0026B   56       A                MOV       D,M                    OF PRESENT FIXED TABLE
05 0026C   C32102   N            ENDWHILE
05 0026F   3EFF     A            MVI       A,X'FF'                    CLEAR Z CONDITION
05 00271   B7       A            ORA       A                          BIT FOR LOOP
05 00272   2A52FB   N            LHLD      FIX@ADDR                   NO MORE VAR EVENTS, USE FIXED
05 00275   CA8402   N            WHILE:    CC,Z,C                     DONE WITH FIXED TABLE
05 00278   CD9302   N                CALL      TBLD@UPD               NO,UPDATE RUN TABLE
05 0027B   EB       A                XCHG                             SAVE H&L IN D&E
05 0027C   2165FA   N                LXI       H,TSW@NUM              DECREMENT # OF FIXED
05 0027F   35       A                DCR       M                      EVENTS LEFT
05 00280   EB       A                XCHG                             RESTORE H&L
05 00281   C37502   N            ENDWHILE
05 00284   2A58FB   N            LHLD      P@TBL@A                    H&L=ADDR OF LAST MS ADDR IN RUN
05 00287   2B       A            DCX       H                          MOVE H&L POINTER BACK TO POINT
05 00288   2B       A            DCX       H                          AT THE BEGINNING OF THE LAST
05 00289   2B       A            DCX       H                          EVENT (OVER@RUN) & STORE IT
05 0028A   2264FD   N            SHLD      EV@PTR:                    FOR MACH CLK INTERRUPT HANDLER
05 0028D   3E80     A            SFLG      TBLD@FIN                   DENOTES PITCH TABLE IS COMPLETE
05 0028F   325DF4   A
05 00292   C9       A            RET

                          *
                          *      SUBROUTINE TO CALCULATE REL DIFFERENCE BETWEEN
                          *      2 EVENTS & MOVE REST OF TABLE TO RUN TABLE
                          *
05 00293   3A5EF4   A     TBLD@UPD IF:     FLG,TBLD@1ST,T             THIS IS THE FIRST EVENT
05 00296   07       A
05 00297   D2AF02   N
```

```
387   05 0029A   AF       A           CFLG    TBLD@1ST              YES, CLR FLAG TO KEEP OUT
      05 0029B   325EF4   A
388   05 0029E   7E       A           MOV     A,M                   A= LS OF 1ST EVENT ABS CLK CNT
389   05 0029F   3251FA   N           STA     EV@1@TIM              USED AT PITCH RESET
390   05 002A2   5F       A           MOV     E,A                   E=LS OF 1ST EVENT ABS CLK CNT
391   05 002A3   23       A           INX     H                     H&L=ADDR OF MS ABS CLK CNT
392   05 002A4   56       A           MOV     D,M                   D=MS OF 1ST EVENT ABS CLK CNT
393   05 002A5   EB       A           XCHG                          D&E= ADDR OF MS ABS CLK CNT
394   05 002A6   2256FB   N           SHLD    LCLK@CNT              STORE ABS CLK OF 1ST EVENT
395   05 002A9   21E8FE   N           LXI     H,EV@BASE1            H&L = ADDR OF RUN TABLE
396   05 002AC   C3D802   N       ELSE:
397   05 002AF   5E       A           MOV     E,M                   E=LS CLK CNT OF NEW EVENT
398   05 002B0   23       A           INX     H                     H&L= ADDR OF MS ABS CLK CNT
399   05 002B1   56       A           MOV     D,M                   D=MS CLK CNT OF NEW EVENT
400   05 002B2   E5       A           PUSH    H                     SAVE ADDR OF MS ABS CLK CNT
401   05 002B3   2A56FB   N           IF:     XWRD,LCLK@CNT,GE,D    IS LAST CLK CNT GE NEW CLK CNT
      05 002B6   CD0000   N
      05 002B9   DAC502   N
402   05 002BC   23       A               INX     H                 H&L= LAST CLK CNT + 1
403   05 002BD   2256FB   N               SHLD    LCLK@CNT          STORE IT FOR NEXT TIME
404   05 002C0   3E01     A               MVI     A,1               PUT THIS EVENT AT THE NEXT CLK
405   05 002C2   C3CC02   N           ELSE:
406   05 002C5   45       A               MOV     B,L               B=LS CLK CNT OF LAST EVENT
407   05 002C6   EB       A               XCHG                      H&L=ABS CLK CNT OF NEW EVENT
408   05 002C7   2256FB   N               SHLD    LCLK@CNT          STORE IT FOR THE NEXT TIME
409   05 002CA   7D       A               MOV     A,L               A=LS CLK CNT OF NEW EVENT
410   05 002CB   90       A               SUB     B                 FIND DIFF (ONLY NEED LS IF CLK
411                                   ENDIF                         CNTS BETWEEN EVENTS <256)
412   05 002CC   D1       A           POP     D                     D&E=ADDR OF MS OF CLK OF NEW EV
413   05 002CD   2A58FB   N           LHLD    P@TBL@A               H&L= ADDR OF END OF LAST RUN EV
414   05 002D0   2B       A           DCX     H                     MOVE H&L POINTER
415   05 002D1   2B       A           DCX     H                     TO REL DIFF OF LAST
416   05 002D2   2B       A           DCX     H                     EVENT IN RUN TABLE
417   05 002D3   77       A           MOV     M,A                   MOVE REL DIFF TO RUN TABLE
418   05 002D4   23       A           INX     H                     INCREMENT RUN TABLE
419   05 002D5   23       A           INX     H                     POINTER OVER LAST
420   05 002D6   23       A           INX     H                     EVENT
421   05 002D7   23       A           INX     H
422                               ENDIF
423   05 002D8   23       A       INX     H                         H&L= ADDR OF SR# IN RUN TABLE
424   05 002D9   13       A       INX     D                         D&E= ADDR OF SR#
425   05 002DA   1A       A       LDAX    D                         MOVE SR# FROM TABLE TO
426   05 002DB   77       A       MOV     M,A                       RUN TABLE
427   05 002DC   23       A       INX     H                         MOVE POINTERS TO LS 8 BITS
428   05 002DD   13       A       INX     D                         OF EVENT ADDR
429   05 002DE   1A       A       LDAX    D                         MOVE LS 8 BITS OF ADDR
430   05 002DF   77       A       MOV     M,A
431   05 002E0   23       A       INX     H                         MOVES POINTER TO MS 8 BITS
432   05 002E1   13       A       INX     D                         OF EVENT ADDR
433   05 002E2   1A       A       LDAX    D                         MOVES MS 8 BITS OF ADDR
434   05 002E3   77       A       MOV     M,A
435   05 002E4   2258FB   N       SHLD    P@TBL@A                   STORE ADDR OF RUN TABLE
436   05 002E7   13       A       INX     D                         POINTER TO LS 8 BITS OF CLK CNT
437   05 002E8   EB       A       XCHG                              H&L= ADDR OF LS 8 BITS OF CLK
438   05 002E9   C9       A       RET

440                           *
441                           *   SUBROUTINE TO DETERMINE IF MODIFIED FO ON EVENT
442                           *   CLK COUNT IF CLK COUNT RESULTS ARE NEGATIVE OR 0
443                           *
444   05 002EA   7C       A   ON@MOD  MOV     A,M                       A= MS PART OF ABS CLK COUNT
445   05 002EB   07       A       RLC                               CARRY= SIGN OF ABS CLK COUNT
446   05 002EC   D20203   N       IF:     CC,C,S                    IS THE ABS CLK CNT NEG
447   05 002EF   119603   A           LXI     D,BASE@CNT            YES,ADD # CLK COUNTS PER PITCH
448   05 002F2   19       A           DAD     D                     TO NEG #
449   05 002F3   118E03   A           IF:     XWRD,H,GE,SAFE@CNT    IS RESULTS GE SAFE # CLK/PITCH
      05 002F6   CD0000   N
      05 002F9   DAFF02   N
450   05 002FC   210100   A               LXI     H,1               YES,MOVE TO TURN ON LATER
451                                   ENDIF
452   05 002FF   C30E03   N       ORIF:   XWRD,H,EQ,0               IF RESULTS = 0, MOVE LATER IN
      05 00302   110000   A
      05 00305   CD0000   N
      05 00308   C20E03   N
453   05 0030B   210100   A           LXI     H,1                   PITCH BECUASE EVENT MUST BE > 0
454                               ENDIF
455   05 0030E   C9       A       RET
456                               END

CONTROL SECTION SUMMARY: 01 00000   PT 0    02 00000   PT 0    03 00000   PT 0    04 OFF08   PT 2
                         05 0030F   PT 1
* NO UNDEFINED SYMBOLS
*    ERROR SEVERITY LEVEL: 0
* NO ERROR LINES
```

TABLE VIII

```
219                           *
220                           * PITCH RESET INTERRUPT HANDLER
221                           *

223   06 000F9   FB       A   RSET:   EI                                RE-ENABLE INTERRUPTS
224   06 000FA   F5       A           PUSH    PSW                       SAVE A-REG & CONDITION BITS
225   06 000FB   3A5DF4   A           IF:     FLG,TBLD@FIN,T            IS PITCH TABLE BUILD FINISHED
      06 000FE   07       A
      06 000FF   D26201   N
226   06 00102   E5       A               PUSH    H                     SAVE H&L
227                                       IF:     FLGS,SR@DONE,T        YES, IS THERE A NEW SR VALUE
228   06 00103   3A4DF4   A                       AND,910@DONE,T        YES, DID 910 EVENT GET DONE
```

```
06 00106   216FF4   A
06 00109   A6       A
06 0010A   F25501   N
06 0010D   AF       A            CFLG      910@DONE                 YES, RESET & MACH CLK TIMING OK
06 0010E   326FF4   A
06 00111   324DF4   A            MODFLG    SR@DONE                  CLR FLAG UNTIL NEXT SR EVENT
06 00114   2163FD   A            LXI       H,ADR(DATA,SR@PTR!)      LOAD RELATIVE
06 00117   7E       A            MOV       A,M                                 PNTR TO SR #0
06 00118   C60F     A            MODBYT    A,ADD,15                 MOVE PNTR BACK
06 0011A   E66F     A            MODBYT    A,AND,SR@ADJ!                        BY 1 (CIRCULAR)
06 0011C   77       A            MOV       M,A                      SAVE NEW REL SR PNTR IN SR@PTR!
06 0011D   26FE     A            MVI       H,HADR(DATA,SHIFTREG)    H&L= ABS ADDR
06 0011F   6F       A            MOV       L,A                                  OF SR #0
06 00120   3A69FD   A            LDA       ADR(DATA,SR@VALU!)       A= NEW SR VALUE FROM SRSK
06 00123   77       A            MOV       M,A                      UPDATE CONTENTS OF SR#0
06 00124   3A51FA   A            LDA       ADR(DATA,EV01@TIM)       INIT MCLK!CNT
06 00127   326EFD   A            STA       ADR(DATA,MCLK!CNT)                  TO 1ST EVENT TIME
06 0012A   21E8FE   A            LXI       H,ADR(DATA,EV@BASE!)     INIT EV@PTR!
06 0012D   2264FD   A            SHLD      ADR(DATA,EV@PTR!)                   TO 1ST EVENT ADDR
                                 IF!       FLGS,NORM@DN!,,          IS NORMAL SHUTDOWN REQUESTED
                                           AND,CYCL@DN!,,           NO, IS CYCLE-DOWN REQUESTED
06 00130   3AABF4   A                      AND,SD1@DLY,F            NO, IS PROC DEAD CYCLING
06 00133   21AAF4   A
06 00136   B6       A
06 00137   21AFF4   A
06 0013A   B6       A
06 0013B   FA5201   N
06 0013E   2166FD   A                 LXI       H,ADR(DATA,CYCUPCT!) NO, LOAD CYCLE-UP CNTR
06 00141   7E       A                 IF!       XBYT,M,NE,5          IS PROC IN CYCLE-UP MODE
06 00142   FE05     A
06 00144   CA5201   N
06 00147   FE04     A                    IF!       XBYT,A,EQ,4       YES, IS IT RDY TO MAKE 1ST IMG
06 00149   C25101   N
06 0014C   3E80     A                       SFLG      IMGMADE!       YES, SIGNAL 1ST IMAGE MADE
06 0014E   32ADF4   A
                                          ENDIF
06 00151   34       A                     INR       M                INCRM CYCLE-UP CNTR (UNTIL= 5)
                                      ENDIF
                                 ENDIF
06 00152   C36101   N         ELSE!                                   NEW SR VALUE NOT AVAILABLE
06 00155   3E80     A            SFLG      IMED@DN!                  REQUEST AN IMED SHUTDOWN
06 00157   32A9F4   A
06 0015A   2132FD   A            SFBIT,P   E@PR@FLT                  SIGNAL EARLY PITCH RESET FAULT
06 0015D   3E40     A
06 0015F   B6       A
06 00160   77       A
                              ENDIF
06 00161   E1       A         POP       H                            RESTORE H&L
                           ENDIF
06 00162   3EFE     A      MVI       A,RSETFF!                       RESET PITCH RESET
06 00164   3200E6   A      STA       ADR(EQU,RSINTFF!)                           INT FLIP-FLOP
06 00167   F1       A      POP       PSW                             RESTORE A-REG & CONDITION BITS
06 00168   C9       A      RET                                       RETURN TO INTERRUPTED ROUTINE
```

TABLE IX

```
                          *
                          * MACHINE CLOCK INTERRUPT HANDLER
                          *

      06 0002B                   ORIGIN    X'38'                  INTERRUPT TRAP CELL LOCATION

06 00038   F5       A   MCLK!    PUSH      PSW                    SAVE A-REG & CONDITION CODES
06 00039   3A6EFD   A            LDA       ADR(DATA,MCLK!CNT)     IS THERE
06 0003C   3D       A            DCR       A                               A PITCH
06 0003D   C26100   N            IF!       CC,Z,S                                   EVENT TO DO
06 00040   E5       A               PUSH      H                   YES, SAVE
06 00041   D5       A               PUSH      D                              ALL REMAINING
06 00042   C5       A               PUSH      B                                          REGS
06 00043   2A64FD   A               LHLD      ADR(DATA,EV@PTR!)   H&L= 1ST LOC OF NEXT PE TO DO
06 00046   7E       A               MOV       A,M                 SAVE RELATIVE DIFFERENTIAL TO
06 00047   326EFD   A               STA       ADR(DATA,MCLK!CNT)   NEXT EVENT (# CLOCK COUNTS)
06 0004A   23       A               INX       H                   MOVE PNTR TO REL SR IN TABLE
06 0004B   3A63FD   A               LDA       ADR(DATA,SR@PTR!)   LOAD REL POSITION OF SR #0
06 0004E   86       A               MODBYT    A,ADD,M             C= LS PORTION OF ADDR OF THE
06 0004F   E66F     A               MODBYT    A,AND,SR@ADJ!        REQUESTED SHIFT REGISTER
06 00051   4F       A               MOV       C,A                  POSITION (FOR USE WITHIN PE)
06 00052   06FE     A               MVI       B,HADR(SHIFTREG)    B&C= ADDR REQUESTED SR POSITION
06 00054   0A       A               LDAX      B                   A= <REQUESTED SR POSITION>
06 00055   23       A               INX       H                   E= LS PORTION OF ADDR OF THE
06 00056   5E       A               MOV       E,M                  REQUESTED PITCH EVENT
06 00057   23       A               INX       H                   D= MS PORTION OF ADDR OF THE
06 00058   56       A               MOV       D,M                  REQUESTED PITCH EVENT
06 00059   23       A               INX       H                   SAVE PNTR TO
06 0005A   2264FD   A               SHLD      ADR(DATA,EV@PTR!)                NEXT PITCH EVENT
06 0005D   CD0000   N               CALL      DE!IND              VECTOR TO REQUESTED PITCH EVENT
06 00060   C1       A               POP       B                   RESTORE
06 00061   D1       A               POP       D                              SAVED
06 00062   E1       A               POP       H                                  REGISTERS
06 00063   C37000   N            ELSE!
06 00066   326EFD   A               STA       ADR(DATA,MCLK!CNT)  NO PE, SAVE DECRM'D 'MCLK!CNT'
06 00069   0F       A               RRC                           IS IT TIME FOR
06 0006A   D27000   N               IF!       CC,C,S                           A REFRESH
06 0006D   320216   A                  REFRESH                    YES, REFRESH REMOTES (1 MSEC)
                                    ENDIF
                                 ENDIF
```

```
06 00070  FB      A          EI                                    RE-ENABLE INTERRUPT SYSTEM
06 00071  3EFD    A          MVI      A,MCLKFF!                    RESET MCLK
06 00073  3200E6  A          STA      ADR(EQU,RSINTFF!)                 INTERRUPT FLIP-FLOP
06 00076  F1      A          POP      PSW                          RESTORE A-REG & CONDITION CODES
06 00077  C9      A          RET                                   RETURN TO INTERRUPTED ROUTINE
```

TABLE X

```
                     *
                     * REAL TIME CLOCK INTERRUPT HANDLER
                     *
06 00081  FB      A  RTC!   EI                                     RE-ENABLE INTERRUPTS
06 00082  F5      A         PUSH     PSW                           SAVE A-REG & CONDITION BITS
06 00083  3EF7    A         MVI      A,RTCFF!                      RESET RTC
06 00085  3200E6  A         STA      ADR(EQU,RSINTFF!)                 INTERRUPT FLIP-FLOP
06 00088  D5      A         PUSH     D                             SAVE D&E REGS
06 00089  E5      A         PUSH     H                             SAVE H&L REGS
06 0008A  C5      A         PUSH     B                             SAVE 'B' REGISTER
                     *
06 0008B  210FD   N         DECBYT   GLB!TIMR                      DECREMENT THE CLOCK CELL
06 0008E  35      A
06 0008F  7E      A         MOV      A,M                           A = <GLB!TIMR>  ( 0 TO 255 )
06 00090  23      A         INX      H                             MEM. PTR. TO SB!RQST BYTE
06 00091  E601    A         IF!      XBYT,A,AND,X'(1',NZ           IS IT 20 MSEC TIME YET
06 00093  CA0D00  N
06 00096  7E      A            MODBYT    M,OR,10!RQST!20!RQST      YES - BOTH 10 AND 20 BKGD
06 00097  F600    A
06 00099  77      A
06 0009A  C3.100  N         ELSE!
06 0009D  7E      A            MODBYT    M,OR,10!RQST              NO - 10 BKGD ONLY
06 0009E  F600    A
06 000A0  77      A
                            ENDIF
06 000A1  23      A         INX      H                             MEM. PTR. TO DIVD!10 CNTR
06 000A2  35      A         DCR      M                             DECREMENT 10 TO 0 COUNTER
06 000A3  C2AD00  N         IF!      CC,Z,S                        HAS 100 MSEC PASSED
06 000A6  360A    A            MVI       M,10                      YES - RESET THE 10 TO 0 COUNTER
06 000A8  2B      A            DCX       H                         MEM. PTR. BACK TO SB!RQST
06 000A9  7E      A            MODBYT    M,OR,100!RQST             ADD 100 BKGD TO REQUEST BYTE
06 000AA  F620    A
06 000AC  77      A
                            ENDIF
                            REPEAT                                 NOW CHECK FOR TIME OUTS
06 000AD  2150FD  N            LXI       H,GLB:TIMR                LOAD 'B' WITH QUANTITY TO LOOK
06 000B0  46      A            MOV       B,M                       FOR (CLOCK CELL VALUE)
06 000B1  16FB    A            MVI       D,COUNT!                  SET 'D' FOR TABLE TO SEARCH
06 000B3  CD0000  N            CALL      FIND:LOC                  GO LOOK IN ACTIVE LIST
06 000B6  CAF000  N            IF!       CC,Z,C                    HAS A MATCH BEEN FOUND
06 000B9  E5      A               PUSH      H                      YES - SAVE LOCATION ON STACK
06 000BA  26FC    A               MVI       H,ID!                  SEGWAY MEM PTR TO ID! TABLE
06 000BC  5E      A               MOV       E,M                    NOW ASSEMBLE
06 000BD  1600    A               MVI       D,0                    ADDRESS OF TIMER
06 000BF  21C8F4  A               LXI       H,TMR!FLGS             FLAG INTO THE
06 000C2  19      A               DAD       D                      MEMORY POINTER
06 000C3  0600    A               MVI       B,0                    GET SET TO CLEAR THE FLAG
06 000C5  F3      A               DI                               NO INTERRUPTIONS NOW, PLEASE
06 000C6  7E      A               MOV       A,M                    GET FLAG
06 000C7  07      A               RLC                              INTO THE CARRY BIT
06 000C8  D2EC00  N               IF!       CC,C,S                 IS FLAG SET
06 000CB  70      A                  MOV       M,B                 YES - RESET AND NOW
06 000CC  FB      A                  EI                            EVERYBODY CAN INTERRUPT AGAIN
06 000CD  E1      A                  POP       H                   LOCATION FROM STACK TO MEM PTR
06 000CE  26FD    A                  MVI       H,LS!ADDR           SEGWAY MEM PTR TO LS! TABLE
06 000D0  5E      A                  MOV       E,M                 GET LS TIME-OUT ADDRESS
06 000D1  24      A                  INR       H                   SEGWAY MEM PTR TO MS! TABLE
06 000D2  56      A                  MOV       D,M                 GET MS TIME-OUT ADDRESS
06 000D3  45      A                  MOV       B,L                 LOCATION TO 'B' TEMPORARILY
06 000D4  2A5FFD  N                  LHLD      INPTR!              STUFF TIME-OUT ADDRESS INTO
06 000D7  73      A                  MOV       M,E                 INTO TABLE OF TIME-OUT
06 000D8  23      A                  INX       H                   ADDRESSES THAT IS CHECKED
06 000D9  72      A                  MOV       M,D                 FOR ENTRIES EVERY 10 MSECONDS
06 000DA  23      A                  INX       H                   BY THE STATE CHECKER
06 000DB  7D      A                  MODBYT    L,AND,TIME!MSK      FORCE A CIRCULAR TABLE
06 000DC  E62F    A
06 000DE  6F      A
06 000DF  225FFD  N                  SHLD      INPTR!              SAVE NEW ADDRESS LOCATION
06 000E2  58      A                  MOV       E,B                 LOCATION BACK TO 'E'
06 000E3  CD0000  N                  CALL      DEACTIV!            TAKE OUT OF ACTIVE TIMER LIST
06 000E6  CD0000  N                  CALL      PUT!                AND MAKE LOCATION AVAILABLE
06 000E9  C3EE00  N               ELSE!                            * * * FLAG IS NOT SET SO
06 000EC  FB      A                  EI                               LET INTERRUPTIONS OCCUR
06 000ED  E1      A                  POP       H                      MAKE THE STACK RIGHT AND
                                  ENDIF                               FORCE NON-ZERO CONDITION TO
06 000EE  F601    A               MODBYT    A,OR,1                    STAY IN UNTIL LOOP
                               ENDIF                               * * * NO MATCH - RTC COMPLETE
06 000F0  C2AD00  N         UNTIL!   CC,Z,S                        WILL FALL THROUGH THIS CRACK
                     *
06 000F3  E1      A         POP      H                             RESTORE THE
06 000F4  44      A         MOV      B,H                           'B' REGISTER
06 000F5  E1      A         POP      H                             RESTORE H&L REGS
06 000F6  D1      A         POP      D                             RESTORE D&E REGS
06 000F7  F1      A         POP      PSW                           RESTORE A-REG & CONDITION CODES
06 000F8  C9      A         RET                                    RETURN TO 'FLOAT' BACKGROUND
                     *
```

TABLE XI

```
                                        ****************************************************************
                                        * STAND-BY FRONT PANEL SWITCH SCAN (NOT READY & READY STATES) *
                                        ****************************************************************

05 00000   3A57FA   N          IF:       XBYT,MINIBYTE,EQ,0
05 00003   FE00     A
05 00005   C22600   N
05 00008   1E05     A              MVI       E,5                  E= # INPUTS TO READ (6 BYTES)
05 0000A   2168FC   N              LXI       H,PREV@IN+6          H&L= 'PRIOR READ' TABLE (+1)
05 0000D   E5       A              PUSH      H                    SAVE ADDR ON STACK
                                   REPEAT                         LOOP 'UNTIL' 6 BYTES TESTED
05 0000E   7B       A                MOV       A,E                A= 5, 4, 3, 2, 1, OR 0
05 0000F   07       A                RLC                          MULTIPLE
05 00010   07       A                RLC                                  A-REG
05 00011   07       A                RLC                                       BY 8
05 00012   C607     A                MODBYT    A,ADD,X'07'        A= X'2F TO 07' (LOW INPUT ADDR)
05 00014   6F       A                RIBYT     A                  READ PROPER FRONT PANEL IN BYTE
05 00015   CD0000   N
05 00018   E1       A                POP       H                  H&L= ADDR OF 'PRIOR READ' BYTE
05 00019   2B       A                DCX       H                  MOVE TO NEXT BYTE IN TABLE
05 0001A   E5       A                PUSH      H                  SAVE FOR NEXT TIME AROUND LOOP
05 0001B   CD7D00   N                CALL      SWS@SCAN
05 0001E   1D       A                DCR       E                  DECRM LOOP CNTR(5 TO-1)
05 0001F   F20E00   N              UNTIL:    CC,S,S
05 00022   E1       A              POP       H


                                        ******************************************
                                        * PRINT STATE FRONT PANEL SWITCH SCAN *
                                        ******************************************

           05 00156            PRT@SWS   EQU        $
           05 00156            RUNN@SWS  EQU        $
05 00156   3A57FA   N                    IF:        XBYT,MINIBYTE,EQ,0
05 00159   FE00     A
05 0015B   C28301   N
05 0015E   2E0C     A                RIBYT     KYBD#BY2-3         READ CLEAR(D7),,STOP PRT,
05 00160   CD0000   N
05 00163   E6A3     A                MODBYT    A,AND,X'A3'        START PRT, AS A BYTE
05 00165   07       A                RLC
05 00166   5F       A                MOV       E,A                SAVE TEMPORARILY IN E-REG
05 00167   2E27     A                RIBYT     KYBD#BYT4          'READ 'ADH#SNGL' & 'ADH#MULT'
05 00169   CD0000   N
05 0016C   0F       A                RRC                          MERGE WITH
05 0016D   E630     A                MODBYT    A,AND,X'30'                   1ST BYTE
05 0016F   B3       A                MODBYT    E,OR,A                                 READ
05 00170   5F       A
05 00171   2E16     A                RIBIT     AX#TRAY            READ 'AX#TRAY' BIT
05 00173   CD0000   N
05 00176   7B       A                MOV       A,E                 AND MERGE WITH 2
05 00177   17       A                RAL                            PREVIOUS BYTE READS
05 00178   1EE6     A                SWSPOINT   48
05 0017A   2162FC   N                LXI       H,PREV@IN          H&L= ADDR 'PRIOR READ' BYTE
05 0017D   CD7D00   N                CALL      SWS@SCAN           &INPUT SW BYTE DECODE SUBR


                                        **************************************************************************
                                        * COMMON SWITCH SCAN SUBR- ENTER WITH SWITCH BYTE IN A-REG (FROM BIT OR BYTE *
                                        *   FILTERING SUBROUTINES), ADDR OF PRIOR SWITCH CONDITION BYTE IN MEMORY (H&L *
                                        *   REGS), AND E-REG SET TO SWITCH BYTE (AND 'CASE:' GROUP) NUMBER (5 TO 0).   *
                                        **************************************************************************

05 0007D   47       A   SWS@SCAN MOV       B,A                  B= LATEST 'READ' DATA
05 0007E   7E       A            MOV       A,M                  A= PRIOR 'READ' DATA
05 0007F   70       A            MOV       M,B                  UPDATE 'PRIOR' TO 'LATEST'
05 00080   A8       A            MODBYT    A,XOR,B              A= 1 WHERE SWS JUST CHANGED
05 00081   A0       A            IF:       XBYT,A,AND,B;NZ      WERE ANY SWS JUST PUSHED
05 00082   CA5501   N                                           YES, INIT BIT POSITION CNTR
05 00085   26FF     A              MVI       H,X'FF'            LOOP 'UNTIL' NO BITS= 1 IN BYTE
                                   REPEAT                       H= POSITION OF SW (D0 TO D7)
05 00087   24       A                INR       H                PUT SW INFO INTO 'C' BIT
05 00088   17       A                RAL                        HAS THIS SW JUST BEEN PUSHED
05 00089   D25101   N                IF:       CC,C,S           YES, SAVE
05 0008C   F5       A                  PUSH      PSW                   REGS OVER
05 0008D   D5       A                  PUSH      D                               'CASE:'
05 0008E   E5       A                  PUSH      H
05 0008F   7B       A                  MOV       A,E            RELOAD 'BYTE #' CNTR
05 00090   E61F     A                  ANI       X'1F'          ELLIM.POSS.OF POSITIVE #
05 00092   07       A                  RLC                      MULTIPLE
05 00093   07       A                  RLC                              A-REG
05 00094   07       A                  RLC                                   BY 8
```

```
05 00095    84       A                            CASE:    XBYT,A,ADD,H     USE BYTE # & BIT # AS A PNTR
05 00096    114E01   N
05 00099    FE58     A
05 00098    CD0000   N

                       ************************************************************
                       * ACTIVE SWITCHES FOR STAND-BY (NOT READY & READY STATES)  *
                       ************************************************************
05 0009E    0000     N                            C,00     DIGIT@IN         DIGIT 1
05 000A0    0000     N                            C,01     DIGIT@IN         DIGIT 2
05 000A2    0000     N                            C,02     DIGIT@IN         DIGIT 3
05 000A4    0000     N                            C,03     DIGIT@IN         DIGIT 4
05 000A6    0000     N                            C,04     DIGIT@IN         DIGIT 5
05 000A8    0000     N                            C,05     DIGIT@IN         DIGIT 6
05 000AA    0000     N                            C,06     DIGIT@IN         DIGIT 7
05 000AC    0000     N                            C,07     DIGIT@IN         DIGIT 8
                       *
05 000AE    0000     N                            C,08     DIGIT@IN         DIGIT 9
05 000B0    0000     N                            C,09     KYBD@0           DIGIT 0
05 000B2    0000     N                            C,10     RECALL@
05 000B4    0000     N                            C,11     @CLEAR           CLEAR
05 000B6    0000     N                            C,12     IMAG@SFT         IMAGE SHIFT
05 000B8    9301     N                            C,13     SPARE
05 000BA    0000     N                            C,14     STRT@PRT         START PRINT
05 000BC    0000     N                            C,15     STOP@PRT         STOP PRINT
                       *
05 000BE    0000     N                            C,16     VAR@DENS         VARIABLE DENSITY
05 000C0    0000     N                            C,17     AX@TRAY          AUX TRAY
05 000C2    9301     N                            C,18     SPARE
05 000C4    9301     N                            C,19     SPARE
05 000C6    9301     N                            C,20     SPARE
05 000C8    0000     N                            C,21     PEC@ON           PASTE UP SUPPRESSION
05 000CA    0000     N                            C,22     2SD@CPY          2 SIDED COPY
05 000CC    9301     N                            C,23     SPARE
                       *
05 000CE    9401     N                            C,24     RX
05 000D0    9401     N                            C,25     RX
05 000D2    9401     N                            C,26     RX
05 000D4    9401     N                            C,27     RX
05 000D6    0000     N                            C,28     98@REDN          98% REDUCTION
05 000D8    0000     N                            C,29     74@REDN          74% REDUCTION
05 000DA    0000     N                            C,30     65@REDN          65% REDUCTION
05 000DC    0000     N                            C,31     RX@ZOOM          RANK ZOOM LENS
                       *
05 000DE    0000     N                            C,32     ADH@JREC         ADH JOB RECOVERY
05 000E0    0000     N                            C,33     ADH@MULT         ADH MULTIPLE FEED
05 000E2    0000     N                            C,34     ADH@SGNL         ADH SINGLE FEED
05 000E4    9401     N                            C,35     RX
05 000E6    0000     N                            C,36     SRT@JOBS         SORTER JOB SUPPLEMENT
05 000E8    0000     N                            C,37     SRT@SETS         SORTER SETS
05 000EA    0000     N                            C,38     SRT@STKS         SORTER STACKS
05 000EC    9301     N                            C,39     SPARE
                       *
05 000EE    9301     N                            C,40     SPARE
05 000F0    9301     N                            C,41     SPARE
05 000F2    9301     N                            C,42     SPARE
05 000F4    9301     N                            C,43     SPARE
05 000F6    0000     N                            C,44     SERVICE          TECH REP KEY SWITCH
05 000F8    0000     N                            C,45     FAULT@CD         DISPLAY FAULT CODE
05 000FA    0000     N                            C,46     LVDGNPRG         LEAVE DIAGNOSTIC PROGRAM
05 000FC    9301     N                            C,47     SPARE

                       ************************************
                       * ACTIVE SWITCHES FOR PRINT STATE *
                       ************************************
05 000FE    0000     N                            C,48     RECALL@          RECALL QUANTITY
05 00100    0000     N                            C,49     ADH@PMUL         ADH MULTIPLE FEED
05 00102    0000     N                            C,50     ADH@PSIN,        ADH SINGLE FEED
05 00104    9301     N                            C,51     SPARE
05 00106    0000     N                            C,52     SMPL@CPY         SAMPLE COPY (START PRINT)
05 00108    0000     N                            C,53     PRT@STOP         STOP PRINT
05 0010A    0000     N                            C,54     CNTR@RST         DIAGNOSTIC COUNTER RESET
05 0010C    0000     N                            C,55     AX@PRNT          AUX TRAY

05 00151    B7       A             UNTIL:    XBYT,A,OR,A,Z                  END WHEN NO BITS IN THIS BYTE
05 00152    C28700   N
                                 ENDIF
05 00155    C9       A           RET                                        RETURN TO STDBY OR PRINT BKGND
```

TABLE XII

```
                                  ************************************************************************
                                  *                                                                      *
                                  *            RØUTINE FØR CALCULATING F.Ø. AND FLASH TIMES              *
                                  *                                                                      *
                                  ************************************************************************
                                  *
                                  *
                                  *
                                  *
06 07B78   1600     A    TIMMØD   MVI       D,0                        ZERØ D-REG
06 07B7A   3A6CF4   A             IF!       FLG,65@FLAG,T              IS 65% REDUCTIØN SELECTED
06 07B7D   07       A
06 07B7E   D28E7B   N
06 07B81   210FE2   A                LXI       H,NFØ@65+NVMBASE!+1     YES-GET NVM TRIM
06 07B84   CDEA7B   N                CALL      ADD@TRIM
06 07B87   26       A                DB        38
06 07B88   2C       A                DB        44                      FIXED F.Ø. ØFF TRIM
06 07B89   2E00     A                MVI       L,0                     SET FLASH AT 0
06 07B8B   C3C07B   N             ØRIF!     FLG,74@FLAG,T              IS 74% REDUCTIØN SELECTED
06 07B8E   3A6DF4   A
06 07B91   07       A
06 07B92   D2A27B   N
06 07B95   210BE2   A                LXI       H,NFØ@74+NVMBASE!+1     YES- GET NVM TRIM
06 07B98   CDEA7B   N                CALL      ADD@TRIM
06 07B9B   02       A                DB        2                       FIXED F.Ø. ØN TIME
06 07B9C   20       A                DB        32                      FIXED F.Ø. ØFF TRIM
06 07B9D   2E00     A                MVI       L,0                     SET FLASH AT 0
06 07B9F   C3C07B   N             ØRIF!     FLG,98@FLAG,T              IS 98% REDUCTIØN SELECTED
06 07BA2   3A6EF4   A
06 07BA5   07       A
06 07BA6   D2B67B   N
06 07BA9   2107E2   A                LXI       H,NFØ@98+NVMBASE!+1     YES-GET NVM TRIM
06 07BAC   CDEA7B   N                CALL      ADD@TRIM
06 07BAF   01       A                DB        1
06 07BB0   0B       A                DB        11                      FIXED F.Ø. ØFF TRIM
06 07BB1   2E09     A                MVI       L,9
06 07BB3   C3C07B   N             ELSE!
06 07BB6   2103E2   A                LXI       H,NFØ@MØD+NVMBASE!+1    GET 100% F.Ø. TRIM FRØM NVM
06 07BB9   CDEA7B   N                CALL      ADD@TRIM
06 07BBC   00       A                DB        00
06 07BBD   00       A                DB        00
06 07BBE   2E00     A                MVI       L,0
                                  ENDIF
06 07BC0   2600     A             MVI       H,0
06 07BC2   229AFC   N             SHLD      1FLSH@ØN                   STØRE FLASH TIME FØR TBLD
06 07BC5   3A31F4   A             IF!       FLG,IMG@SFT,T              IS IMAGE SHIFT SET
06 07BC8   07       A
06 07BC9   D2E97B   N
06 07BCC   CD0000   N                RNVBYT    FSH@MØD
06 07BCF   11       A
06 07BD0   E2       A
06 07BD1   1600     A                MVI       D,0                     ZERØ D REG
06 07BD3   5F       A                MØV       E,A                     MØVE IMAGE SHIFT TØ E REG
06 07BD4   2A9AFC   N                LHLD      1FLSH@ØN                LØAD SIDE 1 FLASH TIME
06 07BD7   19       A                DAD       D                       ADD IMAGE SHIFT
06 07BD8   22A0FC   N                SHLD      2FLSH@ØN                STØRE SIDE 2 FLASH TIME
06 07BDB   2A9EFC   N                LHLD      1FØ@ØN                  LØAD SIDE 1 F.Ø. ØN TIME
06 07BDE   19       A                DAD       D                       ADD IMAGE SHIFT
06 07BDF   22A4FC   N                SHLD      2FØ@ØN                  STØRE SIDE 2 F.Ø. ØN TIME
06 07BE2   2A9CFC   N                LHLD      1FØ@ØFF                 LØAD SIDE 1 F.Ø. ØFF TIME
06 07BE5   19       A                DAD       D                       ADD IMAGE SHIFT
06 07BE6   22A2FC   N                SHLD      2FØ@ØFF                 STØRE SIDE 2 F.Ø. ØFF TIME
                                  ENDIF
06 07BE9   C9       A             RET
06 07BEA   CD667B   N    ADD@TRIM CALL      NVM@READ                   GET F.Ø. DATA FRØM NVM
06 07BED   E1       A             PØP       H                          GET ADDR ØF FIXED F.Ø. ØN DATA
06 07BEE   7E       A             MØV       A,M                        PUT IT IN A-REG
06 07BEF   23       A             INX       H                          GET ADDR ØF FIXED F.Ø. ØFF
06 07BF0   46       A             MØV       B,M                        PUT IT IN B-REG
06 07BF1   23       A             INX       H                          RETURN ADDR
06 07BF2   E5       A             PUSH      H                          PUSH RETURN ADDR ØN STACK
06 07BF3   83       A             ADD       E                          ADD FIXED & NVM F.Ø. ØN TIME
06 07BF4   EEFF     A             XRI       -1                         CØMPLEMENT SUM
06 07BF6   26FF     A             MVI       H,-1
06 07BF8   6F       A             MØV       L,A
06 07BF9   229EFC   N             SHLD      1FØ@ØN                     STØRE F.Ø. ØN TIME
06 07BFC   78       A             MØV       A,B                        PUT FIXED F.Ø.ØFF IN A
06 07BFD   82       A             ADD       D                          ADD FIXED & NVM F.Ø. ØFF
06 07BFE   2600     A             MVI       H,0
06 07C00   6F       A             MØV       L,A
06 07C01   229CFC   N             SHLD      1FØ@ØFF                    STØRE ØFF TIME FØR TBLD
06 07C04   C9       A             RET
                                  *
```

TABLE XIII

```
                    *************************************************************
                    *                                                           *
                    *            READS A BLOCK OF DATA FROM NVM AND PACKS INTO BYTES *
                    *                                                           *
                    *************************************************************
                    *
06 07B66   7E   A   NVMOREAD MOV   A,M        GET M.S. NIBBLE OF ON DATA
06 07B67   07   A            RLC
06 07B68   07   A            RLC
06 07B69   07   A            RLC
06 07B6A   07   A            RLC
06 07B6B   2B   A            DCX   H          ADDR OF L.S. NIBBLE
06 07B6C   B6   A            ORA   M          OR IN L.S. NIBBLE
06 07B6D   5F   A            MOV   E,A        PUT NVM ON TRIM IN E-REG
06 07B6E   2B   A            DCX   H          ADDR OF M.S. OFF DATA
06 07B6F   7E   A            MOV   A,M        GET M.S. NIBBLE OF OFF DATA
06 07B70   07   A            RLC
06 07B71   07   A            RLC
06 07B72   07   A            RLC
06 07B73   07   A            RLC
06 07B74   2B   A            DCX   H          ADDR OF L.S. NIBBLE
06 07B75   B6   A            ORA   M          OR IN L.S. NIBBLE
06 07B76   57   A            MOV   D,A        PUT NVM OFF TRIM IN D-REG
06 07B77   C9   A            RET
```

Figure 40A:
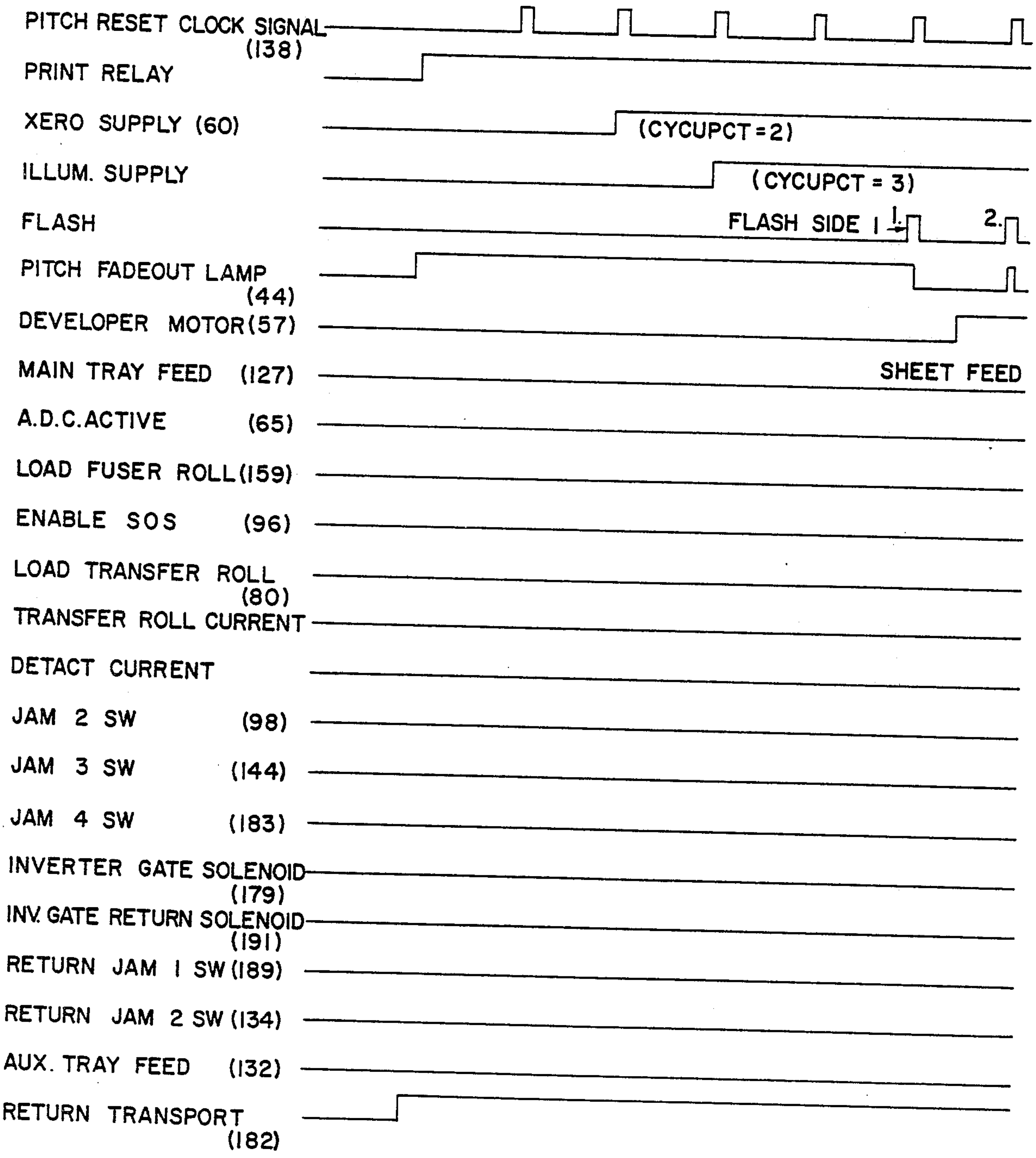
FIGS. 40*a*, 40*b*, and 40*c* is a timing chart of the principal operating components of the host machine in an exemplary copy run.
Figure 40B:
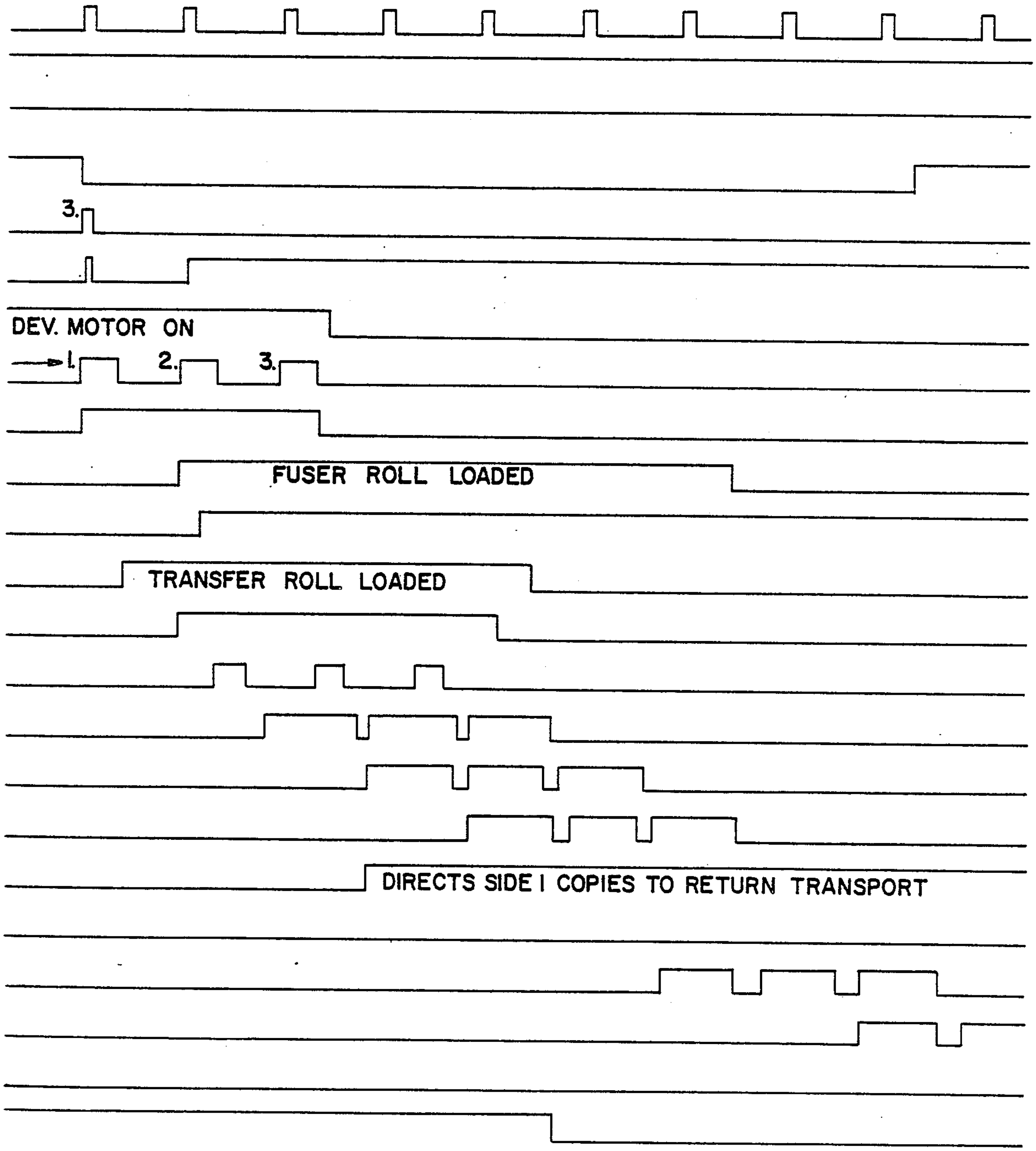
Figure 40C:
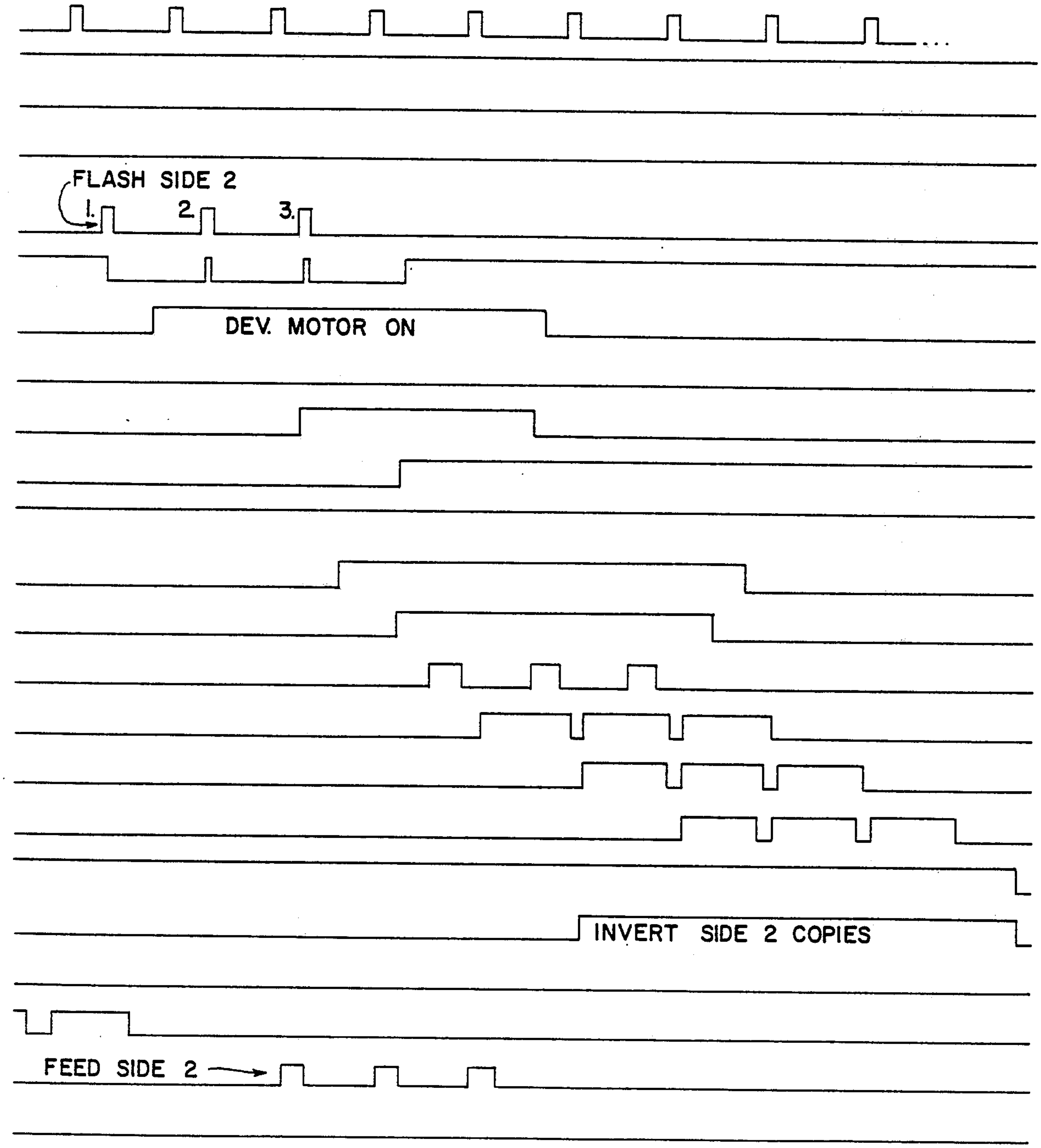

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run programmed is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

Figure 41:
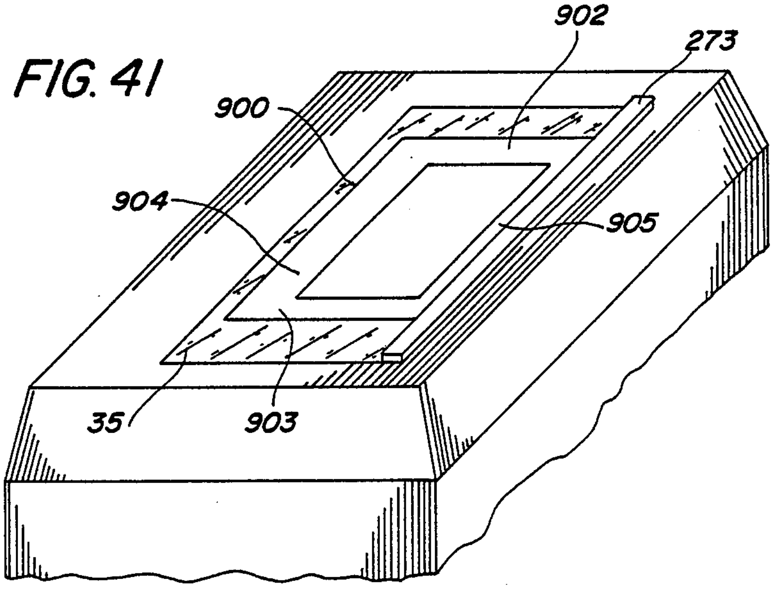
FIG. 41 is an isometric view of the platen of the present machine with an original document disposed in copying position thereon.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 210, 211 respectively depending on the disposition of deflector 220.

Some originals, such as letters, often have preselected margins at the top, bottom, and sides of the letter. Referring particularly to FIG. 41 of the drawings, page 1 of a simplex document 900 is there illustrated. Document 900 has top, bottom, and left and right edge margins 902, 903, 904, 905 respectively. Document 900 is disposed face down on platen 35 in the exemplary showing, with the trailing document edge (margin 905) in registered engagement with register edge 273 of document handler 16. Note FIG. 14.

As can be seen in FIG. 41, the left side margin 904 is larger than the right side margin 905, a practice often followed to facilitate edge binding of the document, or copies thereof later.

In the exemplary machine 10, the optical projection system comprised of mirrors 39, 40 and lens 41 projects the image onto belt 20. As seen best in FIGS. 2 and 3, the latent images are sideways with the copy sheets 3 advanced in the same disposition.

Figure 43:
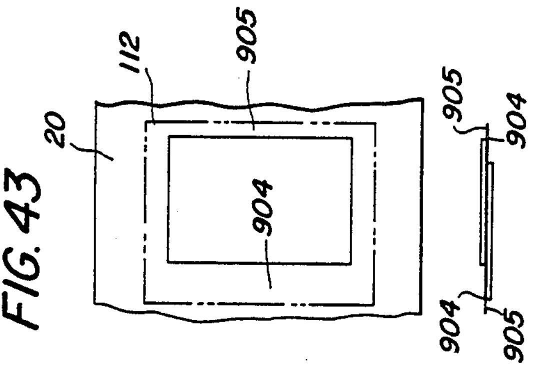
FIG. 43 is a schematic representation of side two copy production without side two image shift.
Figure 42:
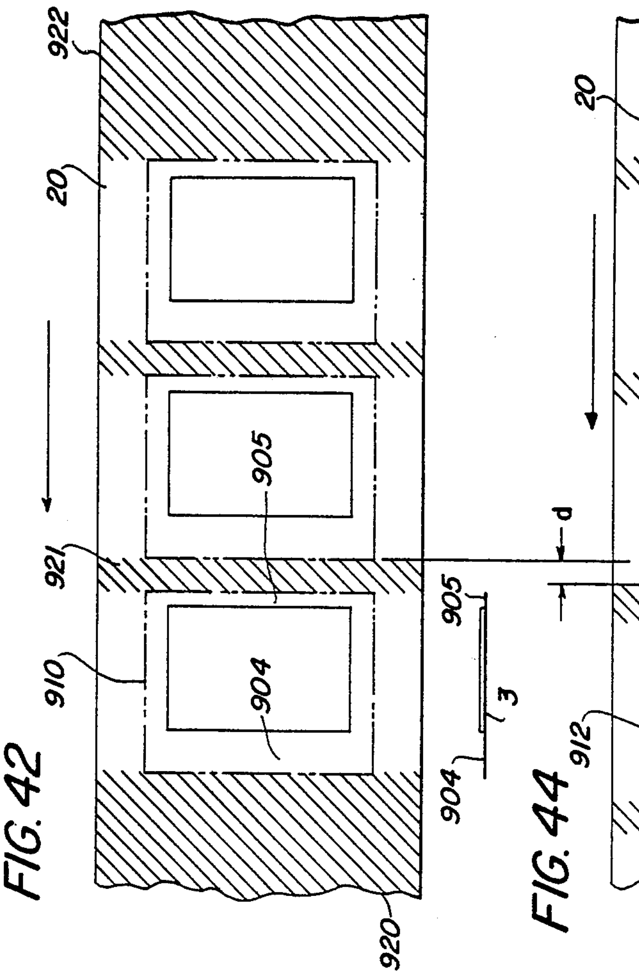
FIG. 42 is a schematic representation of the side one copy production.

As described, the reproduction machine 10 is capable of producing simplex, i.e. one sided copies, or duplex, i.e. two sided copies. FIGS. 42, 43 illustrate duplex copies from originals having the margin arrangement described, (i.e. document 900) without the side two image shift of the present invention. There the image of the first original page, (i.e. document 900), is represented by numeral 910. As can be seen, the left side margin 904 forms the leading edge of the image produced with the right side margin 905 the trailing edge. Following development the image is transferred to one side of a copy sheet 3, and the image bearing sheet is diverted by gate 184 to return transport 182 and carried into auxiliary tray 102. See FIG. 12. As a result, the side of copy sheet 3 bearing the transferred image is on top with the clear or unused side of the copy sheet on the bottom.

When the second side copy is made, page 1 of the original, (i.e. document 900) is removed from platen 35 and page 2, which is margined in a similar manner, disposed in registered position thereon. Referring particularly to FIG. 43, the latent electrostatic image of page 2 of the original produced on belt 20 is represented by numeral 112. Following development, the second image is transferred to the clear or unused side of the copy sheet 3 fed forward from auxiliary tray 102. As can be seen from FIG. 43, this results in a duplex copy wherein the side margins 904, 905 on one side of the copy sheet are reversed from the side margins on the other side of the copy sheet, i.e. the relatively wide left hand margin 904 of page 1 is opposite the relatively narrow right hand margin 905 of page 2, etc.

To obviate the aforedescribed, the timing cycle of flash exposure lamps 37 is offset slightly, in this case advanced slightly, when the reproduction machine 10 is producing side two copies. The speed up in triggering flash lamps 37 has the effect of displacing the electrostatic latent image produced on belt 20 to produce the required margins as will appear.

Figure 44:
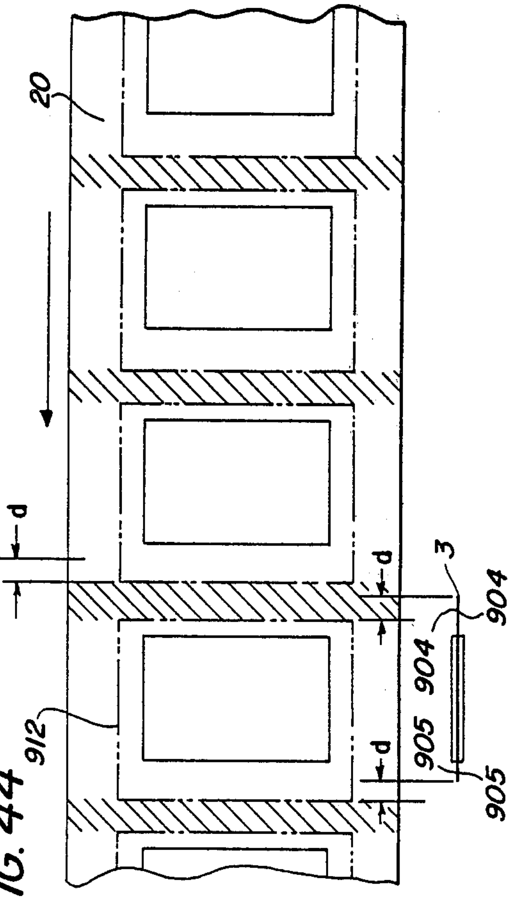
FIG. 44 is a schematic representation of side two copy production with side two image shift.

Referring to FIG. 44, where like numerals represent like parts, the side 1 image 910 is produced as described earlier (FIG. 42). When the second side image is produced, triggering of flash lamps 37 is advanced by a preset amount to bring the second side image 912 forward by an amount d equal to the difference in margin width between the left and right hand margins 904, 905.

As described, copy sheets 3 fed forward from either main or auxiliary trays 100, 102 respectively are registered through engagement of the sheet leading edge with register fingers 141. See FIGS. 4 and 12. The speed of rotation of register fingers 141 is synchronized with that of belt 20, drive to both being effected from common drive motor 34. See FIG. 4. Basic timing for the reproduction machine 10 is derived from pulse generator 145 on the shaft 142 of fingers 141. As a result, the copy sheets are brought forward in fixed timed relationship with the advancing developed image on belt 20 such that the developed image and copy sheet arrive at the transfer station at the same time.

In the arrangement illustrated in FIG. 44, triggering of flash lamps 37 is advanced slightly to move the latent electrostatic image formed on belt 20 forward by a distance d. However, the timing of the copy sheet arrival remains unchanged. As a result, the leading edge of the copy sheet arrives in effect late with the reslt that the portion of the leading edge of the image, substantially equal to the width d, is not transferred. This in effect cuts down the size of the relatively wide leading edge image to size substantially equal the right hand margin 905.

In a similar manner, the trailing edge of the copy sheet projects beyond the trailing edge of the image. Since the unimaged areas of belt 20 are exposed and therefore erased by pitch lamp 44 (the timing cycle of which is also changed as will appear), no image is transferred to the portion of the copy sheet extending beyond the trailing edge of the image with the result that the trailing margin of the page two copy is increased by an amount substantially equal to the dimension d. As can be seen by the exemplary illustration of FIG. 44, a side 2 copy 912 is produced having a left and right side margins effectively reversed. This results in a duplex copy having correspondingly sized left and right hand margins 904, 905.

Pitch fadeout lamp 44 operates to erase, i.e. discharge, charged but unexposed areas, i,e. nonimage areas of belt 20. As seen in FIGS. 42, 44, these areas comprise the area 920 up to the leading edge of the first image, the area or areas 921 between successive images, and the area 922 following the trailing edge of the last image until the belt 20 stops. As can be seen from FIG. 44, the timing cycle of pitch fadeout lamp 44 is displaced in the same increment as that of flash lamps 37 to correlate the on/off times of lamp 44 with the position of he electrostatic latent image (i.e. image 912 of FIG. 44) on belt 20.

Referring to Fixed Pitch Event Table (TABLE II), basic flash timing parameter is set from count 0 (flash on) to count 120 (flash off). Data varying the flash timing from the basic timing parameter such as data changing the flash timing for side two image shift is stored in NVM 610.

When side two image shift is desired, the machine operator actuates push button 816 (SIDE 2 IMAGE-SHIFT) on control console 800. Other program functions, i.e. number of copies desired, etc., are also programmed in by the operator through the selective actuation of various pushbuttons and controls on console 800 as described.

The machine background tasks of the State Checker Routine (STATCH) in TABLE I, in the NRDY State, include calls for the Switch scan (SWS SCAN) routine of TABLE XI. SWS SCAN, when called, scans the various switches that comprise console 800. Where a switch i.e. pushbutton or control, on console 800 has been actuated, a flag identifying the switch is set. With pushbutton 816 (SIDE 2 IMAGE SHIFT) activated, a side 2 image shift flag (IMAG SFT) is set.

Figure 45A:
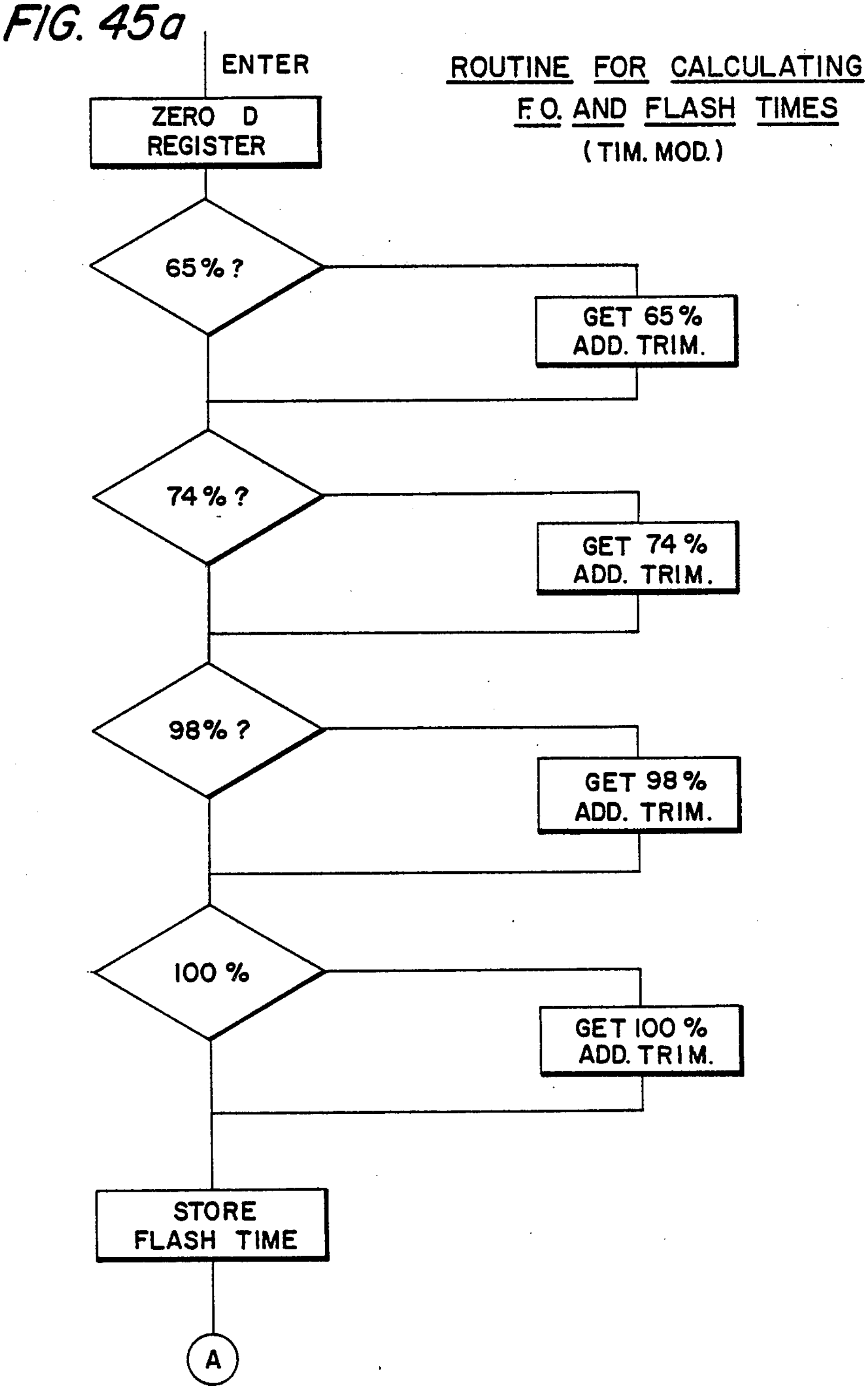
FIGS. 45*a* and 45*b* is a flow chart of the routine for changing flash and fadeout lamp timing cycles to effect side two image shift.
Figure 45B:
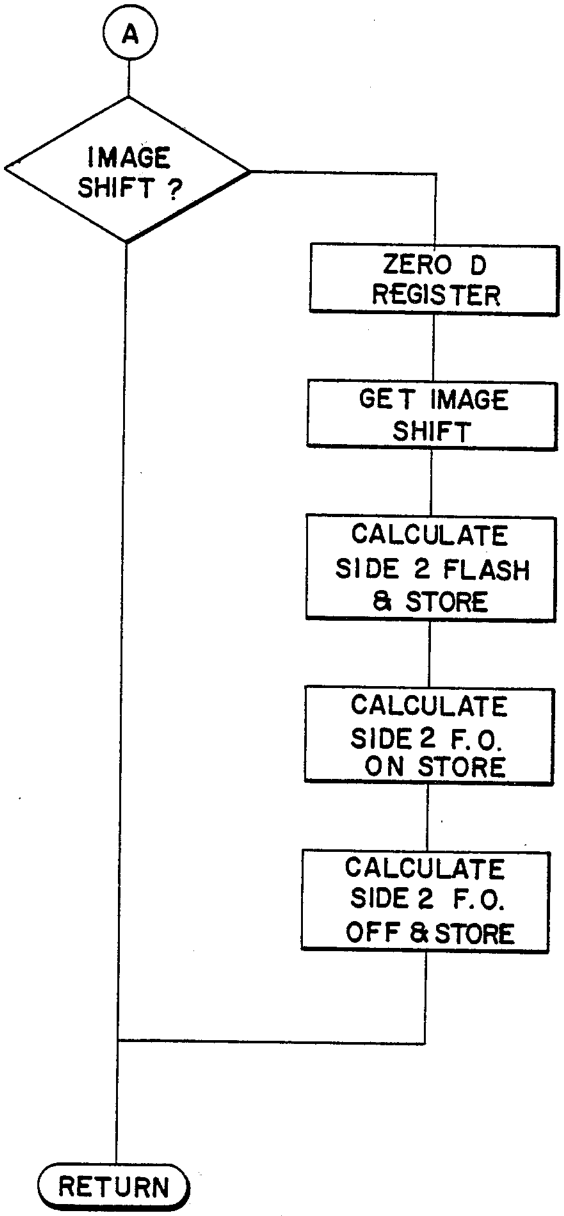

Referring to TABEL I (STCK), on entering Prolog 1 of Print State Background, a routine for calculating shifted image values (TIM MOD), TABLE XII and drawing FIG. 45 is called. This routine, in addition to determining trimming adjustments to flash timing for the various optical reductions (i.e., 98%, 74%, 65%) also looks to see if the image shift (IMAG SFT) flag is set. If so, the routine addresses the image shift timing increment stored in NVM 610, calculates the timing data for side two flash and side two fadeout by adding the timing increment to the side one flash and fadeout lamp on/off timing data. The side two timing data incorporating the image shift data is stored.

Table XIII sets out the routine for reading data from NVM 610.

Following calculation of the shifted image values, the routine for building a new pitch i.e. RUN EVENT table (TBLD PRT), TABLE IV is called by the STCK routine. This routine and the routines employed therewith (TABLES II, III, V, VI and VII) assemble, through merger of the fixed pitch events (TABLE II) with the variable pitch events (TABLE III), a run event table for operating in cooperation with the Background program the machine components in an integrated manner to carry out the particular copy program programmed by the operator.

The Pitch Table Builder (TABLE IV) determines the flash, and fadeout lamp on and off counts by adding to the base flash and fadeout lamp on/off counts the trim adjustment (RED ADJ) and in the case where the side two image shift flag (IMG SFT) is set, the shift adjustment (SHIFT ADJ). In addition, a loop counter is set to regulate the number of times sort (TABLE V) is gone through, the setting depending upon whether or not the image shift flag (IMG SFT) is set. Following sorting, the fixed and variable pitch data is merged (TABLE VII) to provide the run event table.

As a result at the option of the machine user, when making side 2 images, the timing cycles of both flash lamps 37 and pitch fadeout lamp 44 are altered slightly from the timing cycles employed when making side 1 copies to provide like margins on both sides of the copies produced.

While the invention has been described with reference to the structure disclosed, it is not confined to the details set forth, but is intended to cover such modifications or changes as may come within the scope of the following claims.

What is claimed is:

1. In a process for making two sided copies, wherein a copy sheet is fed from a supply of copy sheets to bring one side of the copy sheet into transfer relationship with a first developed image on a photoreceptor, the copy sheet is registered by one edge to correlate the position of the copy sheet with the first developed image, the first developed image is transferred from the photoreceptor to the copy sheet one side, the copy sheet is inverted, the inverted copy sheet is refed to bring the second side of the copy sheet into transfer relationship with a second developed image on the photoreceptor, the inverted copy sheet is re-registered by edge to correlate the position of the inverted copy sheet with the second developed image; and the second developed image is transferred from the photoreceptor to the copy sheet second side; the improvement comprising:

changing the timing of the image producing means to change the location of the second developed image on the photoreceptor relative to the copy sheet second side whereby to match the location of the second image on the copy sheet second side with the location of the image on the copy sheet first side.

2. The process according to claim 1 including the steps of:

actuating non-image erase means in timed relation with said image producing means to erase non-image areas on said photoreceptor; and resetting the timing of said non-image erase means in correlation with the change in timing of said image producing means to accommodate the change in location of said second developed image.

3. In an electrostatic apparatus for producing copies of an original, having an apparatus including a moving photoreceptor; means for charging the photoreceptor in preparation for imaging; exposure means for generating latent electrostatic images of the original on the photoreceptor, the exposure means including illumination means; means for developing the latent electrostatic images; feeding means for bringing copy sheets into predetermined registered relationship with images developed on said photoreceptor; and transfer means for transferring images developed on the photoreceptor to both sides of the copy sheets, the improvement comprising:

control means for selectively changing the operational timing of said illumination means to match the location of the developed image on one side of said copy sheet with the developed image on the other side of said copy sheet.

4. The apparatus according to claim 3 in which said control means includes first timing means for actuating said illumination means at a preset time during processing of said copies to generate latent electrostatic images for one side of said copy sheets, and second timing means effective when selected to actuate said illumination means at a second preset time whereby to change the location of the latent electrostatic images produced on the other side of said copy sheets.

5. The apparatus according to claim 3 in which said apparatus includes means for inverting said copy sheets following transfer of a developed image to one side of said sheets whereby to permit transfer of a second developed image to the unused side of said copy sheets on refeeding of said copy sheets by said sheet feeding means;

said control means being arranged to provide a predetermined timing change in said illumination means operational timing to match the location of said second developed image with the location of said first developed image on said copy sheet.

6. The apparatus according to claim 3 including a fadeout lamp effective when actuated to expose a preset segment of said photoreceptor to prevent development of the areas exposed, and timing control means for operating said fadeout lamp in a preset timed cycle to expose non-image areas of said photoreceptor;

said control means including means responsive to a change in illumination means timing for effecting a corresponding change in said fadeout lamp timed cycle whereby to correlate the non-image areas exposed by said fadeout lamp with the change in image location on said photoreceptor.

* * * * *